(12) United States Patent
Mlsna et al.

(10) Patent No.: US 11,819,820 B2
(45) Date of Patent: Nov. 21, 2023

(54) ENGINEERED COAL CHAR

(71) Applicant: Mississippi State University, Starkville, MS (US)

(72) Inventors: Todd Mlsna, Starkville, MS (US); Sita Warren, Lexington Park, MD (US)

(73) Assignee: Mississippi State University, Starkville, MS (US)

( * ) Notice: Subject to any disclaimer, the term of this patent is extended or adjusted under 35 U.S.C. 154(b) by 14 days.

(21) Appl. No.: 17/408,370

(22) Filed: Aug. 20, 2021

(65) Prior Publication Data

US 2022/0055012 A1 Feb. 24, 2022

Related U.S. Application Data

(60) Provisional application No. 63/067,939, filed on Aug. 20, 2020.

(51) Int. Cl.
| | |
|---|---|
| *B01J 20/20* | (2006.01) |
| *B01J 20/04* | (2006.01) |
| *B01J 20/28* | (2006.01) |
| *C02F 1/28* | (2023.01) |
| *B09C 1/08* | (2006.01) |
| *B01J 20/30* | (2006.01) |
| *C02F 103/00* | (2006.01) |
| *C02F 101/10* | (2006.01) |

(52) U.S. Cl.
CPC ............... *B01J 20/20* (2013.01); *B01J 20/04* (2013.01); *B01J 20/28004* (2013.01); *B01J 20/28059* (2013.01); *B01J 20/28071* (2013.01); *B01J 20/3078* (2013.01); *B09C 1/08* (2013.01); *C02F 1/283* (2013.01); *B01J 2220/42* (2013.01); *C02F 2101/105* (2013.01); *C02F 2103/001* (2013.01); *C02F 2103/007* (2013.01)

(58) Field of Classification Search
None
See application file for complete search history.

(56) References Cited

U.S. PATENT DOCUMENTS

2017/0233658 A1* 8/2017 Shu .................. C10L 5/447
44/606

OTHER PUBLICATIONS

C. Galanakis , Adsorption of Olive Mill Wastewater on Raw and Activated Greek Lignites, Conference: Protection and Restoration of the Environment VIII at Chania, Greece,Jul. 2006 (2006), P097 (poster) (Year: 2006).*
Meng, et al., Characteristics of Chars from Low Temperature Pyrolysis of Lignite, Energy & Fuels, 2014, 28, 275-284 (2013) (Year: 2013).*
He et al., "Adsorption of anionic azo dyes using lignite coke by one-step short-time pyrolysis," Fuel 267 (2020) 117140 (Year: 2020).*

* cited by examiner

*Primary Examiner* — Chester T Barry
(74) *Attorney, Agent, or Firm* — Stites & Harbison PLLC; Richard S. Myers, Jr.

(57) ABSTRACT

Provided herein are an adsorbent and method of treating water using the adsorbent. The adsorbent includes thermally- and chemically-treated lignite coal. The method includes contacting wastewater with the treated lignite coal.

20 Claims, 21 Drawing Sheets

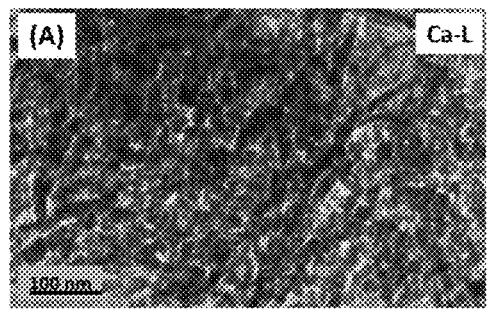
FIG. 14
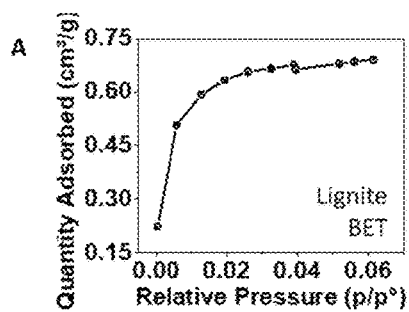
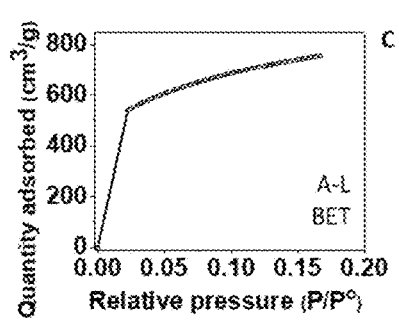
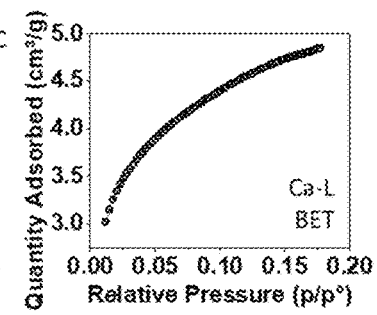
FIG. 15A      FIG. 15B      FIG. 15C
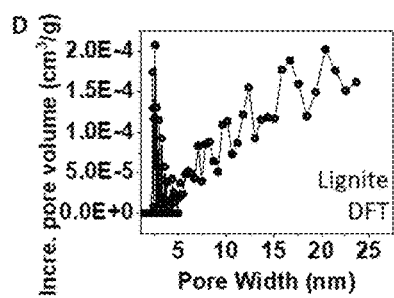
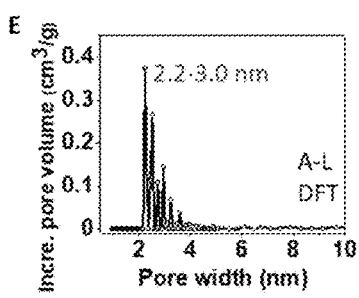
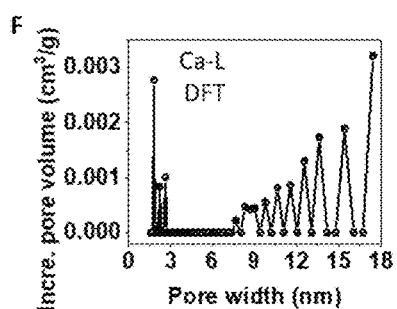
FIG. 15D      FIG. 15E      FIG. 15F

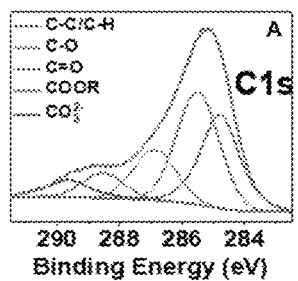
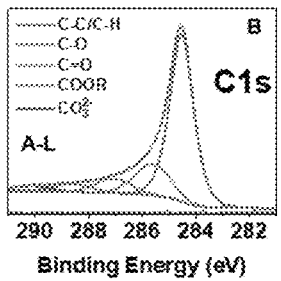
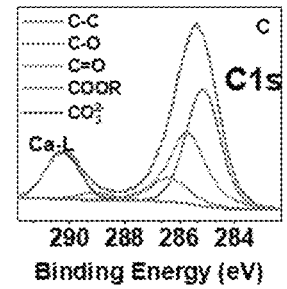
FIG. 18A        FIG. 18B        FIG. 18C
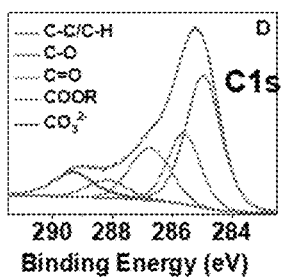
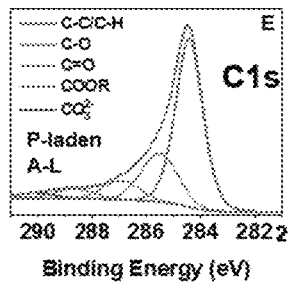
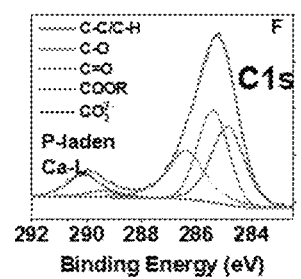
FIG. 18D        FIG. 18E        FIG. 18F
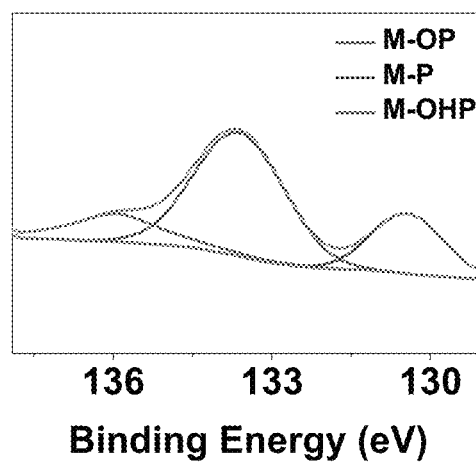
FIG. 19

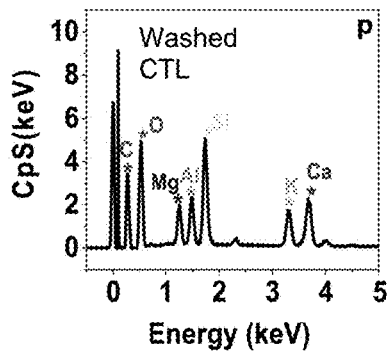
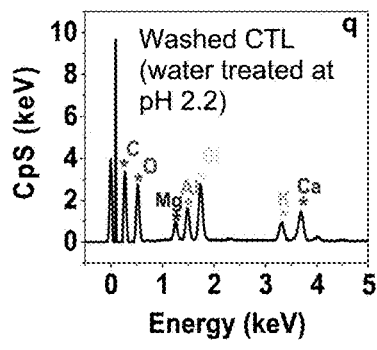
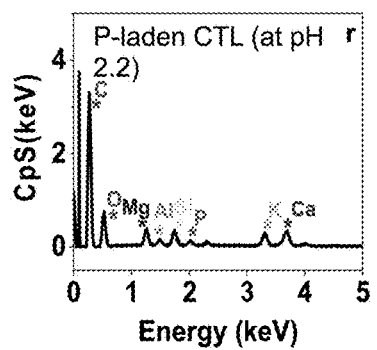
FIG. 21P              FIG. 21Q              FIG. 21R
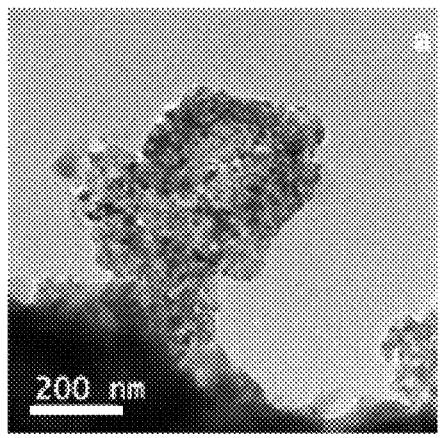
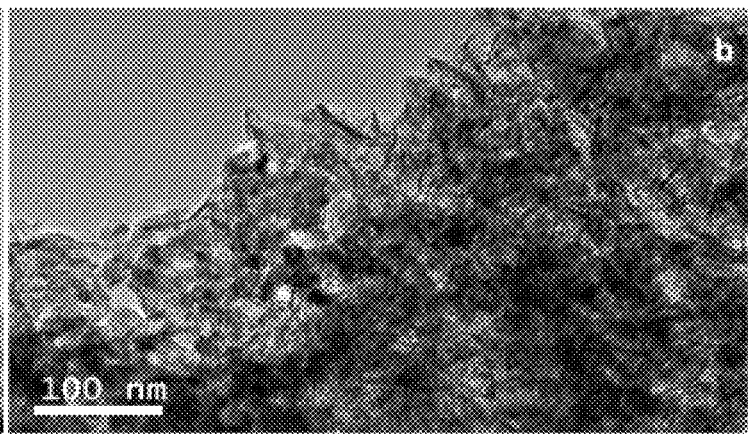
FIG. 22A              FIG. 22B
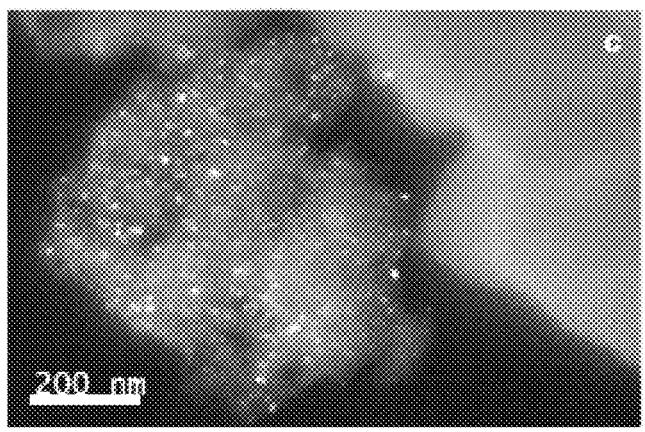
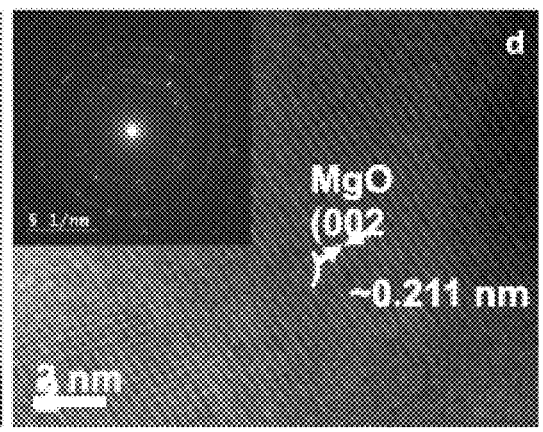
FIG. 22C              FIG. 22D

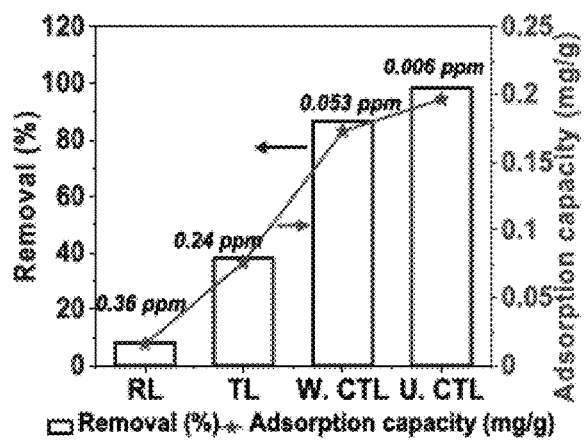
FIG. 22E
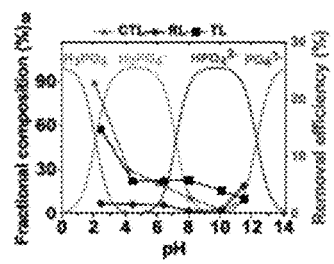 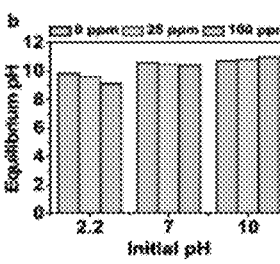 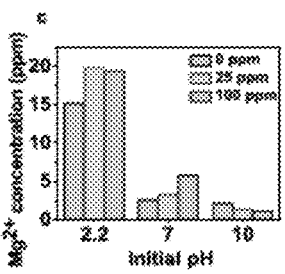 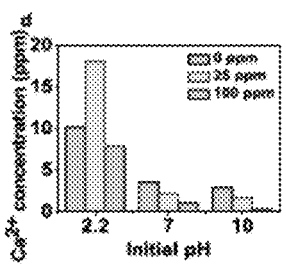
FIG. 23A　　FIG. 23B　　FIG. 23C　　FIG. 23D
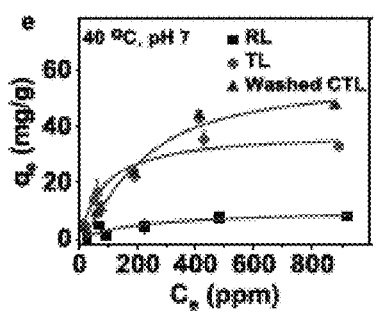 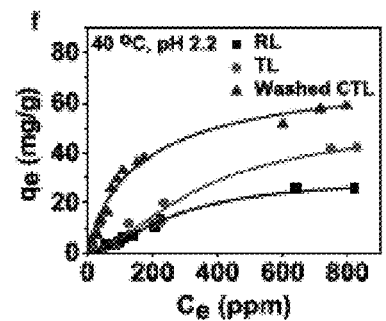 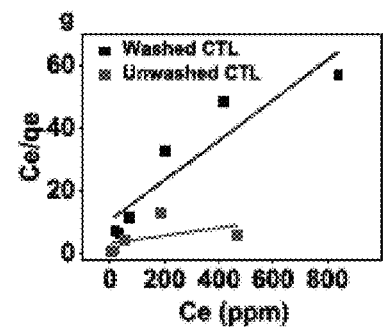
FIG. 23E　　FIG. 23F　　FIG. 23G

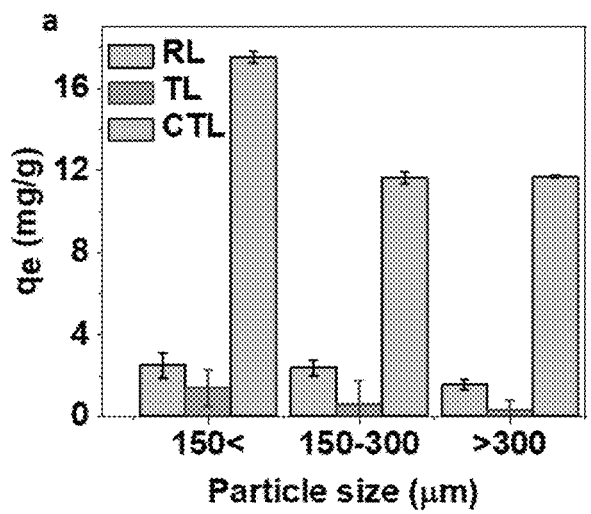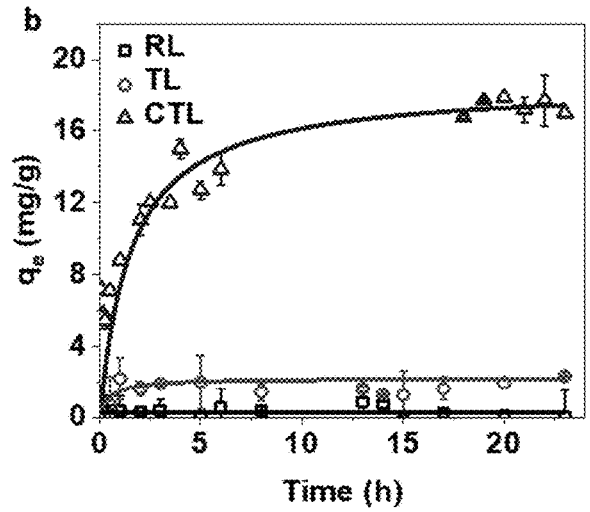
FIG. 29A        FIG. 29B
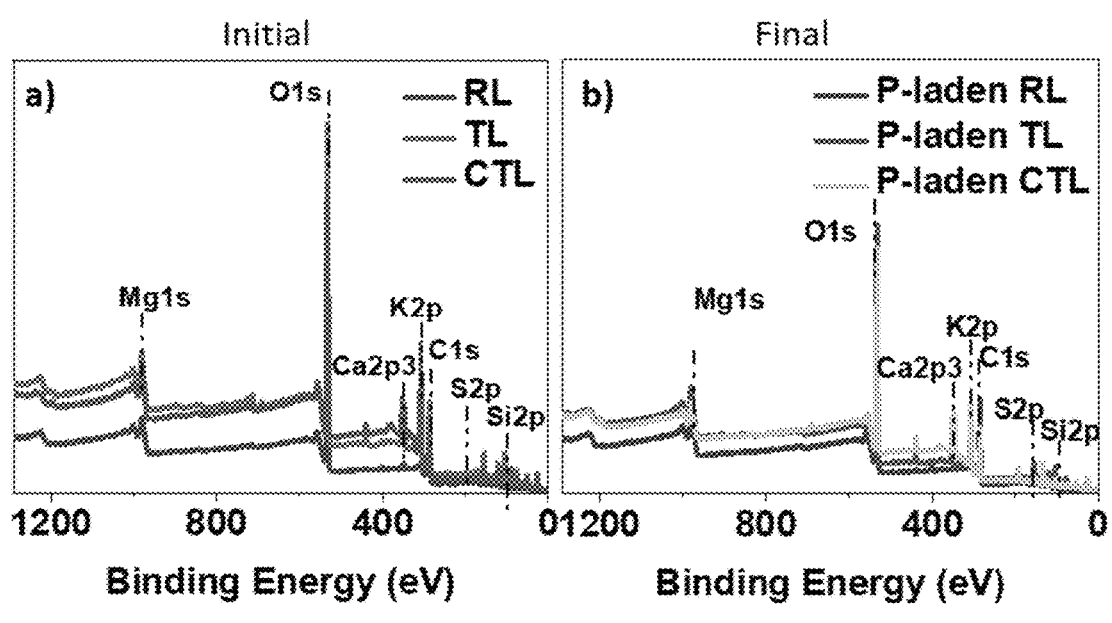
FIG. 30A        FIG. 30B

ENGINEERED COAL CHAR

RELATED APPLICATIONS

This application claims the benefit of U.S. Provisional Application Ser. No. 63/067,939, filed Aug. 20, 2020, the entire disclosure of which is incorporated herein by this reference.

TECHNICAL FIELD

The present invention relates generally to the field of absorbents. In particular, the presently-disclosed subject matter relates to engineered, high surface area coal-based absorbents, or coal char, for multiple uses and industries.

BACKGROUND

Phosphorus, an essential primary nutrient for photosynthetic organisms in aquatic environments, is naturally present in low concentrations. Environmental aqueous systems contain phosphorus primarily as phosphates, which are often the limiting nutrient for explosive algal growth. Concentrations as low as 100 µg/L can cause eutrophication, which occurs as the dense growth of blue green algae and hyacinth-like plants, resulting in short and long-term ecological effects. Cyanobacterial blooms can release soluble neurotoxins and hepatotoxins, killing fish or livestock when ingested and causing severe hazardous health effects in humans.

A typical raw domestic waste water has a total phosphorus concentration of approximately 10 mg/L. Numerous point and nonpoint sources of environmental phosphates exist. Point sources include agricultural, industrial and household effluents, waste disposal site leachates, and runoff from animal feedlots, construction and unsewered industrial sites, detergents, and storm and sanitary sewer overflows. Nonpoint sources include agricultural and urban runoff, wetland conversion, and waterway developments.

In addition to environmental phosphate sources, nitrate pollution is also a problem. North America has lost about one-half of its topsoil over the last 140 years. Soil depletion occurs due to intense cultivation, drought, erosion, overtillage, salination and inadequate management. Natural nutrient-rich organic topsoil replacement takes hundreds to thousands of years to build up under natural conditions. While application of nitrate-containing fertilizers satisfies the demand for nitrogen, an essential primary plant nutrient, it creates major nitrate run-off problems. Excess agricultural nutrients enter the world's lakes, rivers, and oceans through water run-off. Massive amounts of nutrients also contribute to algae blooms, leading to eutrophication and ultimately "dead zones."

Furthermore, clay fill soils in landscape applications can be highly compacted and low in fertility. Compaction reduces the ability of these soils to infiltrate stormwater runoff, to support the growth of diverse plant communities, and to adsorb pollutants from adjacent impervious surfaces. Low fertility and decreased infiltration can lead to poor plant performance, which is detrimental to the establishment and long-term growth of vegetation, especially in urban applications where healthy plant cover can reduce local temperature, provide wildlife habitat, and reduce stormwater runoff volume. Specifically, urban watersheds have been shown to have a higher reactive P export load than forested areas.

Accordingly, there remains a need for articles and methods capable of treating contaminated water and rebuilding soil.

SUMMARY

The presently-disclosed subject matter meets some or all of the above-identified needs, as will become evident to those of ordinary skill in the art after a study of information provided in this document.

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of such features.

Provided herein, in some embodiments, is an adsorbent comprising pyrolyzed lignite coal. In some embodiments, the pyrolyzed lignite coal includes a surface area that is at least 100 times larger than that of raw lignite coal. In some embodiments, the pyrolyzed lignite coal includes a surface area of at least about 40 $m^2/g$ when measured with the BET method using $N_2$ and a particle size of 150-300 µm. In some embodiments, the pyrolyzed lignite coal includes an increased average pore volume as compared to raw lignite coal. In some embodiments, the pyrolyzed lignite coal includes an average pore volume of about 0.01 $cm^3/g$ when measured using $N_2$. In some embodiments, the pyrolyzed lignite coal includes an average micropore volume of about 0.01 $cm^3/g$ when measured using $N_2$.

In some embodiments, the pyrolyzed lignite coal further comprises impregnated $Ca^{2+}$ and $Mg^{2+}$. In some embodiments, the impregnated pyrolyzed lignite coal includes a surface area that is at least 50 times larger than that of raw lignite coal. In some embodiments, the impregnated pyrolyzed lignite coal includes a surface area of at least about 20 $m^2/g$ when measured with the BET method using $N_2$ and a particle size of 150-300 µm. In some embodiments, the impregnated pyrolyzed lignite coal includes an increased average pore volume as compared to raw lignite coal. In some embodiments, the impregnated pyrolyzed lignite coal includes an average pore volume of about 0.005 $cm^3/g$ when measured using $N_2$. In some embodiments, the impregnated pyrolyzed lignite coal includes an average micropore volume of about 0.003 $cm^3/g$ when measured using $N_2$. In some embodiments, the impregnated pyrolyzed lignite coal includes an increased fraction of micropores as compared to raw lignite.

Also provided herein, in some embodiments, is a method of treating wastewater, the method comprising contacting the wastewater with a pyrolyzed lignite coal adsorbent. In some embodiments, the method further includes, after contacting the wastewater with the adsorbent, contacting soil with the adsorbent.

Further features and advantages of the presently-disclosed subject matter will become evident to those of ordinary skill in the art after a study of the description, figures, and non-limiting examples in this document.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein:

FIG. 14 shows an images illustrating TEM analysis of Ca-L. Flake-like morphology of Ca-L represents aggregated surface clusters. Red arrows illustrate the formation of spherical shaped particles on the surface.

FIGS. 15A-F show graphs illustrating $N_2$ adsorption-desorption isotherms and pore size distributions for adsorbents. $N_2$ adsorption-desorption isotherms of lignite, A-L, and Ca-L (A-C), pore size distributions of lignite, A-L, and Ca-L (D-F)

FIGS. 18A-F show graphs illustrating high-resolution Cis spectra for lignite, A-L, and Ca-L before and after P adsorption. HR CIS spectra for lignite, A-L, and Ca-L, before (A-C) and after (D-F) P uptake.

FIG. 19 shows a graph illustrating high-resolution P2p spectrum for lignite after P adsorption.

FIGS. 22A-E show images and graphs illustrating analysis of CTL. (A) Bright-field TEM image of washed CTL representing MgO (002) clusters (black) dispersed on char matrix (grey), (B) flake-like morphology of washed CTL was visible at high magnification, (C) dark-field TEM imaging of washed CTL; white spots are MgO particles dispersed on char matrix (D) high-resolution TEM image of a MgO particle showing overlapped lattice fringes (inset showed the SAED pattern of that MgO particle). (E) Phosphate uptake from the low initial phosphate concentration (0.4 ppm, 25 mL) on (0.05 g doses) RL, TL, washed CTL (W. CTL), and unwashed CTL (U. CTL) at 25° C. for 24 h. Equilibrium phosphate concentrations after uptake are presented on the top of the blue bars.

FIGS. 23A-G show graphs illustrating uptake analysis of RL, TL, and CTL. (A) Plots of RL, washed CTL, and TL phosphate removal efficiency (Right-Y axis) and phosphate's fractional composition (Left Y-axis) vs. pH at 25° C. (adsorbent dose 50 mg, 25 mL of 50 ppm [phosphate], 24 h, particle size 150-300 μm). (B) Equilibrium pH vs. initial pH (2.2, 7, and 10) using washed CTL at 0, 25 and 100 ppm initial phosphate concentrations (C) Leached $Mg^{2+}$ concentration (ppm) and (D) $Ca^{2+}$ concentration (ppm) in the filtrates from initial solution pH values of 2.2, 7, and 10. Sips non-linear isotherms for RL, washed CTL and TL at (E) 40° C., pH 2.2, (F) 40° C., pH 7. (G) Langmuir linear isotherms for washed CTL and unwashed CTL at 25° C., pH 7 (adsorbent dose 50 mg, 25 mL of 25-1000 ppm phosphate concentration, 24 h).

FIGS. 29A-B show graphs illustrating effect of particle size and phosphate sorption kinetics on washed CTL. (A) Removal capacity of RL, TL, and CTL vs. particle size (adsorbent dose 50 mg, 25 mL of 50 ppm [phosphate], 24 h, pH 5.5, particle sizes<150, 150-300 and >300 μm, 25° C.). (B) pseudo-second order fittings for RL, TL and CTL phosphate sorption (adsorbent dose 50 mg, 25 mL of 50 ppm [phosphate], 5 min-24 h, pH 5.5, particle size 150-300 μm, temperature 25° C.). Error bars represent the standard deviation from triplicate measurements FIGS. 30A-B show graphs illustrating low-resolution XPS spectra of TL, washed CTL, and RL. (A) XPS survey spectra for RL, TL, and CTL before P adsorption at pH 2.2. (B) XPS survey spectra for RL, TL, and CTL after P adsorption at pH 2.2.

Figure 1:
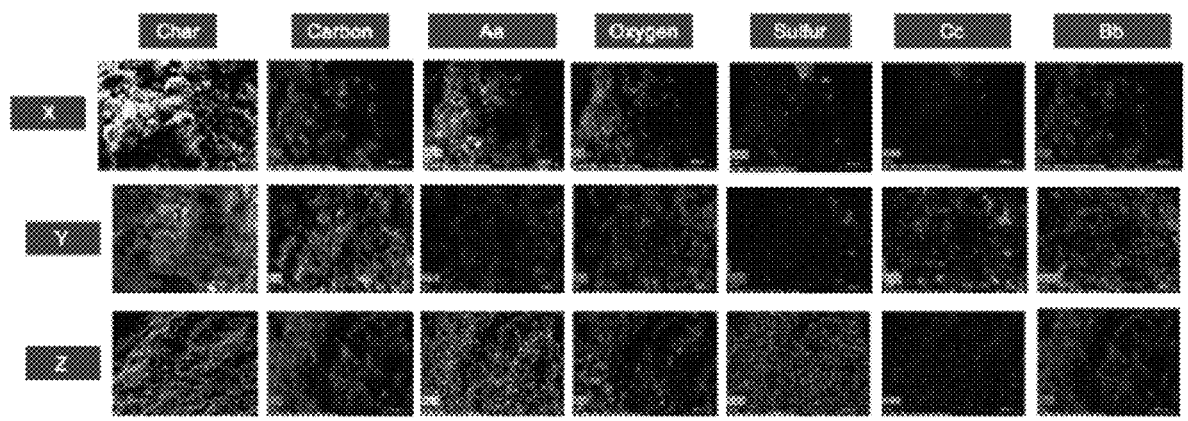
FIG. 1 shows electron images from SEM-EDS analysis.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are described herein.

Following long-standing patent law convention, the terms "a", "an", and "the" refer to "one or more" when used in this application, including the claims, unless the context clearly dictates otherwise. Thus, for example, reference to "a polypeptide" includes one or more of such polypeptides, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Provided herein, in some embodiments, are coal-based adsorbents. In some embodiments, the adsorbents include engineered coal-based lignite adsorbents, also referred to herein as coal char or biochar. In some embodiments, the coal-based lignite adsorbents include thermally-treated lignite (TL), which is lignite that has been pyrolyzed at elevated temperatures. For example, in one embodiment, raw lignite (RL) is pyrolyzed at 600° C. to form the TL. In some embodiments, the coal-based lignite adsorbents include chemically- and thermally-treated lignite (CTL), which is lignite that has been loaded with $Ca^{2+}$ and/or $Mg^{2+}$ cations and pyrolyzed at elevated temperatures. Additionally or alternatively, in some embodiments, the TL and/or CTL is washed with deionized (DI) water.

As compared to natural lignite coal, the engineered adsorbents disclosed herein include an increased and/or high surface area. In some embodiments, the surface area of TL is at least 100 times larger than that of RL and the surface area of CTL is at least 50 times larger than that of RL, when measured with the BET method using $N_2$ and a particle size of 150-300 µm. For example, in one embodiment, when measured with the BET method using $N_2$ and a particle size of 150-300 µm, RL includes an average surface area of about 0.4 $m^2/g$, TL includes an average surface area of at least about 40 $m^2/g$, and CTL includes an average surface area of at least about 20 $m^2/g$. In some embodiments, the surface area of TL is at least 40 times larger than that of RL and the surface area of CTL is at least 20 times larger than that of RL, when measured with the BET method using $N_2$ and a particle size of less than 150 µm. For example, in one embodiment, when measured with the BET method using $N_2$ and a particle size of less than 150 µm, RL includes an average surface area of about 2.9 $m^2/g$, TL includes an average surface area of at least about 120 $m^2/g$, and CTL includes an average surface area of at least about 60 $m^2/g$. In some embodiments, the surface area of TL and CTL is at least 3 times larger than that of RL, when measured with the BET method using $CO_2$ and a particle size of 150-300 µm. For example, in one embodiment, when measured with the BET method using $CO_2$ and a particle size of 150-300 µm, RL includes an average surface area of about 35 $m^2/g$, TL includes an average surface area of at least about 125 $m^2/g$, and CTL includes an average surface area of at least about 120 $m^2/g$.

Additionally or alternatively, in some embodiments, the TL and/or CTL include an increased average pore volume, a decreased pore diameter, an increased mesopore distribution, and/or an increased micropore distribution. For example, in one embodiment, TL includes an average pore volume of about 0.01 $cm^3/g$, about 0.1 $cm^3/g$, about 0.5 $cm^3/g$, or any combination, sub-combination, range, or sub-range thereof, when measured using $N_2$. In one embodiment, CTL includes an average pore volume of about 0.004 $cm^3/g$, about 0.005 $cm^3/g$, about 0.006 $cm^3/g$, or any combination, sub-combination, range, or sub-range thereof, when measured using $N_2$. In one embodiment, TL includes an average pore volume of about 0.02 $cm^3/g$, about 0.03 $cm^3/g$, or any combination, sub-combination, range, or sub-range thereof, when measured using $CO_2$. In one embodiment, CTL includes an average pore volume of about 0.015 $cm^3/g$, about 0.018 $cm^3/g$, about 0.02 $cm^3/g$, or any combination, sub-combination, range, or sub-range thereof, when measured using $CO_2$. In one embodiment, TL includes an average micropore volume of about 0.005 $cm^3/g$, about 0.01 $cm^3/g$, about 0.015 $cm^3/g$, or any combination, sub-combination, range, or sub-range thereof, when measured using $N_2$. In one embodiment, CTL includes an average micropore volume of about 0.002 $cm^3/g$, about 0.003 $cm^3/g$, about 0.004 $cm^3/g$, or any combination, sub-combination, range, or sub-range thereof, when measured using $N_2$.

Figures 26A, 26B, 26C:
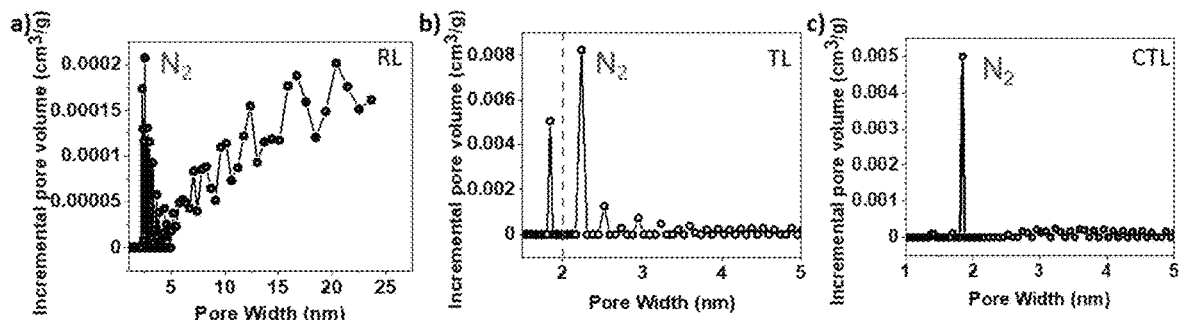
FIGS. 26A-F show graphs illustrating pore size distributions of RL, TL and washed CTL using NL-DFT. (A) Pore distribution of RL using $N_2$-DFT. (B) Pore distribution of TL using $N_2$-DFT. (C) Pore distribution of CTL using $N_2$-DFT. (D) Pore distribution of RL using $CO_2$-DFT. (E) Pore distribution of TL using $CO_2$-DFT. (F) Pore distribution of CTL using $CO_2$-DFT.

In one embodiment, TL has a higher mesopore fraction than RL. In another embodiment, TL includes a majority of pores with a width of less than 3 nm. In a further embodiment, TL includes a mesopore fraction distributed from 1.8 to 2.3 nm by $N_2$-DFT (FIG. 26B). In one embodiment, CTL is highly microporous. In another embodiment, CTL includes a majority of pores with a width of less than 2 nm. In a further embodiment, CTL includes pores narrowly distributed around 1.8 nm by $N_2$-DFT (FIG. 26C).

Without wishing to be bound by theory, it is believed that the increased surface area of the TL and CTL, as compared to RL, provides increased adsorbance of agricultural waste such as, but not limited to, nitrates and phosphates. Additionally, in some embodiments, the impregnation of the chemically-treated lignite with $Ca^{2+}$ and $Mg^{2+}$ provides increased adsorbance of agricultural waste as compared to TL and RL. For example, in one embodiment, the CTL provides phosphate uptake that is at least 6 and 14 times greater than TL and RL, respectively. Furthermore, in some embodiments, the unwashed CTL provides increased adsorbance as compared to washed CTL. For example, in one embodiment, the unwashed CTL provides at least 5 times more phosphate uptake than the washed CTL.

Due to the increased adsorbance as compared to RL, the engineered coal-based lignite adsorbents disclosed herein provide increased adsorbtion of phosphates, fertilizers, and other impurities in liquids. Accordingly, also provided herein, in some embodiments, are methods of water remediation and/or treatment of contaminated water, such as agricultural wastewater. In some embodiments, the method includes contacting the water or other suitable liquid with an adsorbent according to one or more of the embodiments disclosed herein. For example, in one embodiment, the method includes contacting wastewater with one or more of the engineered coal-based lignite adsorbents disclosed herein to remove phosphates, nitrates, and/or other fertilizers therefrom. Due to the high abundance of lignite coal, the methods disclosed herein provide low cost, environmentally-friendly water remediation and/or treatment of contaminated water.

Following water treatment and/or adsorption of phosphates, nitrates, or other impurities, the engineered coal-based lignite adsorbents disclosed herein may be desorbed to release the sorbents. Accordingly, further provided herein, in some embodiments, is a method of rebuilding or amending soil. In some embodiments, the method includes introducing nutrient laden engineered coal-based lignite adsorbents into the soil and desorbing the engineered lignite to release the nutrients into the soil. In some embodiments, the nutrient laden engineered coal-based lignite adsorbents provide a slow release of the nutrients over time (i.e., form a slow release fertilizer). In some embodiments, the nutrient laden engineered coal-based lignite adsorbents may be used to rebuild lost and depleted topsoil in agriculture and urban settings. For example, in one embodiment, the nutrient laden engineered coal-based lignite adsorbents are introduced in agriculture industry induced dead-zones to rebuild or amend the soil. As will be appreciated by those skilled in the art, the nutrient laden engineered coal-based lignite adsorbents may be loaded through use to treat contaminated water or specifically loaded with nutrients for the purpose of desorption.

Still further provided herein, in some embodiments, are methods of forming an engineered coal-based lignite adsorbent. In some embodiments, the method includes pyrolyzing lignite coal at 600° C. for 1 hour under $N_2$ to form thermally-treated lignite. In some embodiments, the method includes washing and drying raw lignite, impregnating RL with a solution of $MgSO_4$ and $CaSO_4$. In some embodiments, the solution is formed by combining a 10% aqueous $MgSO_4$ solution (10 g of $MgSO_4$ [0.083 mol] dissolved in 100 mL of water, [1.992 g of Mg]) and a 10% aqueous solution of $CaSO_4 \cdot 1/2H_2O$ (10 g of $CaSO_4 \cdot 1/2H_2O$ [0.069 mol] dissolved in 100 mL of water, [2.76 g of Ca]). Next, in some embodiments, 1.5 M aqueous KOH (350 mL, 29.4 g of KOH, 13.9% wt. of K) is added to the combined $MgSO_4$ and $CaSO_4 \cdot 1/2H_2O$ solution to adjust the pH to ~13.9. RL (100 g) is then stirred in the $Ca^{2+}$—$Mg^{2+}$ and KOH containing solution for 1 h and aged 24 h. Then, the resulting slurry is transferred into watch glasses, oven-dried (1 atm, 105° C., 4 h), and vacuum oven-dried (0-4.9 atm, 60° C. for overnight). After drying the solution is pyrolyzed, for example, at 600° C. in a muffle furnace under nitrogen at a 20° C./min ramp rate to 600° C., followed by holding at 600° C. 1 h.

The presently-disclosed subject matter is further illustrated by the following specific but non-limiting examples. The following examples may include compilations of data that are representative of data gathered at various times during the course of development and experimentation related to the presently-disclosed subject matter.

EXAMPLES

Example 1

This Example discusses the removal of phosphate by various lignite adsorbents. Low quality lignite coal has been engineered into coal char—a green adsorbent for polluted water remediation. Since the lignite material is not fully carbonized, it can be modified to adsorb phosphate fertilizers from agriculture wastewater. To prepare the coal char, the lignite is pyrolyzed after varied treatments in a muffle furnace under nitrogen. In this Example, the lignite was prepared with three different treatment modifications including: lignite that was pyrolyzed with salt and base; lignite that was not pyrolyzed with salt and base added, and lignite char that was pyrolyzed with salt and base added. The efficiency of each material was investigated in regard to contact time of the adsorbent with phosphate ranging from 5 minutes to 24 hours, pH levels between 2 to 12, temperature from 25° C. to 45° C., and initial concentration of 100 ppm to 500 ppm of the phosphate solution. The goals of this study were to characterize the adsorbents, optimize the adsorption parameters, and identify the best coal char material.

Introduction

Phosphorous is an essential mineral for the life. Living organisms use inorganic phosphorous to life processes in the form of $PO_4^{3-}$. Phosphates play major important structural roles in biological systems including nucleic acid (DNA and RNA) synthesis, ATP synthesis etc. They are also essential nutrients to plant growth and therefore phosphate fertilizers are common in markets. Its annual demand is increasing twice as fast as the growth of the human population which causes the large increase of phosphate consumption in $20^{th}$ century. Phosphate is contaminating wastewater through the use of agriculture fertilizers.

Phosphate is a major cause of eutrophication since it is often the limiting nutrient for explosive algal growth. Concentrations as low as 100 µg/L can cause eutrophication, which occurs as the dense growth of blue green algae and hyacinth-like plants, resulting in short and long-term ecological effects. Cyanobacterial blooms can release soluble neurotoxins and hepatotoxins, killing fish or livestock when ingested and causing severe hazardous health effects in humans. A typical raw domestic wastewater has a total phosphorus concentration of approximately 10 mg/L. Various point (agricultural, industrial and household effluents, waste disposal site leachates, and runoff from animal feedlots etc.) and nonpoint sources (agricultural and urban runoff, wetland conversion, and waterway developments) of environmental phosphates exist.

Depending on the rank, coal can be divided into four main groups; anthracite, bituminous, subbituminous and lignite. Lignite is a lowest grade coal containing a relatively low heat content. With an abundance of lignite present in the coal industry, an environmentally friendly usage of lignite is needed. Lignite, also known as brown coal, is a natural, inexpensive product that has pores that are capable of adsorbing metals in wastewater'. Its surface has a highly cross-linked structure of aromatic compounds containing carboxyl, phenolic functional groups which act as natural ion exchange sites. Through these sites, cations such as metal ions exchange with a higher affinity.

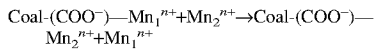

The objective of this study is to identify the optimal lignite adsorbent based on its absorption of phosphate from aqueous solutions. To achieve that, different types of lignite coal adsorbents were prepared and modified by adding different salts and bases into cheap lignite. Further, these adsorbents were characterized and optimized at various phosphate concentrations, contact time intervals, pH levels and temperatures.

Materials and Methods

Lignite coal was donated by a local coal company, magnesium sulfate, calcium sulphate, potassium hydroxide, concentrated sulfuric acid, ammonium molybdate, ascorbic acid. All the reagents were used analytical grade.

1. Preparation of Metal Loaded Lignite Adsorbents (X, Y)

As synthesized lignite (100 g) was mixed with 10% $MgSO_4$ (w/v %, 100 mL, 1.992 g of Mg) and 10% $CaSO_4$ (w/v %, 100 mL, 2.76 g of Ca) into it. After stirring the solution well, 1.5M KOH 350 mL was added and vigorously shaken. This suspension was kept in a vacuum oven overnight to completely dry. Half of the dried material was pyrolyzed at 600° C. for 1 h under nitrogen to produce adsorbent, X. Rest was washed, filtered and dried to produce adsorbent, Y.

2. Preparation of Metal Loaded Lignite Char Adsorbents (Z)

Pyrolyzed lignite (10 g, 600° C., 1 h, $N_2$) was mixed with 10% $MgSO_4$ (w/v %, 10 mL, 0.1992 g of Mg) and 10% $CaSO_4$ (w/v %, 10 mL, 0.276 g of Ca) and stirred well. Then, 1.5M KOH (350 mL) was added to this and vigorously shaken. The mixture was pyrolyzed at 600° C. for 1 11 under $N_2$ to produce adsorbent, Z.

3. Preparation of Solutions

The reducing solution for the phosphate analysis was prepared according to the ammonium molybdate method which has been developed previously. A stock Solution of phosphate was prepared by dissolving 1.81 grams of $K_2HPO_4$ into 1 liter of deionized water in a 1000 mL volumetric flask. Five different calibration standards prepared by diluting the stock solution of phosphate. The 100 mg/L working solution was prepared by diluting the stock solution in a 500 mL volumetric flask.

4. Adsorption Experiments

The experiment was performed by adding 0.05 grams of biochar into 25 mL of the working solution of phosphate (100 mg/L) in sealed vials. The vials were placed in a temperature-controlled shaker for 24 hours [200 rpm, 25±0.5° C.] to achieve equilibrium. Once removed from the shaker, the vials were filtered through 11 μm filter papers and residual phosphate concentrations were determined using a UV-Vis Spectrophotometer. The adsorption of phosphate was read using the UV-Vis Spectrophotometer at a wavelength of 830 by comparing the samples to the five calibration standards.

4.1 Effect of Initial Concentration

Each of the adsorption experiments was completed to test how the three coal chars are able to absorb phosphate from wastewater. The three coal chars are: lignite that was pyrolyzed with salt and base added (X); lignite that was not pyrolyzed with salt and base added (Y), and lignite char that was pyrolyzed with salt and base added (Z).

To investigate how the initial concentration affects the removal of phosphate, the experiment was performed by adding 0.05 grams of biochar into 25 mL of the working solution of phosphate in sealed vials. The working solutions varied in concentration using 100 ppm, 200 ppm, 300 ppm, 400 ppm and 500 ppm. The vials were placed in a temperature-controlled shaker for varied periods of time [200 rpm, 25±0.5° C.] to achieve equilibrium. Once removed from the shaker, the vials were filtered through 11 μm filter papers and residual phosphate concentrations were determined by developing the color.

4.2 Effect of Time

To investigate the effect of time on phosphate removal, the experiment was performed by adding 0.05 grams of biochar into 25 mL of the working solution of phosphate in sealed vials. The vials were placed in a temperature-controlled shaker for varied periods of time [200 rpm, 25±0.5° C.] to achieve equilibrium. The contact time ranged from 5 minutes, 30 minutes, and then hourly up to 24 hours. Once removed from the shaker, the vials were filtered through 11 μm filter papers and residual phosphate concentrations were determined by developing the color.

4.3 Effect of pH Level

To investigate how the pH level affects the removal of phosphate, the experiment was performed by adding 0.05 grams of biochar into 25 mL of the working solution of phosphate in sealed vials. The stock solutions were tested over a pH range of 2 through 12 after making it more acidic or basic. The vials were placed in a temperature-controlled shaker for 24 hours [200 rpm, 25±0.5° C.] to achieve equilibrium. Once removed from the shaker, the vials were filtered through 11 μm filter papers and residual phosphate concentrations were determined by developing the color.

4.4 Effect of Temperature

To investigate how the temperature affects the removal of phosphate, the experiment was performed by adding 0.05 grams of biochar into 25 mL of the working solution of phosphate in sealed vials. The vials were placed in a temperature-controlled shaker for 24 hours [200 rpm] with varied temperatures to achieve equilibrium. The experiment was completed at 35±0.5° C. and 45+0.5° C. Once removed from the shaker, the vials were filtered through 11 μm filter papers and residual phosphate concentrations were determined by developing the color.

5. Data Evaluation

The raw data collected using the UV-Vis Spectrophotometer must be used to identify the absorbance of phosphate for each experiment. The following equations were used.

$$C_e = C_i - C_f$$

$$\text{Adsorption capacity } (q_e) = \frac{(c_i - c_f) * V}{m}$$

$$\%PO_4^{3-} = \frac{(c_i - c_f) * 100}{c_i}$$

m=mass of the adsorbent (g)

6. Characterization Techniques

The following tests were completed to characterize the three adsorbents. The surface areas, pore sizes and pore volumes were determined by BET adsorption method (BET), t plot and Dubinin-Astakhov methods run on Micromeritics Tristar II Plus surface analyzer at 77 K. Samples were degassed under vacuum prior to analysis. Surface morphologies were compared using scanning electron microscopy (SEM) and energy dispersive x-ray spectroscopy (SEM-EDS). Biochar surfaces were scanned by a SEM (JEOL JSM-6500F FE-SEM) operated at 5 kV. Elemental analysis (C, H, N and O) was performed using an elemental combustion system CHNS—O (ECS 4010, Costect Analytical Technologies Inc.).

Results and Discussion

1. Characterization of Coal Chars

Based on the BET method, coal char Z has the highest surface area and pore diameter. Coal char X has the lowest pore diameter, and coal char Y has the lowest surface area. The following table compares the BET, micropore volume and pore diameter for each of the coal chars.

TABLE 1

Determination of BET surface areas, micropore volumes, and pore sizes of adsorbents

| Coal Char | BET [m^2/g] | Micropore Volume [cm^3/g] | Pore Diameter [A°] |
|---|---|---|---|
| X | 2.8 | 0.000006 | 19 |
| Y | 0.9 | 0.000097 | 23 |
| Z | 4.1 | 0.000005 | 33 |

By completing the SEM-EDS analysis, electron images of each coal char can be found in FIG. 1. Carbon, magnesium (Aa), oxygen, sulfur, potassium (Cc) and calcium (Bb) can be found in all of the adsorbents.

2. Effect of Adsorption Parameters for Phosphate Removal by X

Figure 2A:
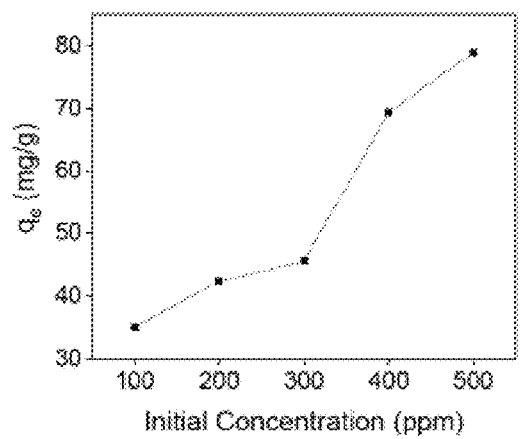
FIGS. 2A-E show graphs illustrating the effect of initial concentration, time, and pH. Effect of initial concentration at temperature 35° C. and 45° C.
Figure 2B:
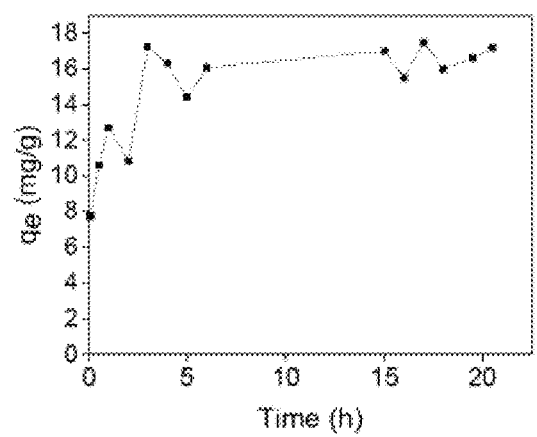
Figure 2C:
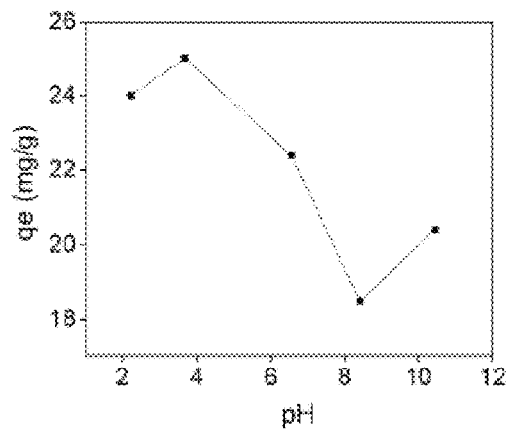
Figure 2D:
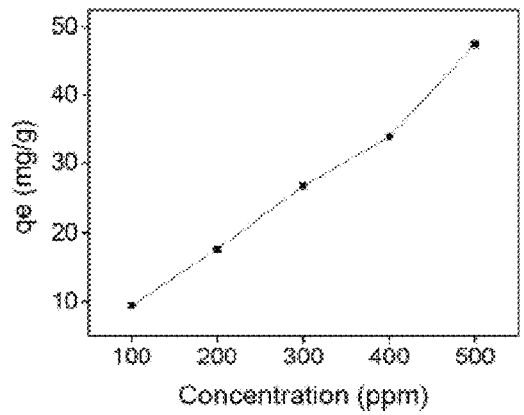
Figure 2E:
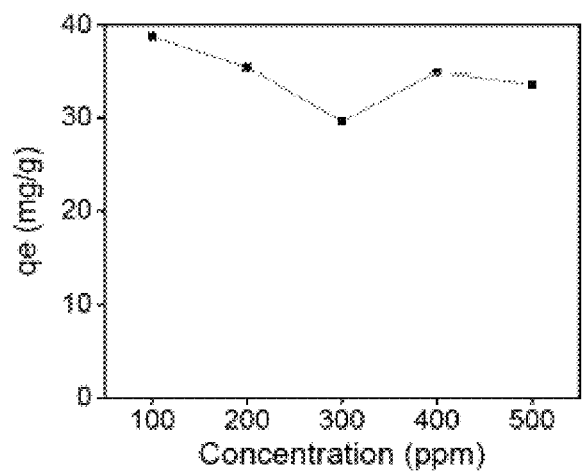

This section examines the absorbance of phosphate using adsorbents X, Y and Z based on varied factors. These factors are concentration, contact time, pH and temperature. First, the maximum absorbance of phosphate for the initial concentration is 80 mg/g at 500 ppm. As the initial concentration increases, the absorbance increases, as seen in FIG. 2A. With a 100 ppm concentration, the maximum absorbance of phosphate for the kinetics study is 18 mg/g at 17 hours. As the contact time increases, the absorbance increases until it hits equilibrium around 5 hours, as seen in FIG. 2B. At a concentration of 100 ppm, the maximum absorbance of phosphate at various pH levels is 25 mg/g at pH level FIG. 2C. As the pH level increases, the absorbance generally decreases. The maximum absorbance of phosphate at a temperature of 35° C. is 47 mg/g at 500 ppm FIG. 2D. As the concentration increases, the absorbance increases. The maximum absorbance of phosphate at a temperature of 45° C. is 39 mg/g at 100 ppm. As the concentration increases, the absorbance decreases, as seen in FIG. 2E.

3. Effect of Adsorption Parameters for Phosphate Removal by Y

This section examines the absorbance of phosphate using coal char Y based on varied factors. These factors are concentration, contact time, pH and temperature.

Figure 3A:
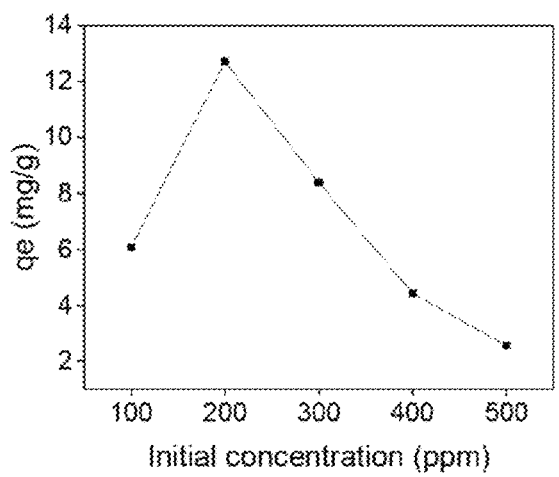
FIGS. 3A-D show graphs illustrating the effect of initial concentration, time, and pH. Effect of initial concentration at temperature 35° C.
Figure 3B:
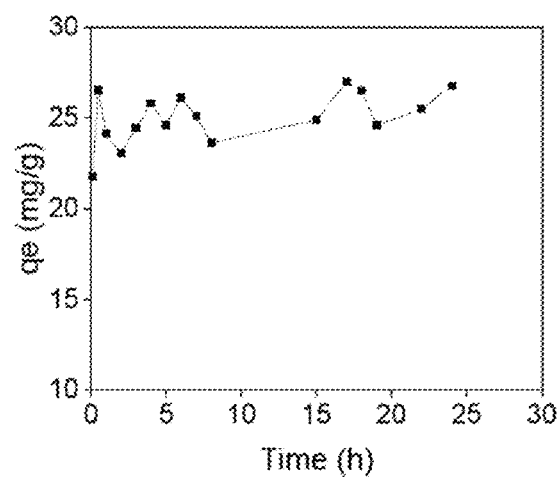
Figure 3C:
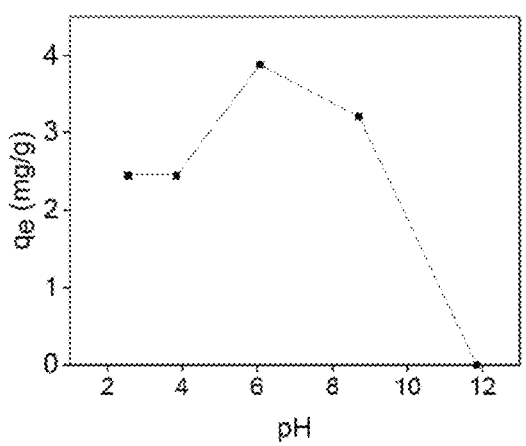
Figure 3D:
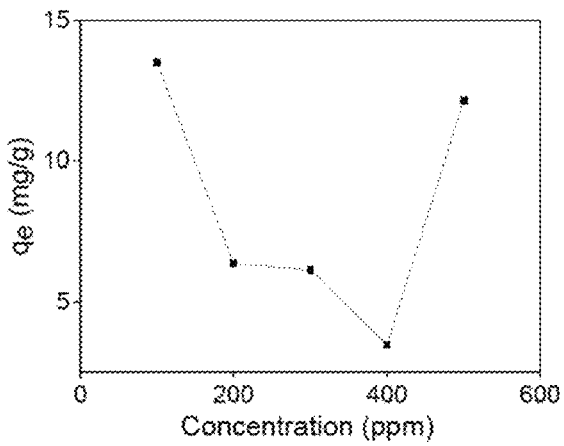

First, the maximum absorbance of phosphate for the initial concentration is 13 mg/g at 200 ppm. As the initial concentration increases, the absorbance decreases with the exception of 100 ppm, as seen in FIG. 3A. With a 100 ppm concentration, the maximum absorbance of phosphate for the kinetics study is 27 mg/g at 17 hours. As the contact time increases, the absorbance generally increases and hits equilibrium around 2 hours, as seen in FIG. 3B. At a concentration of 100 ppm, the maximum absorbance of phosphate at various pH levels is 4 mg/g at pH level of 6. As the pH level increases, the absorbance increases until a pH level of 6, where it then proceeds to decrease, as seen in FIG. 3C. The maximum absorbance of phosphate at a temperature of 35° C. is 14 mg/g at 100 ppm. As the concentration increases, the absorbance decreases until 400 ppm, where it then increases at 500 ppm, as seen in FIG. 3D.

4. Effect of Adsorption Parameters for Phosphate Removal by Z

Figure 4A:
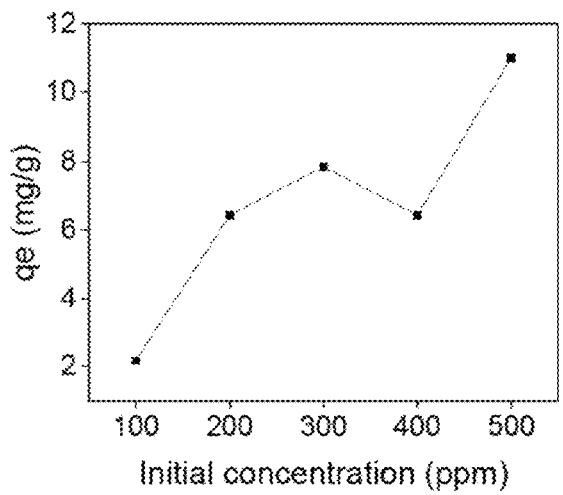
FIGS. 4A-D show graphs illustrating the effect of initial concentration, time, and pH. (A) Initial concentration. (B) Time. (C) pH. (D) Effect of initial concentration at temperature 35° C.
Figure 4B:
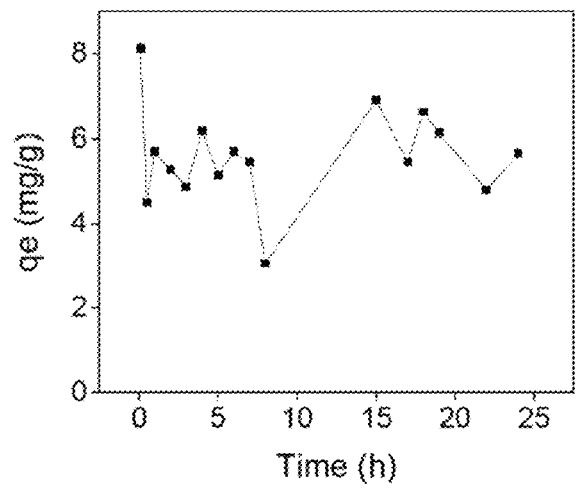
Figure 4C:
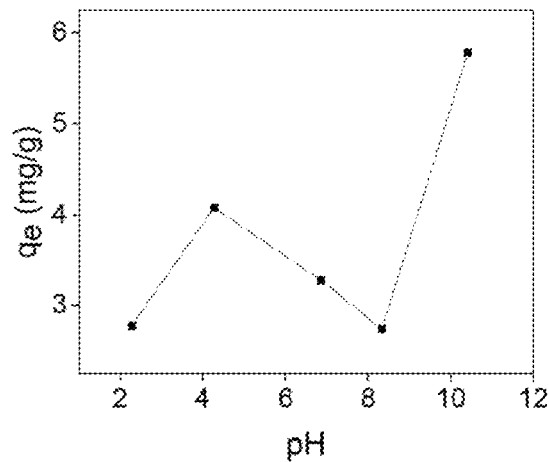
Figure 4D:
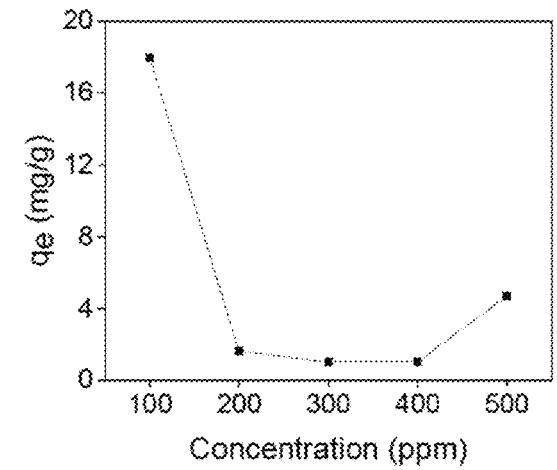

This section examines the absorbance of phosphate using coal char Z based on varied factors. These factors are concentration, contact time, pH and temperature. First, the maximum absorbance of phosphate for the initial concentration is 11 mg/g at 500 ppm. As the initial concentration increases, the absorbance increases with the exception of 400 ppm, as seen in FIG. 4A. With a 100 ppm concentration, the maximum absorbance of phosphate for the kinetics study is 8 mg/g at 0 hours. As the contact time increases, the absorbance fluctuates up and down, and it hits equilibrium around 2 hours, as seen in FIG. 4B. At a concentration of 100 ppm, the maximum absorbance of phosphate at various pH levels is 6 mg/g at pH level of 10. As the pH level increases, the absorbance fluctuates up and down, as seen in FIG. 4C. The maximum absorbance of phosphate at a temperature of 45° C. is 18 mg/g at 100 ppm. As the concentration increases, the absorbance decreases with the exception of 500 ppm, as seen in FIG. 4D.

TABLE 2

Maximum adsorption capacity values for four parameters. Concentrations are also shown here.

| Coal Char | Initial Concentration [mg/g] | Kinetics [mg/g] | pH [mg/g] | Temperature at 35° C. [mg/g] | Temperature at 45° C. [mg/g] |
|---|---|---|---|---|---|
| X | 80 at 500 ppm | 18 at 100 ppm | 25 at 100 ppm | 47 at 500 ppm | 39 at 100 ppm |
| Y | 13 at 200 ppm | 27 at 100 ppm | 4 at 100 ppm | 14 at 100 ppm | |
| Z | 11 at 500 ppm | 8 at 100 ppm | 6 at 100 ppm | | 18 at 100 ppm |

Conclusion

The study of phosphate removal by the three lignite adsorbents has shown that lignite coal is effective in removing phosphate from a solution because it is not fully carbonized. Based on the experiments that have been completed, coal char X is the most optimal as it has largest absorbance for initial concentration, pH level and temperature tests. This coal char can be developed to reduce emissions and remove phosphate fertilizers from agriculture wastewater. Moving forward, the ideal adsorption parameters for the coal char need to be tested, as well as coal char Y at 45° C. and Z at 35° C. Once those tests are complete, the ideal coal char can be determined with clear evidence.

Example 2—Preparation and Characterization of Nutrient Enriched Biochar/Coal for Soil Amendment Commercial fertilizers and manures are known for aiding plant growth and development, but their continued usage has been linked to environmental and economic challenges. Both biochar and coal lignite products have shown promising results as alternative cost-effective and ecologically friendly materials for improving soil fertility and plant growth. However, limited research has been done to evaluate their use as a soil additive on a large-scale basis.

The coal industry is in decline due to fierce competition from green energy sources and rising concern about carbon emissions. Many jobs have been lost as a result. However, coal lignite-based soil amendment and wastewater treatment show potential to be profitable and marketable green coal products. This Examples discusses the preparation and characterization of nutrient enriched biochar/coal lignite.

Discussion

Figure 5A:
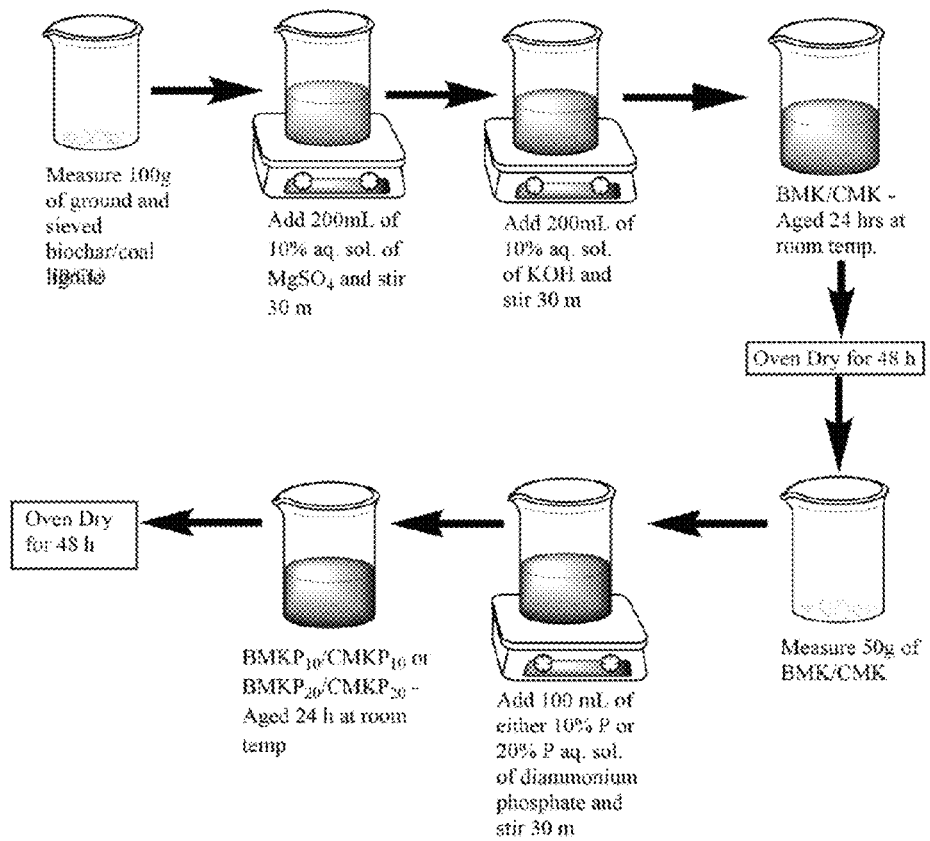
FIGS. 5A-B show schematics illustrating preparation of biochar. (A) Preparation of coal/biochar for lab. (B) Chemical process for scale up.
Figure 5B:
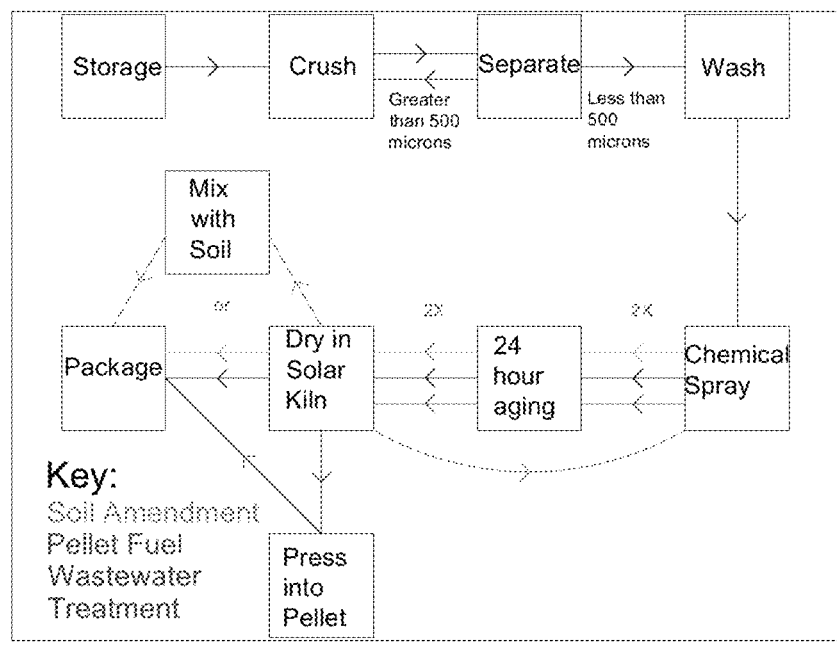

The nutrient enriched biochar and coal lignite were produced by treating Douglas fir biochar/coal lignite successively with aqueous solutions of $MgSO_4$, KOH, and $(NH_4)_2HPO_4$ (FIG. 5A). A schematic of the chemical process to be scaled up is shown in FIG. 5B.

Figure 6A:
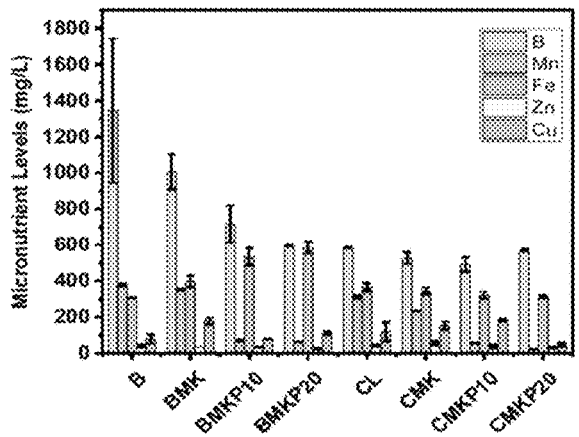
FIGS. 6A-F show (A) Micronutrients following treatment. (B) Macronutrients following treatment. (C) Electrical conductivity, ash content, and pH following treatment. (D) Volatile organic component concentration following treatment. (E) Ratios of O/C, H/C, and C/N following treatment. (F) Heavy metal levels following treatment.
Figure 6B:
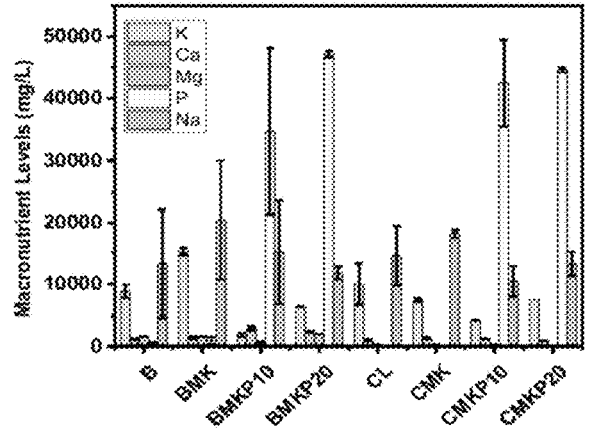
Figure 6C:
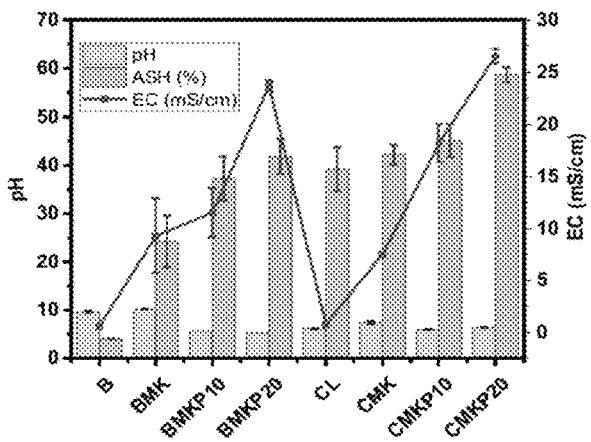

Treatment had varying effects on both micronutrients (FIG. 6A) and macronutrients (FIG. 6B). For micronutrients, following treatment, the values for copper and zinc both fell under the maximum threshold give by the International Biochar Initiative (IBI)[2]. Additionally, iron levels increased in biochar but decreased in coal after treatment. For macronutrients, no P was originally detected in CL. However, as expected, P levels in both coal lignite and biochar greatly improved after treatment with diammonium phosphate. Referring to FIG. 6C, electrical conductivity and ash content both increased consistently upon modification, whereas pH generally did not follow the same trend. More specifically, after treatment with diammonium phosphate, all pH values were below 7, while ash content was all over 30%.

Figure 6D:
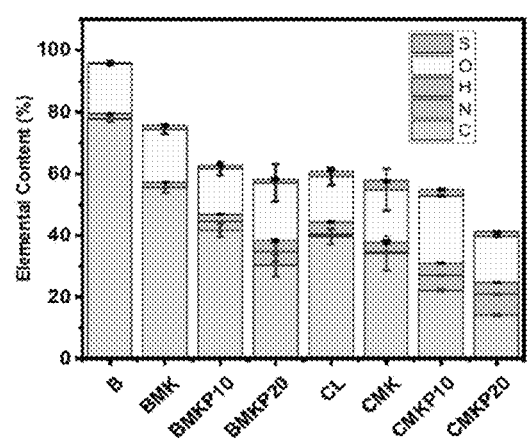
Figure 6E:
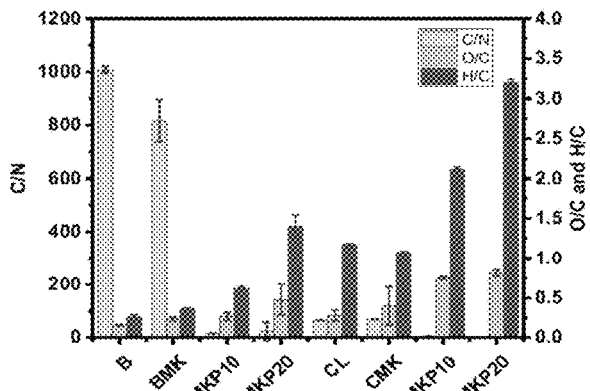

As shown in FIG. 6D, volatile organic components decreased after treatment. Without wishing to be bound by theory, it is believe that the decrease in volatile organic components was due to an increase in ash content. Turning to FIG. 6E, the O/C ratio and H/C ratio both showed a general increase after treatment, while the C/N ratio decreased. The increase in the O/C ratio implies more oxygen was loaded to absorbent surfaces in the form of $H_2PO_4^-$ and $HPO_4^{2-}$. An increase in O-functional groups tends to increase the water holding capacity in soil[3]. The heightened H/C ratio does lead to lower stability though[2].

Figure 6F:
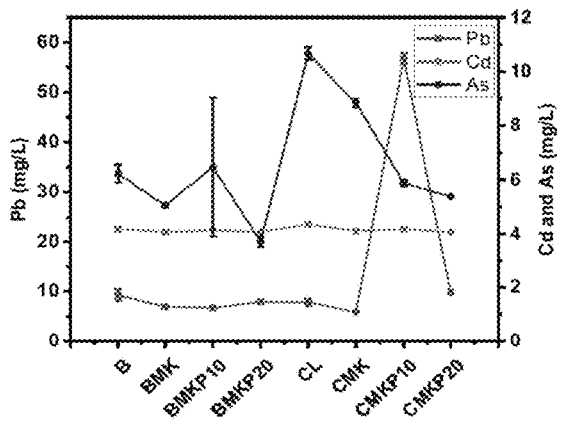

Arsenic levels in biochar should be below 100 mg/kg[2]. The highest level of arsenic detected in any samples was the value for unmodified coal lignite, 10.7 mg/kg. Cadmium has a maximum allowable threshold of 39 mg/kg[2]. Our levels were all around 4 mg/kg. The highest detected level of cadmium in any sample was also found in CL, 4.35 mg/kg. Lead has a maximum allowable threshold of 300 μmg/kg[2]. One value stood out as the highest concentration of lead at 47.0 mg/kg higher than the next highest value; this value was 56.7 mg/kg for $CMKP_{10}$. As shown in FIG. 6F, all heavy metal concentrations were well below maximum thresholds.

These results indicate that nutrient enriched biochar/coal lignite may be able to release essential plant nutrients in soil, and hence, it would be suitable for use as an alternative low cost and ecofriendly soil additive.

Example 3—Pyrolyzed Ca-Impregnated Lignite for Aqueous Phosphate Removal: Batch and Column Studies Abstract Lignite is an abundant carbon material with a variable surface structure and low cation density The introduction of metal (hydr)oxide phases has improved the anionic binding potential of lignite. In this study, activated lignite (A-L), $Ca^{2+}$-modified lignite (Ca-L), and $Ca^{2+}$-modified activated lignite (Ca-A-L) were synthesized to remove aqueous phosphate. Lignite was first activated (KOH: lignite, mass ratio, 3:1) at 750° C. to prepare A-L, improving its surface area by ~984-fold. Ca-L (27 wt % Ca) showed a large phosphate uptake (227.3 mg/g) (adsorbent dose 50 mg, 25 mL of 10-1500 ppm phosphate, 24 h, 25° C., initial pH 6), due to the large amounts of micro-sized $CaCO3$, $Ca(OH)2$, and CaO particles in Ca-L. These particles actively precipitate phosphate/hydrophosphate as $CaHPO4/Ca3(PO4)2$. The breakthrough capacity of a 2.0 g Ca-L bed column (bed height 2.5 cm, diameter 1 cm) was 58.2 mg/g (flow rate 1.5 mL/min, 25° C., initial $[PO_4^{3-}]$=46.6 mg/L, particle size, 125-150 μm), ~4 fold lower than the maximum Langmuir sorption capacity. An interference study indicated that Ca-L is highly selective for phosphate. Spent Ca-L may improve soil fertility as it retains more phosphate species for later slow-release to the soil. Unit weight of phosphate can be removed by Ca-L more inexpensively than Norit ROW and Darco KB (two commercial activated carbon carbons). Precipitated $Ca^{2+}$ phosphates/hydrophosphates in exhausted Ca-L can be recovered using HCl and Ca-L recycled. Moreover, low-cost lignite is a promising carbon support for the future synthesis of different value-added products.

Introduction

Water quality degradation resulting from eutrophication is a global environmental and economic problem. High phosphorus concentration is an obstacle in effluent desalination. When the phosphorus concentration in water exceeds 100 μg/L, harmful algal blooms occur. The USEPA recommends limiting the orthophosphate (bioavailable form of P) levels below 10 μg/L in water bodies. Point (e.g., sewage effluent) and non-point (e.g., agricultural run-off) sources contribute to eutrophication. Phosphate can be removed via biological (using microbes, microalgae, and halophytes), physical (size exclusion, membrane filtration, and adsorption), and chemical (precipitation, flocculation, and coagulation) methods. Each suffers from different pitfalls like membrane fouling, unrecoverable precipitates, and large space needs. Adsorption is a simple way to reduce pollutant levels in complex environmental matrices.

Lignite is abundant in many countries, and was utilized in environmental remediation. Cation-deficient lignite achieved a poor (0.19 mg/g) phosphate removal at an 5 mg/L initial phosphate concentration and pH 2.3. Therefore, the carbonaceous surfaces should be modified with cations. Recent anionic adsorptive remediation has included a La-modified granular ceramic, a mesoporous silica and ligand embedded composite, an Al-modified biochar, bifunctional nanocomposites, UiO-66 nanocomposites, MgO-modified biochars, dolomite-modified biochar, magnesium oxide nanoflake-modified diatomite adsorbents, and a $Mg(OH)_2/ZrO_2$ composite. The $K_{sp}$ values of metal-phosphate complexes determine their phosphate removal performance. $Ca^{2+}$ and $Fe^{2+}/Fe^{3+}$ have low $pK_{sp}$ values with phosphates and demonstrated high phosphate removal efficiencies. A well-dispersed nano-CaO on $Ca^{2+}$-modified sludge carbon ($CaCO_3$/sludge=1:2) removed 117 mg/g aqueous phosphate via hydroxylapatite formation ($pK_{sp}$=53.28 at 25° C.).

This study describes the preparation of three lignite-based materials for phosphate mitigation. $Ca^{2+}$-modified lignite (Ca-L) exhibited a high phosphate uptake (227.3 mg/g at 25° C.), due to its high Ca content (27 wt % Ca). Activated lignite (A-L) is highly porous (SBET=2854 m$^2$/g) and having a higher phosphate removal ability than lignite (8.0 mg/g vs 5.2 mg/g). A-L was used to introduce a greater amount of $Ca^{2+}$, followed by calcination at 800° C., which generates $Ca^{2+}$-modified activated lignite (Ca-A-L). But, Ca-A-L had only a 1 wt % C (bulk C), therefore, its adsorption behavior was not further investigated. Sorption isotherms were conducted at optimized pH values (pH 5.5, 5, and 6 for lignite, A-L, and Ca-L) and an environmentally relevant pH value (pH=7). The column performance, synthetically polluted real wastewater, and interference studies were performed. Phosphate (per gram) removal cost in Ca-L is 3 times less than lignite. Owing to high phosphate uptake, easy regeneration using HCl, high phosphate selectivity, and 100% phosphate removal from simulated wastewater, Ca-L has more practical importance than other sorbents in the study. Spent Ca-L after heavy phosphate loading can be used as a potential slow-release fertilizer.

Materials and Methods

1. Materials

Figure 8A:
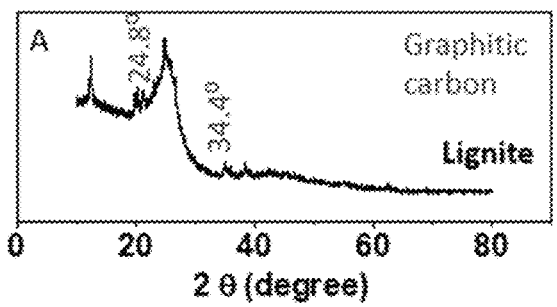
FIGS. 8A-D show graphs illustrating XRD analysis of lignite and various lignite adsorbants. (A) lignite. (B) A-L. (C) Ca-L before P uptake. (D) P-laden Ca-L after P uptake.

Lignite (−100 g) from Mississippi Lignite Mining Company, Ackerman, Miss., USA was washed, oven-dried (1 atm, air, 100° C., 48 h), ground for 2 min (high-speed multifunctional grinder, 36,000 revolutions/min, model no: HC150T2) and sieved (150-300 μm). XRD data shows the presence of graphitic carbon (2θ=24.8° and 34.4°) in lignite (FIG. 8A) in agreement with our previous studies. Further, this lignite has a high $SiO_2$ content (−19.9%). Analytical grade (Sigma Aldrich) calcium hydroxide, ferric chloride, ferrous sulfate heptahydrate, sodium hydroxide, concentrated sulfuric acid, ammonium molybdate, and ascorbic acid were purchased and used.

2. Preparation of Activated-Lignite (A-L)

KOH-activated lignite was produced as per. Lignite (10 g) was mixed with an aqueous KOH solution (30 g in 50 mL), (3:1, mass ratio) in a 250 mL Erlenmeyer flask and vigorously stirred for 1½ h at 65° C. This mixture (90 g) was kept in a ceramic crucible and oven-dried (1 atm) at 105° C. overnight. This mixture was carbonized in a muffle furnace under $N_2$. Pyrolysis employed a 50° C./min ramp rate to 750° C., followed by holding at 750° C. 1 h. After cooling, (27.1 g) (67.8% yield) of solid crude A-L was obtained. Preliminary pyrolyzes were performed at 650, 750, and 850° C. Pyrolysis at 750° C. produced the maximum activated carbon surface area and was chosen as the optimum production temperature of this synthesis. This KOH modified lignite (A-L) (27.1 g), was neutralized with aqueous 37% wt. HCl (50 mL, once), followed by washing with DI water (−1500 mL) and oven-drying (105° C., overnight) to give a 2.2 g (22% yield based on starting lignite) of A-L.

3. Production of $Ca^{2+}$-modified lignite (Ca-L) and $Ca^{2+}$-modified activated lignite Calcium-modified lignite (Ca-L) was prepared using conventional wet impregnation. $Ca(OH)_2$ (10.0 g) was added into DI water (50 mL). Pre-dried raw lignite (10.0 g) was added into this viscous solution, then this solution was stirred overnight, and oven-dried (105° C., 1 atm) for 24 h. After drying, a weight of 19.2 g was obtained. This solid was carbonized in a muffle furnace under $N_2$. Pyrolysis employed a 20° C./min ramp rate to 800° C., followed by holding at 800° C. for 2 h. This heat treatment resulted in $Ca(OH)_2$, CaO, and CaCO3 phases on the surface. After cooling, a 15.8 g (79% yield based on both $Ca(OH)_2$ and lignite) of Ca-L was obtained. The resulting solid (Ca-L) was washed with −1000 mL of DI water (pH 7). The adsorbent washing was required to remove residual 3.7 g of $Ca^{2+}$ oxides/hydroxides loosely attached to the lignite. Water washing caused a non-avoidable dissolution of surface $Ca^{2+}$ oxide/hydroxide, and possibly some carbonate into the washing waters (FIG. 9C). This washed product was oven-dried (105° C., 48 h) before doing any adsorption experiments, producing a weight of 12.1 g (C yield, 35.4% yield based on starting lignite). Calcium-modified activated lignite (Ca-A-L) was prepared using the same synthesis conditions, but starting with activated lignite, instead of lignite. Ca-A-L has almost no remaining carbon (<1%), after the two calcination steps used; to pyrolyze A-L at 750° C. and then to carbonize at 800° C. after treating with $Ca^{2+}$. Further characterization and sorption behavior of Ca-A-L was not assessed.

4. Material Characterization

Detailed characterization methods are provided in the Supporting Information. The pH values of NaCl solutions (25 mL in each) were adjusted using 1 M NaOH and 1 M HCl to determine the adsorbents' point of zero charge. Scanning electron microscopy employed a JEOL JSM-6500F FE-SEM operated at 5 kV. EDS spectroscopy was performed on a Zeiss, EVO 40 scanning electron microscope with a BRUKER EDX system. C, H, and N bulk elemental analyses were performed using an ECS 4010 elemental combustion system (Costect Analytical Technologies Inc.). Powder X-ray diffraction patterns recorded on a Rigaku ultima III instrument (Cu—$K_\alpha$ ($\lambda$=1.54 nm)) and crystallographic structures in adsorbents were identified before and after $PO_4^{3-}$ sorption. Functional groups or elemental oxidation states on pre- and post-$PO_4^{3-}$ sorbed surfaces were determined using X-ray photoelectron spectroscopy (Thermo Scientific K-Alpha XPS system). The complete acid digestion of Ca-L (1 g) was performed to determine its Ca content.

5. Adsorption experiments

Adsorptions were investigated using the batch experiments conducted in a Thermo Forma Orbital Shaker (200 rpm, 25±0.5° C.) run 24 h at varied pH levels. Unless otherwise specified, 0.05 of the adsorbents and 50 ppm phosphate (25 mL) were used in each experiment. Adsorption experiments were conducted in triplicate. The effect of pH on phosphate adsorption was conducted under environmentally relevant pH conditions (i.e., pH=5.0-9.0). A 24 h kinetic study was conducted, removing the samples at predetermined times (from 5 min to 24 h). Phosphate-laden adsorbents were filtered using 11 μm filter paper and preserved for later analysis. Phosphate sorption on filter papers was negligible. Adsorption isotherm experiments were conducted by varying the phosphate concentrations from 25 to 1500 ppm at 25, 35, and 45° C.

Phosphate concentrations in the filtrates were acquired by a Shi-madzu UV-2550 double beam spectrophotometer at 830 nm using the ascorbic acid method. Batch sorption data were analyzed using Excel and Origin 2020 software. The phosphate ion adsorption capacities ($q_e$) were determined as:

$$q_e = \frac{(c_i - c_e)}{m} V$$

Removal efficiency (R %) was calculated as $$R\% = \frac{(c_i - c_e)}{c_i} \times 100\%$$

Here, $C_i$=initial liquid-phase phosphate adsorbate concentration (mg $L^{-1}$), $C_e$=equilibrium liquid-phase phosphate adsorbate concentration (mg $L^{-1}$); V=volume of phosphate solution (L); m=mass of adsorbent used (g).

6. Fixed-Bed Column Experiments

The fixed-bed column study was conducted with Ca-L using a C-18 empty cartridge (BOND Elut., internal diameter of 1 cm) as the column. The column was packed with 2.00 g of the Ca-L (particle size 125-150 μm), generating an adsorbent bed height of 2.5 cm between two supporting layers of glass wool (occupied bed volume, 2 cm³ and un-occupied bed volume=2 mL). An aqueous solution of phosphate (total volume, ~3.3 L, influent phosphate concentration, 46.6 mg/L, pH 7, and 25° C.) was pumped from bottom to top of the column using a single StEPTM pump (w/o fittings) equipped with an average flow of 1.5 mL/min.

The Ca-L bed allowed for a constant non-zero permeability at room temperature (25° C.). Effluent samples were collected at regular time intervals (7.5 mL in each 5 min) to determine the phosphate concentration. The effluent flow was continued until there was no further adsorption. The breakthrough curve was expressed as $C_t/C_o$ as a function of effluent time/volume for a given bed height.

Experimental Methods

1. Characterization Methods 1.1 Elemental Analysis, Moisture, and Ash Contents

Elemental analysis (elemental combustion system, model no: ECS 4010, Costect Analytical Technologies Inc.) was performed using a dry combustion method. Moisture contents of the samples were determined by incinerating ~1 g of each, in an oven for 2 h (105° C.) and measuring the weight loss (as a percentage) after drying. Ash contents were determined by keeping the samples in uncovered ceramic crucibles in a muffle furnace, and heating at 750° C. (heating rate, 20° C./min) for 4 h.

$$\text{Ash percentage} = m3 - m2/m2 - m1 \times 100\%$$

Where, $m_1$ is weight of the empty crucible, $m_2$ is the weight of the crucible with the sample and $m_3$ is the weight of the crucible with the ash.

1.2 Ca2+ Content in Ca-L

The total $Ca^{2+}$ content in Ca-L was quantified using complete acid digestion (1 g of Ca-L) in 1:1 mixture of 70% $HNO_3$: 95% $H_2SO_4$ (50 mL) and measuring the $Ca^{2+}$ concentration in the filtrate using Inductively Coupled Plasma Mass Spectrometry (ICP-MS).

1.3 XRD Analysis

Crystallographic structures formed on adsorbent surfaces after and before phosphate binding were determined using an X-ray diffraction spectrophotometer for 2h=20-90° (step size~0.05°, scan 3 s per step).

2. Batch Sorption Experiments 2.1 Phosphate Determination-Ascorbic Acid Method

Under acidic conditions, the phosphate forms a complex with ammonium molybdate (named the molybdenum phosphate complex), which is reduced by ascorbic acid. The color of the medium changed to blue, and concentration was measured at 830 nm ($\lambda_{max}$) by UV-Vis spectroscopy.

$$H_3PO_4 + 12(NH_4)_2Mo_7O_{24} \cdot 4H_2O \rightarrow 7(NH_4)_3[PO_4(MoO_3)_{12}] + 51NH_4^+ + 51OH^- + 33H_2O \; \varepsilon = 25670 \; dm^3 \, mol^{-1} \, cm^{-1}$$

3. XRD Analysis

Particles are made from single or several crystallites. Particle size is greater than the crystallite size if is made from several crystallites. The average coal crystallite size was calculated using,

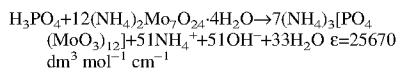

Where, $\lambda$=wavelength of X-ray radiation ($\lambda$=0.15405 nm) $B_{100}$=full width half maximum (FWHM) corresponding to 100 peaks (FWHM was obtained using OriginLab software) $\theta_{100}$=half of the diffraction angle of 2θ

4. Column Study

The breakthrough curve is usually expressed by $C_t/C_0$ as a function of time or volume of the effluent for a given bed depth (Han et al., 2009a,b; Kundu et al., 2004; Aksu and Gonen, 2004). Here, $C_t$=phosphate concentration at time "t", $C_0$=initial phosphate concentration. The effluent volume, $V_{eff}$ (mL), can be calculated from the following equation (Uddin et al., 2009)

$$V_{eff} = Qt_{total}$$

The value of the total mass of phosphate adsorbed, $q_{total}$ (mg), can be calculated from the area under the breakthrough curve (Han et al., 2009b):

$$q_{total} = \frac{Q}{1000} \int_{t=0}^{t \, total} C_{ad} \, dt$$

Equilibrium metal uptake or maximum capacity of the column, $q_{eq}$ (mg/g), in the column is calculated as follows:

$$q_{eq} = \frac{q_{total}}{m}$$

Total amount of phosphate entering column ($m_{total}$) is calculated from the following equation (Oguz and Ersoy, 2010):

$$m_{total} = \frac{Co \; Q \; q_{total}}{1000}$$

The removal percentage of phosphate ions can be obtained from $$Y \, (\%) = \frac{q_{total}}{m_{total}} \times 1000$$

The flow rate represents the empty bed contact time (EBCT) in the column, as described by following equation (Netpradit et al., 2004):

EBCT (min)=bed volume (mL)/flow rate (mL/min)

Q=volumetric flow rate (mL/min), $t_{total}$ is the total flow time (min)

$C_{ad}$=concentration of metal removal (mg/L)

Column parameters were analyzed using three different models. Adams-Bohart Model (Patel, 2019)

$$\ln\left(\frac{C_t}{C_o}\right) = k_{AB} C_o t - k_{AB} N_0 \left(\frac{z}{U_o}\right)$$

$C_0$ and $C_t$=influent and effluent concentrations (mg/L), $k_{AB}$=Adams-Bohart kinetic constant (L/mg min), $N_o$=saturation concentration (mg/L), t=flow time (min), Z=bed depth of the fixed-bed column (cm), and $U_o$=superficial velocity (cm/min). Calculated adsorption capacity is equals to $N_o/\rho$. $\rho$ is the density of the adsorbent (Trgo et al., 2011). Thomas model (Li et al., 2013)

$$\ln\left(\frac{C_t}{C_o} - 1\right) = \frac{k_{TH} q_0 m}{Q} - k_{TH} C_o t$$

Where $k_{TH}$=Thomas kinetic coefficient (L/min mg), t=flow time (min), and Q=volumetric flow rate (mL/min), $q_o$=adsorption capacity (mg/g) and m=mass of the adsorbent (g). Yoon and Nelson Model (Woumfo et al., 2015)

$$\ln\left(\frac{C_t}{C_o - C_t}\right) = k_{YN}t - \tau k_{YN}$$

Where τ=time required for 50% adsorbate breakthrough (min), t=sampling time (min), and $k_{YN}$=Yoon-Nelson rate constant (min$^{-1}$).

5. Batch Sorption Experiments, Kinetics, and Isotherms

The raw data were collected using the UV-Vis Spectrophotometer must be used to identify the absorbance of phosphate for each experiment. The following equations were used.

$$C_e = (C_i - C_f)$$

$$\text{Adsorption capcaity}(q_e) = \frac{(C_i - C_f)V}{m}$$

$$\%Cu(II) \text{ removal} = \frac{(C_i - C_f) \times 100}{C_i}$$

Where $C_e$=equilibrium phosphate ion concentration (mg/L), $C_i$=initial phosphate ion concentration (mg/L), $C_f$=final phosphate ion concentration (mg/L), V=volume of the solution (L), and m=mass of the adsorbent (g).

Adsorption kinetics were evaluated using Pseudo first and second-order kinetic models.

| Kinetic model | Nonlinear form | Linearized form |
|---|---|---|
| Pseudo first order | $q_t = q_e(1 - e^{-kt})$ | $\log(q_e - q_t) = \log(q_e) - \frac{k_1 t}{2.303}$ |
| Pseudo second order | $q_t = \frac{k_2 q_e^2 t}{1 + k_2 q_e t}$ | $\frac{t}{q_t} = \frac{1}{k_2 q_e^2} + \frac{t}{q_e}$ |

Adsorption isotherms data were evaluated using Langmuir and Freundlich isotherm models.

| Isotherm model | Nonlinear form | Linear form |
|---|---|---|
| Langmuir isotherm | $q_e = \frac{q_m K_L C_e}{1 + K_L C_e}$ | $\frac{C_e}{q_e} = \frac{C_e}{q_m} + \frac{1}{q_m K_L}$ |
| Freundlich isotherm | $q_e = K_f C_e^{1/n}$ | $\ln q_e = \ln K_f + \frac{1}{n} \ln C_e$ |

Where, $q_e$ and $q_t$ (mg/g) are the adsorption capacity of biochar at the equilibrium time and at the given time, t, respectively; $C_e$ (mg/L) is the equilibrium concentration; $K_L$ (L/mg) and $K_f$ are the constants; $q_m$ (mg/g) denotes the maximum adsorption capacity, and 1/n is the heterogeneity factor. Origin 2020b software was used to plot the spectra for XRD, and XPS. ChemDraw Ultra 13.0 was used to draw the images.

6. Thermodynamics

Thermodynamic parameters, Gibb's free energy (ΔG°), enthalpy change (ΔH°) and entropy change (ΔS°) were calculated using the following equations.

$$\Delta G = -RT \times \ln k_{ads}$$

$$\ln k_{ads} = (-\Delta H/R)1/T + \Delta S/R$$

Where, R=8.314 JK$^{-1}$ mol$^{-1}$ is the gas constant, and T=temperature in (K). $k_{ads}$ was determined by multiplying $K_L$ (Langmuir adsorption constant, L/mg) by the density of the liquid phase (~1×10$^6$ mg/L) (Karunanayake et al., 2019).

7. Desorption Study

Desorbability was calculated using the following equation.

$$\text{desorbability} = DO/AO \times 100\%$$

Results and Discussion

1. Elemental Analysis and Physiochemical Properties

Figure 7A:
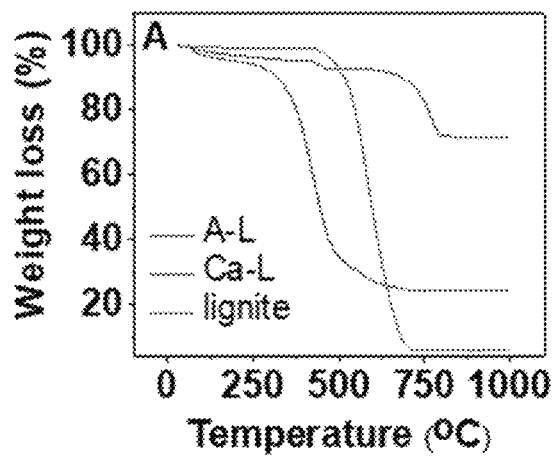
FIGS. 7A-D show graphs and images illustrating weight loss, phosphate adsorption, and pore volume of various adsorbents. (A) TGA analysis of lignite, A-L, and Ca-L. (B) SEM images of Ca-L before P uptake (scale bar 1 µm). (C) SEM images of Ca-L after P uptake (scale bar 1 µm). In (B), the red square showed $CaSiO_3$, $Ca(OH)_2$, CaO, and $CaCO_3$ primary particles (crystal sizes were ~10.2 nm, ~28.4 nm, ~18.6 nm, and ~20 nm, respectively) deposited on Ca-L, whereas red arrows denote particle clusters (<2 µm) formed due to $Ca(OH)_2$ modification to the surface. (D) DFT-pore size distributions of A-L.

A-L has a lower carbon percentage than lignite (39.4% vs. 15.2%) and produced a higher H/C ratio (Table 3). This denotes that A-L is less aromatic than lignite. However, the H/C ratio of Ca-L is lower than raw lignite (Table 3), indicating that the carbon aromaticity of Ca-L was increased upon Ca$^{2+}$ addition and pyrolysis. A low carbonaceous phase (−11.5%) remained in Ca-L after pyrolysis of Ca(OH)$_2$-lignite 1:1 mixture. Much of the starting carbon was mineralized to form CaCO$_3$ (14.0%) at 800° C. and some of the SiO$_2$ content formed CaSiO$_3$ (40.6%). Ca-L reported a −99% ash content (Table 3). However, this value is higher than the ash contents obtained by bulk (76.8%) and TGA (71.8%) analyses (FIG. 7A). Al$_2$O$_3$ (2.0%) and SiO$_2$ (25.7%) quantified in A-L contributed to a higher ash content (36.4%) than in lignite (25.0%) (Table 3). High moisture content in A-L (11.4%) attributes to the deliquescence of metallic K.

TABLE 3

Physical properties of lignite, A-L, and Ca-L

| | | Lignite-based adsorbent | | |
|---|---|---|---|---|
| Parameter | | Lignite | A-L | Ca-L |
| BET (m$^2$/g) | | 2.9 ± 0.1 | 2854.0 ± 5.0 | 18.0 ± 0.3 |
| Average pore volume (cm$^3$/g) | | 0.0008 | 0.5 | 0.005 |
| Average pore size (Å) | | 12.1 | 7.0 | 10.0 |
| Micropore volume (cm$^3$/g) | | 0.0003 | 0.43 | 0.0034 |
| Moisture (%) | | 3.2 | 11.4 | 1.7 |
| C % | | 39.4 | 15.2 | 11.5 |
| H % | Combustion analysis | 2.7 | 2.4 | 0.5 |
| N % | | 1.2 | 1.0 | 0.8 |
| H/C | | 0.8 | 1.9 | 0.5 |
| Ca % | | 1.3 | 0 | 5.6 |
| Mg %$^a$ | | 0.3 | 0.5 | 0.0 |
| K % | | 0.1 | 0.3 | 0.15 |
| Fe % | AAS | 0.0 | 0.55 | 0.62 |
| Si % | | 9.3 | 12.0 | 9.8 |
| Al % | | 0.3 | 0.5 | 1.8 |
| Ash (%) | Proximate analysis | 25.0 | 36.4 | 99.0 |
| PZC | | 3.9 | 6.5 | 13.0 |
| Yield (%)$^b$ | | N/A | 22.0 | 60.5 |

$^a$Mg content of Ca-L was below under the detection limits of AAS.
$^b$Yield is based on the original weight of raw lignite (washed + dried) used.

Figure 7B:
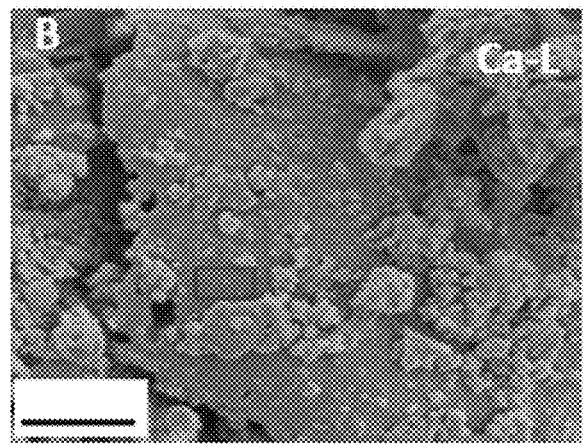
Figure 7C:
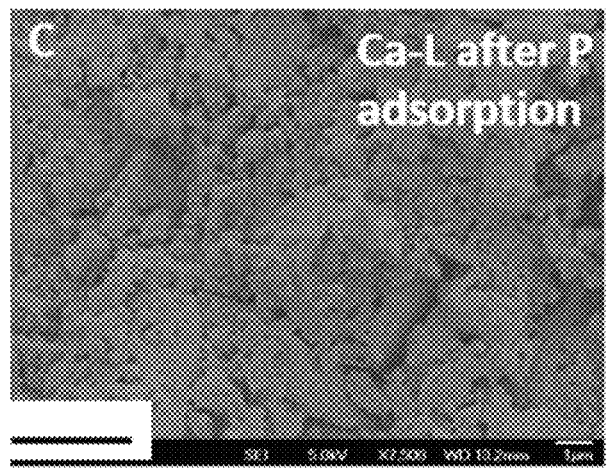
Figures 12A, 12B, 12C, 12D:
FIGS. 12A-M show images illustrating SEM analysis of lignite and A-L, and SEM-EDX analysis of A-L and Ca-L before P uptake. (A) SEM images for lignite before P adsorption. (B) SEM images for lignite after P adsorption. (C) SEM images for A-L before P adsorption. (D) SEM images for A-L after P adsorption. For A-D—scale bar, 10 µm; magnification, 2 K vs. 3.34 K. (E-I) SEM-EDX elemental mapping for A-L before P uptake. (J-M) SEM-EDX elemental mapping for Ca-L before P uptake (scale bar=100 µm).
Figures 12E, 12F, 12G, 12H, 12I:

SEM analysis of lignite and A-L before and after P adsorption is shown in FIGS. 12A-D. A-L is highly porous as seen in FIG. 12C. SEM analysis of Ca-L depicted nano-sized CaSiO$_3$, Ca(OH)$_2$, CaO, and CaCO$_3$ primary particles (20-25 nm) and micro-sized (1-2.5 µm) aggregates on the surface (FIG. 7B). These aggregates are formed during the adsorbent production at 800° C. After phosphate sorption, smoother A-L and Ca-L surfaces were detected, which was due to either phosphate adsorption or leaching/precipitation (FIG. 7C).

Figures 12J, 12K, 12L, 12M:
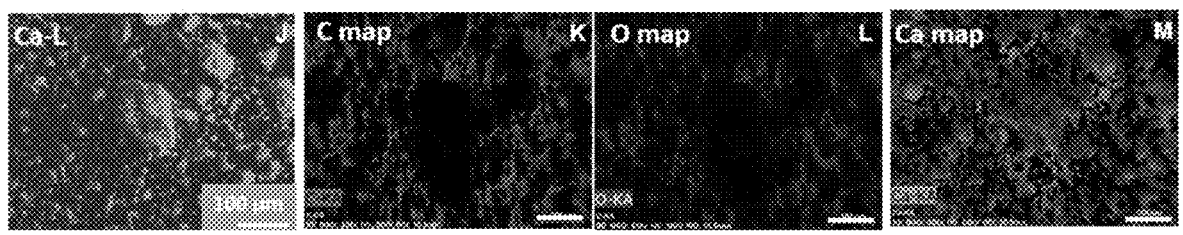
Figures 13A, 13B, 13C, 13D, 13E:
FIGS. 13A-N show SEM-EDX electron spectra after P uptake for A-L and Ca-L (Only prominent elements are shown here). (A-E) SEM-EDX mapping for A-L after P uptake (scale bar, 50 µm, magnification 1107×). (F-J) SEM-EDX mapping for Ca-L after P uptake (scale bar, 50 µm, magnification 1107×). The SEM-EDX showed a highly degraded carbon surface. (G-J) P-laden Ca-L (200 µm, 318 X) has overlapped surface regions of P, Ca, and O, denoting $Ca_3(PO_4)_2/Ca(HPO_4)$ precipitation. (K-L) SEM-EDX electron spectra of A-L before and after phosphate uptake. The P peak in A-L is invisible due to a low signal-to-noise ratio. (M-N) SEM-EDX electron spectra of Ca-L before and after phosphate uptake.
Figures 13F, 13G, 13H, 13I, 13J:
Figures 13K, 13L, 13M, 13N:
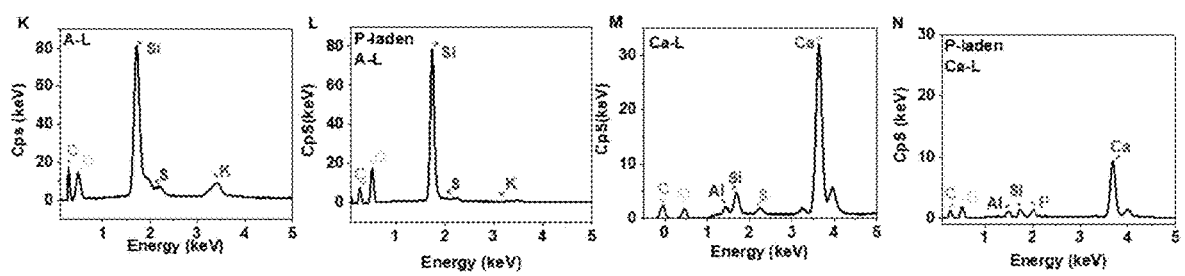
Figures 16A, 16B:
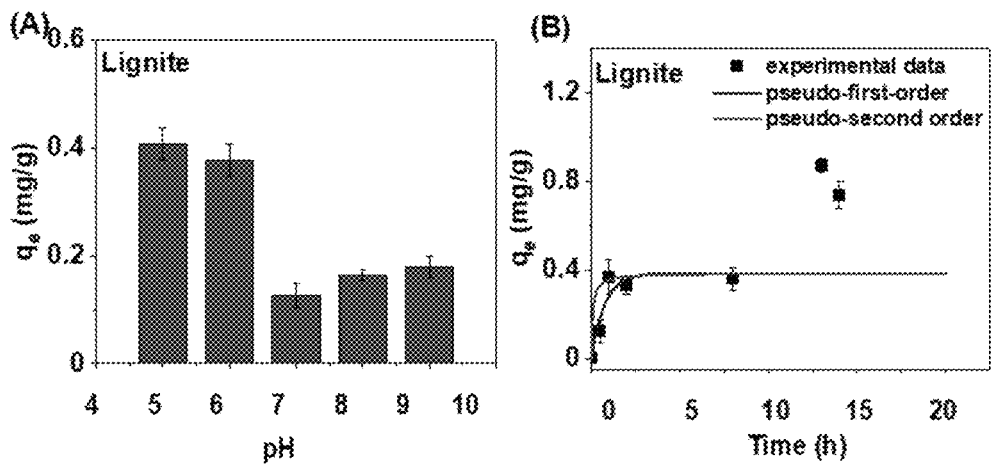
FIGS. 16A-B show graphs illustrating the effect of pH and contact time on phosphate sorption by lignite. (A) Adsorption capacity of precursor lignite vs. pH (B) phosphate sorption kinetics into the lignite (adsorbent dose 50 mg, 25 mL of 50 ppm phosphate concentration, 24 h, pH 5.5).
Figures 17A, 17B, 17C:
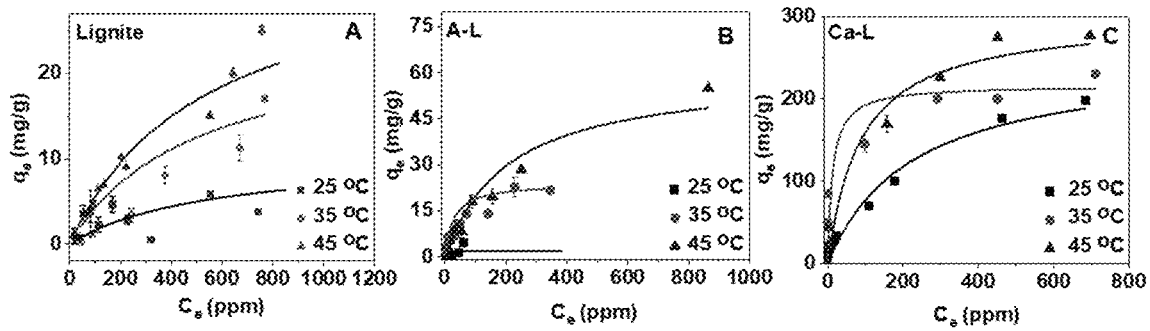
FIGS. 17A-F show graphs illustrating adsorption isotherm studies for phosphate removal by lignite, A-L, and Ca-L. (A-C) Langmuir and (D-F) Freundlich isotherm parameters for lignite, A-L, and Ca-L at 25, 35 and 45° C. (adsorbent dose 50 mg, 25 mL of 10-1500 ppm phosphate concentration, 24 h, at different pH values (5, 6, and 5.5 for A-L, Ca-L, and lignite, respectively).
Figures 17D, 17E, 17F:
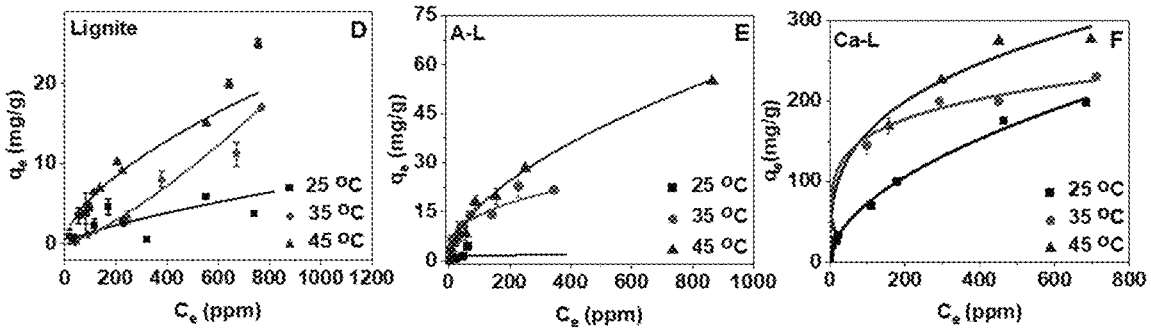

SEM-EDX analyses of pre- and post-P uptake adsorbent samples (FIGS. 12E-M and 13A-N) provided the surface elemental distribution to a depth of 3.1 µm. Atomic percentages of Si (10.5%), O (30.0%), K (0.6%), Ca (0.2%), and C (35.6%) were found on the A-L surface before P uptake (Table 4). Ca is evenly and densely distributed on the Ca-L surface (FIG. 12M) before P uptake. After phosphate sorption, the P peak is absent in the P-laden A-L EDX spectrum (FIG. 13L) due to the low EDX P signal-to-noise ratio, resulting from a low density of surface P adsorption. P peak is visible in the Ca-L EDX spectrum (FIG. 13N) after P uptake. After Ca-L contact with a pH 6 phosphate solution, its SEM-EDX spectrum lost a portion of its Ca (from 15.3% to 14.0%), indicating $Ca^{2+}$ leaching (Table 4). $Ca^{2+}$ leaching from Ca-L generates a higher $Ca^{2+}$ solution concentration near the surface, where $Ca_3(PO_4)_2/Ca(HPO_4)$ precipitate. After P sorption, the equilibrium solution pH was ~13 (FIG. 9B), in agreement with the precipitation of $Ca_3(PO_4)_2/Ca(HPO_4)$ ($Ksp=2.1\times10^{-33}$, $1.3\times10^{-7}$) back onto the Ca-L surface.

TABLE 4

Elemental distribution of adsorbents estimated using SEM-EDX elemental mapping (Only the prominent elements are presented here)

| Adsorbent | C | O | Ca | K | Fe | Al | Si | P |
|---|---|---|---|---|---|---|---|---|
| Before P adsorption | | | | | | | | |
| Lignite | 73.4 | 13.2 | 0.01 | 0.01 | — | — | 0.06 | 0.4 |
| A-L | 54.4 | 26.6 | 0.04 | 0.6 | — | — | 12.2 | 0.6 |
| Ca-L | 27.7 | 52.9 | 15.3 | 0.07 | — | — | 1.1 | 2.2 |
| After P adsorption | | | | | | | | |
| Lignite | 66.5 | 24.1 | 0.8 | 0.2 | — | — | 4.5 | 0.8 |
| A-L | 54.6 | 24.4 | 0.03 | 0.2 | — | — | 20.1 | 0.4 |
| Ca-L | 9.2 | 56.7 | 14.0 | 0.2 | — | — | 7.6 | 5.9 |

2. Surface Area

BET surface area of A-L (2854±5.0 m$^2$/g) was higher than raw lignite (2.9±0.1 m$^2$/g) (Table 3). A-L has the highest surface area reported for any lignite-based adsorbent. Demineralization by KOH, followed by pyrolysis at 750° C. (50° C./min heating rate, 1 h) resulted in a formation of a porous material. KOH activation begins at 700° C. and is complete at ~750° C. Its pore volume was also larger than the feed lignite (0.43 vs. 0.0003 cm$^3$/g) (Table 3). Metallic K diffuses to the carbon crystalline layers and expands them. These metallic species can be removed after acid rinsing, which improves the surface area. To generate metallic K, temperatures above 700° C. are required. Three activation temperatures (650° C., 750° C., and 850° C.) were initially used to experimentally determine the optimum (750° C.) for A-L production. Temperature increment from 650 to 750° C. increased surface area from 499 to 2854 m$^2$/g, but decreased (2242 m$^2$/g) at 850° C.; due to the lignite sintering, which shrinks char particles and realigns the carbon backbone. $N_2$ adsorption-desorption isotherms of lignite, A-L, and Ca-L exhibit type I adsorption behavior as the pores were saturated by $N_2$ within $P/P_o<0.2$ (FIGS. 15A-C) indicating well defined microporous structure; micropores are filled at low pressures. Typically activated carbons contain both micropores and mesopores.

Figure 7D:
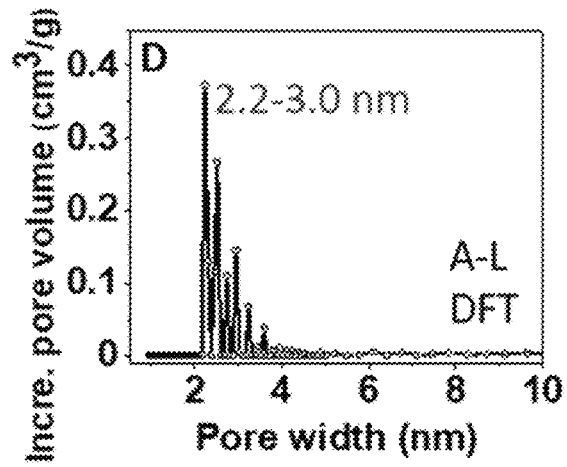

A high KOH: lignite (3:1) mass ratio caused a low A-L product yield (22.0%) (Table 3), in agreement with previous reports. The resulting A-L has only 15.2% C, a 91.6% drop in carbon content compared to raw lignite (39.4% C). KOH-guided activation generates more microporosity, while NaOH produces more mesoporosity. In comparison to previously reported activated carbons, A-L displays a DFT pore size distribution with wider pore diameters (2.2-2.5 nm) (FIG. 7D). The formation of pores with wider pore diameters with the increase of KOH: carbon mass ratio in activated carbons has been observed. In contrast, decreasing the KOH: carbon ratio produces activated carbons with narrow pore sizes (~0.55 nm). Moreover, DFT analysis revealed the existence of large mesopore (~10-20 nm) fractions in lignite and Ca-L (FIGS. 15D and F). However, a substantial amount of small meso-pores (2.2-2.5 nm) in A-L (FIG. 15E) accounts for its higher surface area (2854 m$^2$/g) than lignite and Ca-L (2.9 m$^2$/g and 18.0 m$^2$/g).

Ca-L had a surface area (18.0±0.3 m$^2$/g) six times greater than the raw lignite (Table 3) due to $CaCO_3$, $Ca(OH)_2$, and CaO particle formation in it. Hydrated phosphate anions have diameters of 0.339 nm, which is smaller than lignite, A-L, and Ca-L pore sizes (Table 3), therefore, they all have access to hydrated phosphate.

However, A-L's very high surface area did not lead to high phosphate removal (3.0 mg/g at 50 ppm initial $PO_4^{3-}$ concentration) (Table 5). In the same $PO_4^{3-}$ concentration, Ca-L (18.0±0.3 m$^2$/g) has a 28-times greater phosphate uptake, 227.3 mg/g than A-L. This is due to large amounts of $Ca(OH)_2$, $CaCO_3$, and CaO particles formed in the Ca-L, which provide leached $Ca^{2+}$ ions, precipitating $CaHPO_4$ and $Ca_3(PO_4)_2$ onto the surface.

TABLE 5

Langmuir adsorption isotherm parameters for lignite, A-L, and Ca-L at 25, 35 and 45° C. (adsorbent dose 50 mg, 25 mL of 10-1500 ppm phosphate concentration, 24 h, at pH values (5.5, 5, and 6 for lignite, A-L, and Ca-L, respectively)[a].

| Temperature | pH | Adsorbent | $q_m$ (mg/g)[b] | $K_L$ | $R^2$ |
|---|---|---|---|---|---|
| 25° C. | 5.5 | lignite | 5.2 | 0.015 | 0.99 |
| | 5 | A-L | 8.0 | 0.060 | 0.99 |
| | 6 | Ca-L[c] | 227.3 | 0.005 | 0.99 |
| 35° C. | 5.5 | lignite | 14.0 | 0.008 | 0.99 |
| | 5 | A-L | 24.6 | 0.020 | 0.99 |
| | 6 | Ca-L[c] | 250.0 | 0.050 | 0.99 |
| 45° C. | 5.5 | lignite | 35.0 | 0.003 | 0.99 |
| | 5 | A-L | 59.1 | 0.001 | 0.99 |
| | 6 | Ca-L[c] | 384.6 | 0.020 | 0.99 |

[a]The non-linear isotherm forms were used here to calculate the respective parameters.
[b]Maximum Langmuir adsorption capacity (mg/g).
[c]Ca-L is not a true adsorbent. It's a stoichiometric reagent, that can release $Ca^{2+}$ to precipitate phosphate as $CaHPO_4/Ca_3(PO_4)_2$.

3. XRD Analysis

Figure 8B:
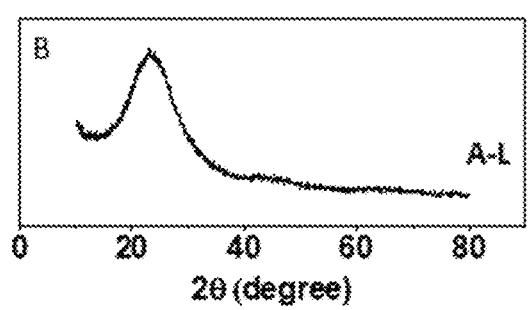

The lignite XRD pattern displayed two peaks at 2θ=24.8° (0 0 2) and 38.4° (1 0 0) (FIG. 8A) due to the graphitic carbon existence. The peak at 2θ=26.6° ($SiO_2$) is hidden within the broad graphitic region. The broad peak of 2θ=22.7° in the A-L XRD spectrum (FIG. 8B) is assigned to amorphous graphitic carbon resulting from lignite's pyrolysis. High-temperature activation (750° C., 1 h) degrades organic carbon in lignite in the presence of excess KOH, leading to more disorder and loss of carbon. The crystalline peak at 2θ=26.6° ($SiO_2$) (JCPDS No. 76-1390) was invisible as it was hidden in the broad graphitic peak region.

Figure 8C:
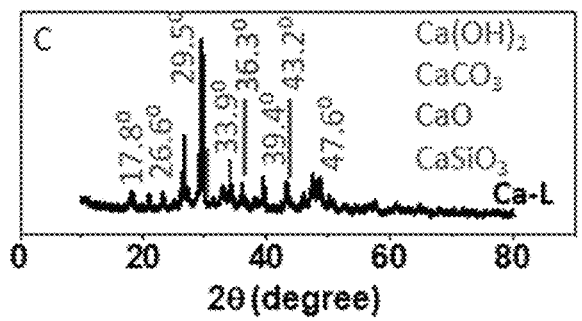
Figure 8D:
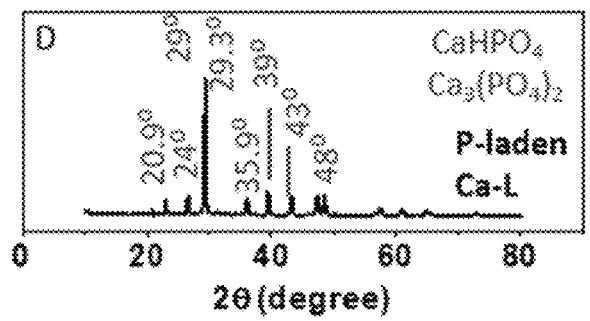

After pyrolysis at 800° C., the Ca-L XRD spectrum exhibited several intense and narrow peaks (FIG. 8C), indicating the formation of crystalline compounds. Two peaks at 2θ=26.6° and 29.5° (Table 6) belong to $CaSiO_3$ and $CaCO_3$, with average crystal sizes, 10.2 nm and ~19.7 nm (these sizes were calculated according to Scherrer formula, assuming that the samples are free of strain) (Supporting Information). The peaks centered at 2θ values of 17.8°, 33.9°, 47.6°, and 50.10 in Ca-L can be attributed to $Ca(OH)_2$ (FIG. 8C). A trace of CaO (2θ=32.10 and 36.30) was also found. Typically, pyrolysis temperatures>800° C. are required to generate CaO crystals from $CaCO_3$. These crystals are nano sized ($Ca(OH)_2$, ~28.4 nm, and CaO, ~18.6 nm). After P uptake, $CaHPO_4$ phases at 2θ=20.9°, 29.3°, 35.9°, and 480 (JCPDS No. 9-348) and $Ca_3(PO_4)_2$ at 2θ=29°, 39°, and 43° were identified (FIG. 8D). The average $CaHPO_4$ and $Ca_3(PO_4)_2$ sizes were 32.5 nm and 33.5 nm.

TABLE 6

Model compounds for XRD peak interpretation

| Compound | 2θ (degrees) | Reference |
|---|---|---|
| $SiO_2$ | 20.8° and 26.6° | (Samaraweera et al., 2021; Zhang et al., 2014) |
| CaO | 32.1° and 36.3° | (Samaraweera et al., 2021; Zhang et al., 2014) |
| $CaCO_3$ | 29.5° and 34° | (Marshall et al., 2017) |
| $CaHPO_4$ | 13°, 24°, 20.9°, 29.3°, 35.9°, and 48° | (Antunes et al., 2018; Marshall et al., 2017) |
| $Ca_3(PO_4)_2$ | 29°, 39°, and 43° | (González Ocampo et al., 2016; Marshall et al., 2017; Prezas et al., 2017) |
| $Ca_{15}(PO_4)_2(SiO_4)_6$ | 32° | (Fang et al., 2020) |

4. Effect of pH and $Ca^{2+}$ Leaching Test

Figure 9A:
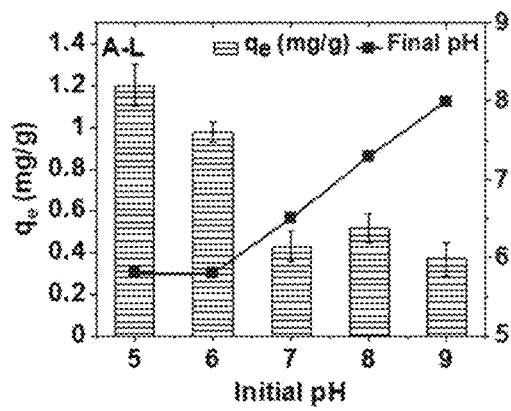
FIGS. 9A-C show pH dependence for phosphate sorption. (A) A-L phosphate sorption over the pH range from pH 5-9 (adsorbent dose 50 mg, 25 mL of 50 ppm phosphate concentration, 24 h, 25° C.). (B) Ca-L phosphate sorption over the pH range from pH 5-9 (adsorbent dose 50 mg, 25 mL of 50 ppm phosphate concentration, 24 h, 25° C.). (C) calcium leaching test for Ca-L (0-100 ppm phosphate concentrations and pH values of 5, 7, and 9, 25° C., 24 h).
Figure 9B:
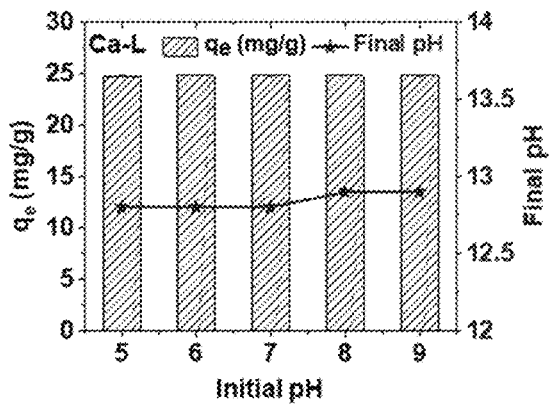
Figure 9C:
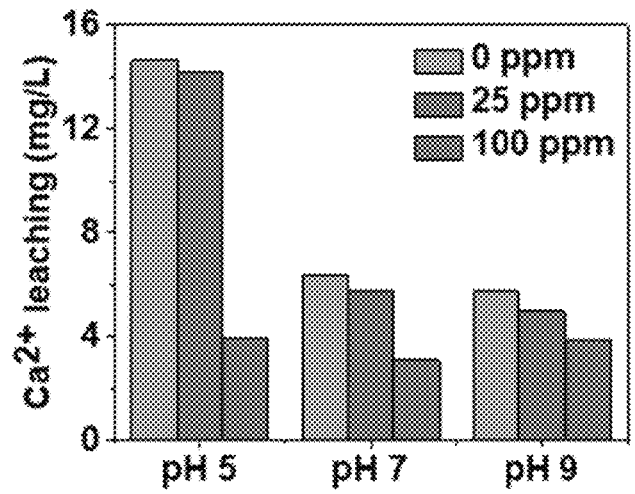

A pH vs. phosphate uptake study was conducted from pH 5-9 (FIGS. 9A-C). The predominant phosphorus species that exist in the pH range of 0-4.7 are $H_3PO_4$ and $H_2PO_4$, from 4.7 to 9.7 $H_2PO_4^-$ and $HPO_4^{2-}$, and from 9.7 to 14.0 $HPO_4^{2-}$ and $PO_4^{3-}$. A-L's phosphate sorption dropped upon increasing the pH from 5 to 9 (FIG. 9A) as it is negatively charged above pH 6 (PZCs≈6.5-6.7), which repels $H_2PO_4^-$ and $HPO_4^{2-}$. A-L has a phosphate uptake (1.2 mg/g) at pH 5, which dropped to 0.14 mg/g at pH 9. After phosphate-binding, the equilibrium pH increased slightly from pH 5 but slightly decreased (6-8) for initial pH values from 6 to 9.

Ca-L's P uptake has little pH dependence (24.8 mg/g from pH 5-9) (FIG. 9B). The equilibrium pH after phosphate uptake was constant (~13) for all pH levels tested because hydroxide ions were released from the surface or leached as $Ca(OH)_2$ during calcium phosphate and hydrophosphate formation. Similar hydroxide/phosphate exchange occurred with a $La(OH)_3$-modified sorbent and equilibrium pH increases after sorption occurred at initial pH values 3-6. The basic final pH in Ca-L, resulting from $Ca_3(PO_4)_2$/$CaHPO_4$ precipitation, can be utilized for treating acidic water discharging from various industries (e.g., wine and beer). The use of Ca-L (PZC-13) as a soil conditioner could be beneficial in reducing soil pH fluctuations, improving microbial degradation.

$Ca^{2+}$ leaching (14.6 ppm) from Ca-L is greatest at pH 5 in a phosphate-free solution (FIG. 9C). More $Ca(OH)_2$ and $CaCO_3$ were identified on the initial Ca-L surface, in which $Ca(OH)_2$ is far more soluble (Ksp=5.5×10$^{-6}$, at pH 7) than $CaCO_3$ (Ksp=2.9×10$^{-9}$). When the phosphate solution concentration increased to 100 ppm, the amount of $Ca^{2+}$ remaining in the solution after leaching decreased significantly to less (3.9 ppm), as the released $Ca^{2+}$ was fixed on the surface as $Ca_3(PO_4)_2$(Ksp=2.1×10$^{-33}$) and $CaHPO_4$ (Ksp=1.3×10$^{-7}$). Antunes et al. [1] reported that brushite ($CaH-PO_4 \cdot 2H_2O$) precipitated at the initial pH=2, and a high leached $Ca^{2+}$ concentration ($Ca^{2+}$-biochar made by 20% $Ca(OH)_2$ wt. only gave brushite). Similar surface amounts of $Ca^{2+}$ oxides/hydroxides/car-bonates were dissolved in water at pH 7.

5. Adsorption Kinetics and Isotherm Studies

The pseudo-second-order kinetic model data better fit all three ($R^2$ values from 0.97 to 0.99) than the first-order model ($R^2$ values from 0.72 to 0.97) (Table 7). Ca-L achieved uptake equilibrium after 4 h (k2=0.17 min$^{-1}$), which is faster than $Ca(OH)2$-treated natural clinopti-lolite [26]. Phosphate-binding onto highly porous A-L (teq=1.5-2 h) occurred faster than the phosphate uptake by Ca-L.

TABLE 7

Kinetic parameters from fitting aqueous P(V) adsorption versus time data over lignite, A-L, and Ca-L to the pseudo-first-order and pseudo-second-order kinetic models (0.05 g adsorbent dose, 50 mg/L P(V) solution, 25 mL solution volume, pH 5 for A-L, pH 6 for Ca-L, and at 25 ± 0.5° C., time 24 h)

| Kinetic model | Kinetic parameters | lignite | A-L | Ca-L | Ref. |
|---|---|---|---|---|---|
| Pseudo first order | $k_1$ | 1.1 | 0.58 | 0.30 | (Toor and Jin, 2012) |
| | $R^2$ | 0.92 | 0.92 | 0.72 | |
| | $q_e$ (exp) | 0.9 | 1.9 | 24.2 | |
| | $q_e$ (calc) | 0.5 | 3.7 | 9.5 | |
| Pseudo second order | $k_2$ | 0.9 | 0.50 | 0.17 | (Ho and Mckay, 1999) |
| | $R^2$ | 0.97 | 0.97 | 0.99 | |
| | $q_e$ (exp) | 0.9 | 1.9 | 24.2 | |
| | $q_e$ (calc) | 0.6 | 1.8 | 24.8 | |

$q_e$ (mg/g) Equilibrium adsorbate capacity (mg/g)
$q_t$ (mg/g) - Adsorbate capacity at time t (mg/g)
$k_1$ - First order rate constant (min$^{-1}$)
$k_2$ - Second order rate constant (min$^{-1}$)

Both Langmuir and Freundlich isotherm models (Tables 5 and 8) describe the phosphate removal by lignite, A-L, and Ca-L well. Modification of lignite with $Ca(OH)_2$ increased the affinity for $PO_4^{3-}$ by ~30 fold at pH 6 (Table 8). A-L shows a slightly higher Kf value than lignite and is bound to slightly more $PO_4^{3-}$ ions. Adsorption intensity (1/n) (Table 8) denotes the type of adsorption (irreversible, favorable, and, unfavorable). The phosphate uptakes by all three adsorbents are favorable (1/n<1) at 25° C.

TABLE 8

Freundlich adsorption isotherm parameters for lignite, A-L and Ca-L at 25, 35 and 45° C. (adsorbent dose 50 mg, 25 mL of 10-1500 ppm phosphate concentration, 24 h, pH 5.5)

| Temperature | Adsorbent | $K_f$ | n | 1/n | $R^2$ |
|---|---|---|---|---|---|
| 25° C. | lignite | 0.7 | 3.5 | 0.3 | 0.99 |
| | A-L | 1.8 | 4.4 | 0.2 | 0.98 |
| | Ca-L | 23.6 | 2.5 | 0.4 | 0.99 |
| 35° C. | lignite | 0.01 | 0.9 | 1.1 | 0.97 |
| | A-L | 2.1 | 2.4 | 0.4 | 0.98 |
| | Ca-L | 13.1 | 2.9 | 0.3 | 0.98 |
| 45° C. | lignite | 0.17 | 1.3 | 0.8 | 0.97 |
| | A-L | 1.7 | 1.9 | 0.5 | 0.98 |
| | Ca-L | 21.3 | 2.5 | 0.4 | 0.98 |

$K_f$ - Freundlich distribution coefficient indicating adsorption capacity
1/n - Freundlich dimensionless parameter indicating adsorption intensity Maximum Langmuir adsorption capacities were A-L (8.0 mg/g) and Ca-L (227.3 mg/g) versus lignite (5.2 mg/g) at their optimum pH levels of 5, pH 6, and 5.5, respectively (Table 5). The sorption capacities at 45° C. were A-L (59.1 mg/g) and Ca-L (384.6 mg/g) versus lignite (35.0 mg/g). Ca-L has the highest Langmuir kL value (0.02 L/mg). However, Ca-L is operating by a stoichiometric precipitation process, so the phosphate high affinity meaning of kL should not be confused with sorption affinity.

The Ca-L's uptake capacity (~227.3 mg/g at both pH 6 and 7 at 25° C.) is higher than that of our previously developed magnesium and calcium-doped lignite (24.9 mg/g at pH 2.2 at 25° C., 15.5 mg/g at pH 7 at 25° C.) [35]. We gained a 10-fold enhancement in phosphate uptake using a higher $Ca^{21}$ loading on Ca-L than in Ca—Mg lignite (Ca: lignite mass ratio, 1:1 vs 1:10) [35]. Sorption isotherm maximum capacities obtained at pH 7 and 25° C. for lignite (1.5 mg/g), and A-L (2.9 mg/g) were lower than the corresponding capacities obtained at their optimum pH levels, whereas that for Ca-L was unchanged (227.3 mg/g). Ca-L retained more phosphate and will be studied as a material used to improve soil fertility.

6. Thermodynamics of Phosphate Sorption

Negative ΔG values from 25 to 45° C. for lignite (−19.8 to −42.0 kJ/mol), A-L (−18.3 to −27.3 kJ/mol), and Ca-L (−21.8 to −26.8 kJ/mol) (Table 9) indicate that all sorptions are spontaneous, in line with the previously prepared iron oxide adsorbents [52]. Lignite phosphate binding is endothermic (ΔH=303.9 kJ/mol). When the temperature increased from 25 to 45° C., phosphate sorption capacity rose (from 5.2 mg/g to 35.0 mg/g for lignite) (Table 5) and the sorption occurs by chemisorption (ΔH, 20-400 kJ/mol). A-L and Ca-L phosphate uptakes are exothermic (ΔH=−160.4 and −37.7 kJ/mol) and the physisorption can play a role in phosphate uptake. The positive entropy change value for lignite's phosphate removal (ΔS=1.1 kJ/mol) denotes the increase in the randomness. A-L and Ca-L have negative ΔS values (−444.2 and −41.3 kJ/mol, respectively), illustrating overall order increases in these processes.

TABLE 9

Determination of thermodynamic parameters for phosphate adsorption by lignite, A-L, and Ca-L (adsorbent dose 50 mg, 25 mL of 10-1500 ppm phosphate concentration, 24 h, pH 2.2, 25, 35 and 45° C.).

|  | T (K) | $q_m$ (mg/g) | $K_L$ (L/mg) | $k_{ads}$ | $lnk_{ads}$ | 1/T | ΔG (kJ/mol) | ΔH (kJ/mol) | ΔS (J/mol/K) |
|---|---|---|---|---|---|---|---|---|---|
| Lignite | 298 | 4.5 | 0.003 | 3.00E+03 | 8 | 0.0034 | −19.8 | 303.9 | 1.1 |
|  | 308 | 26.6 | 2.4 | 2.40E+06 | 14.7 | 0.0033 | −37.6 |  |  |
|  | 318 | 35.0 | 8.2 | 8.20E+06 | 15.9 | 0.0032 | −42.0 |  |  |
| A-L | 298 | 2 | 0.06 | 6.00E+04 | 11.0 | 0.0034 | −27.3 | −160.4 | −444.2 |
|  | 308 | 24.6 | 0.02 | 2.00E+04 | 9.9 | 0.0032 | −25.4 |  |  |
|  | 318 | 59.1 | 0.001 | 1.00E+03 | 6.9 | 0.0031 | −18.3 |  |  |
| Ca-L | 298 | 227.3 | 0.05 | 5.00E+04 | 10.8 | 0.0034 | −26.8 | −37.7 | −41.3 |
|  | 308 | 250 | 0.005 | 5.00E+03 | 8.5 | 0.0032 | −21.8 |  |  |
|  | 318 | 384.6 | 0.02 | 2.00E+04 | 9.9 | 0.0031 | −26.2 |  |  |

$K_L$ - Langmuir isotherm constant indicating the adsorption energy (L/mg)
ΔG - Gibb's energy change (kJ/mol)
ΔH - Enthalpy change (kJ/mol)
ΔS - Entropy change (J/mol/K)

7. XPS Studies and Phosphate-Binding Interactions

C, O, and Si dominate in lignite, A-L, and Ca-L surface regions according to low-resolution (LR) XPS survey spectra, whereas Ca, Al, Fe, Na, and Mg are also present before any phosphate removal occurs (Table 10). LR XPS found C (43.0%), O (40.8%), Al (5.3%), and Si (8.7%) atomic percentages are present on lignite's surface. Ca-L made after impregnating lignite in the $Ca^{2+}$ solution and pyrolyzing at 800° C., lost to ~70.1% of its precursor lignite's carbon. However, Ca-L surfaces contain $CaCO_3$, accounting for some of the 25.7% atomic percentage of C in its LR XPS. Ca-L's higher surface Ca content vs lignite (9.6% vs. 0%) led to its far higher phosphate uptake.

TABLE 10

Low-resolution XPS data for lignite, A-L, and Ca-L pre-and post-$PO_4^{3-}$ sorption

|  |  | Before $PO_4^{3-}$ uptake | | | After $PO_4^{3-}$ uptake | | |
|---|---|---|---|---|---|---|---|
|  | Peak/Chemical state | Lignite | A-L | Ca-L | Lignite | A-L | Ca-L |
| K | Binding energy (eV) | — | — | — | — | — | 294.5 |
|  | Atomic percentage % | — | — | — | — | — | 0.7 |
|  | FWHM (eV) | — | — | — | — | — | 1.7 |
| C | Binding energy (eV) | 286.2 | 285.3 | 286.0 | 286.1 | 285.2 | 286.0 |
|  | Atomic percentage % | 43.0 | 72.1 | 25.7 | 43.5 | 59.9 | 20.0 |
|  | FWHM (eV) | 3.5 | 2.8 | 2.9 | 3.3 | 2.9 | 2.8 |
| O | Binding energy (ev) | 533.3 | 533.9 | 532.3 | 533.1 | 534.0 | 532.3 |
|  | Atomic percentage % | 40.8 | 20.8 | 48.3 | 40.6 | 28.3 | 50.5 |
|  | FWHM (eV) | 3.3 | 2.9 | 3.3 | 3.2 | 3.3 | 3.3 |
| Al | Binding energy (eV) | 76.1 | — | 75.2 | 75.8 | — | 75.3 |
|  | Atomic percentage % | 5.3 | — | 3.8 | 5.1 | — | 3.5 |
|  | FWHM (eV) | 3.2 | — | 2.5 | 2.8 | — | 2.9 |

TABLE 10-continued

Low-resolution XPS data for lignite, A-L, and Ca-L pre-and post-$PO_4^{3-}$ sorption

| | | Before $PO_4^{3-}$ uptake | | | After $PO_4^{3-}$ uptake | | |
|---|---|---|---|---|---|---|---|
| | Peak/Chemical state | Lignite | A-L | Ca-L | Lignite | A-L | Ca-L |
| Si | Binding energy (eV) | 104.4 | 104.3 | 102.9 | 104.0 | 104.8 | 103.2 |
| | Atomic percentage % | 8.7 | 7.2 | 8.0 | 9.1 | 10.3 | 5.6 |
| | FWHM (eV) | 3.2 | 2.9 | 3.1 | 2.7 | 3.2 | 3.0 |
| P | Binding energy (ev) | — | — | — | — | — | 134.2 |
| | Atomic percentage % | — | — | — | — | — | 6.3 |
| | FWHM (eV) | — | — | — | — | — | 3.0 |
| Ca | Binding energy (eV) | 349.3 | — | 348.2 | — | — | 348.3 |
| | Atomic percentage % | 0.9 | — | 9.6 | — | — | 9.5 |
| | FWHM (eV) | 3.4 | — | 3.1 | — | — | 3.2 |
| Mg | Binding energy (eV) | — | — | 1304.8 | — | — | 1304.7 |
| | Atomic percentage % | — | — | 1.9 | — | — | 1.0 |
| | FWHM (eV) | — | — | 3.0 | — | — | 3.2 |
| Fe | Binding energy (eV) | — | — | — | — | — | — |
| | Atomic percentage % | — | — | — | — | — | — |
| | FWHM (eV) | — | — | — | — | — | — |
| Na | Binding energy (eV) | — | — | — | — | | |
| | Atomic percentage % | — | — | — | — | | |
| | FWHM (eV) | — | — | — | — | | |

The HR C1s XPS spectra of all three adsorbents were deconvoluted into five peaks, including C—C/C—H, C—O, C=O, COOR, and $CO_3^{2-}$ (FIGS. 18A-F and Table 11). The Ca-L surface has a higher $CO_3^{2-}$ percentage than lignite (4.2% vs. 3.0%) because of $CaCO_3$ formation on Ca-L during 800° C. pyrolysis. The surface of Ca-L is positively charged (PZC-13) at its optimal pH (=6) and attracts $HPO_4^{2-}/PO_4^{3-}$ anions (FIG. 9B). Therefore, the electrostatic interaction plays an initial role in Ca-L's phosphate removal. However, at this pH, $Ca^{2+}$ is released from surface $Ca(OH)_2$ and $CaCO_3$, reacts with phosphate anions, and repre-cipitate as Ca3(PO4)2/CaHPO4 particles on the surface. HR C1s XPS analysis depicted a loss in $CO3^{2-}$ percentage (from 4.2% to 1.7%) and $^-OH$ percentage (from 7.9% to 6.4%) (Table 11), suggesting a $Ca^{2+}$ leaching from $CaCO_3$ and $Ca(OH)_2$ on the Ca-L surface. These Ca3(PO4)2/CaHPO4 precipitates coincided with an increased solution final pH after phosphate sorption to 13 (FIG. 9B).

TABLE 11

C1s XPS data for lignite, A-L, and Ca-L surfaces before and after $PO_4^{3-}$ uptake

| Chemical Species | | Before $PO_4^{3-}$ uptake | | | After $PO_4^{3-}$ uptake | | |
|---|---|---|---|---|---|---|---|
| | | lignite | A-L | Ca-L | lignite | A-L | Ca-L |
| C—C/C—H | Binding energy (eV) | 284.8 | 284.6 | 285.2 | 285.0 | 284.4 | 284.9 |
| | Atomic percentages (%) | 14.4 | 49.9 | 10.8 | 20.7 | 40.2 | 6.1 |
| | FWHM (eV) | 1.5 | 1.0 | 1.5 | 1.4 | 1.2 | 1.4 |
| C—O | Binding energy (eV) | 285.5 | 285.6 | 285.7 | 285.6 | 285.5 | 285.4 |
| | Atomic percentages (%) | 17.8 | 13.3 | 7.9 | 10.1 | 15.0 | 6.4 |
| | FWHM (eV) | 1.6 | 1.6 | 1.6 | 1.3 | 1.6 | 1.3 |
| C=O | Binding energy (eV) | 286.9 | 287.1 | 286.4 | 286.7 | 286.9 | 286.4 |
| | Atomic percentages (%) | 7.8 | 6.1 | 2.6 | 9.0 | 5.9 | 4.6 |
| | FWHM (eV) | 1.6 | 1.6 | 1.6 | 1.6 | 1.6 | 1.6 |
| COOR | Binding energy (eV) | 288.5 | 288.6 | 289.1 | 288.2 | 288.7 | 289.3 |
| | Atomic percentages (%) | 3.9 | 3.4 | 0.7 | 3.1 | 3.2 | 0.6 |
| | FWHM (eV) | 1.6 | 1.6 | 1.6 | 1.6 | 1.6 | 1.5 |
| $CO_3^{2-}$ | Binding energy (eV) | 289.6 | 290.2 | 290.3 | 289.3 | 290.1 | 290.1 |
| | Atomic percentages (%) | 3.0 | 2.4 | 4.2 | 4.7 | 1.6 | 1.7 |
| | FWHM (eV) | 1.6 | 1.6 | 1.5 | 1.6 | 1.6 | 1.4 |

Figures 10A, 10B, 10C, 10D:
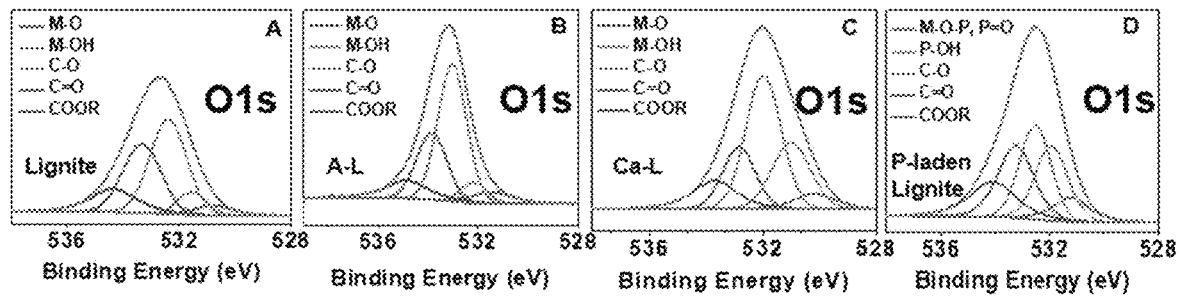
FIGS. 10A-H show graphs illustrating XPS spectra of various adsorbants over under different conditions. (A-C) HR O1s XPS spectra of (A) lignite, (B) A-L, and (C) Ca-L before P sorption at pH values for lignite (5.5), A-L (5), and Ca-L (6). (D-F) HR O1s XPS spectra of (D) lignite, (E) A-L, and (F) Ca-L after P sorption at pH values for lignite (5.5), A-L (5), and Ca-L (6). (G) HR Ca2p XPS spectrum for P-laden Ca-L. (H) HR P2p XPS spectrum for P-laden Ca-L.

In high resolution Ca-L O1s XPS spectra, peaks were assigned at 530.0 eV (M-O), 530.6 eV (M-OH), 531.4 eV (C—O), 532.6 eV (C=O), and 533.7 (COOR) (Table 12 and FIG. 10C). The surface O percentage in Ca-L HR O1s XPS spectrum rose ~6-fold to 61.5 at % vs. lignite due to deposition and formation of CaO, Ca(OH)$_2$, and CaCO$_3$ and other ash-forming minerals like SiO$_2$ (FIGS. 10A and C). After phosphate uptake, the surface $^-$OH content dropped on P-laden Ca-L (from 13.8% to 10.9%) (Table 13 and FIGS. 10C and F) as Ca$^{2+}$ enters the solution from Ca (OH)$_2$ and HPO$_4^-$/PO$_4^{3-}$ salts of Ca$^{2+}$ form. Surface precipitation of Ca$_3$(PO$_4$)$_2$, CaHPO$_4$ is more favored, and phosphate is removed by forming water-insoluble Ca$^{2+}$ salts.

TABLE 12

O1s XPS data for lignite, A-L and Ca-L surfaces before (FIGS. 10A-C) and after (FIGS. 10D-F) PO$_4^{3-}$ uptake

| Chemical Species | | Before PO$_4^{3-}$ uptake | | | After PO$_4^{3-}$ uptake | | |
|---|---|---|---|---|---|---|---|
| | | lignite | A-L | Ca-L | lignite | A-L | Ca-L |
| M—O, M—O—P, P=O | Binding energy (eV) | 530.8 | 531.5 | 530.2 | 531.2 | 531.7 | 530.2 |
| | Atomic percentages (%) | 2.3 | 1.6 | 3.4 | 4.2 | 3.5 | 3.1 |
| | FWHM (eV) | 1.6 | 1.9 | 1.7 | 1.6 | 1.8 | 1.3 |
| MOH, P—OH | Binding energy (eV) | 531.5 | 532.2 | 531.0 | 531.9 | 532.6 | 531.0 |
| | Atomic percentages (%) | 4.0 | 1.6 | 13.8 | 11.3 | 4.3 | 10.9 |
| | FWHM (eV) | 1.2 | 1.2 | 1.6 | 1.4 | 1.3 | 1.3 |
| C—O | Binding energy (eV) | 532.4 | 533.0 | 532.0 | 532.5 | 533.4 | 531.8 |
| | Atomic percentages (%) | 20.6 | 12.3 | 26.0 | 13.7 | 9.0 | 23.0 |
| | FWHM (eV) | 1.6 | 1.4 | 1.5 | 1.4 | 1.3 | 1.4 |
| C=O, CO$_3^{2-}$ | Binding energy (eV) | 533.3 | 533.9 | 532.9 | 533.3 | 534.2 | 533.7 |
| | Atomic percentages (%) | 15.4 | 6.2 | 11.0 | 12.3 | 9.2 | 15.0 |
| | FWHM (eV) | 1.6 | 1.4 | 1.4 | 1.5 | 1.5 | 1.5 |
| COOR | Binding energy (eV) | 534.3 | 534.9 | 533.7 | 534.1 | 535.1 | 533.7 |
| | Atomic percentages (%) | 7.0 | 2.8 | 7.3 | 8.2 | 7.0 | 8.9 |
| | FWHM (eV) | 1.9 | 2.0 | 1.8 | 1.9 | 1.9 | 1.9 |

TABLE 13

Ca2p3 high-resolution XPS data for Ca-L surface before and after PO$_4^{3-}$ uptake

| Chemical Species | | Before P uptake Ca-L | After P uptake Ca-L | Reference |
|---|---|---|---|---|
| Ca(OH)$_2$, Ca$_3$(PO$_4$)$_2$(2p3) | Binding energy (eV) | 346.7 | 347.2 | (Chusuei et al., 1999; NIST, 2012) |
| | Atomic percentages (%) | 1.3 | 2.4 | |
| | FWHM (eV) | 1.7 | 1.6 | |
| CaCO$_3$, CaHPO$_4$ (2p3) | Binding energy (eV) | 347.6 | 347.8 | |
| | Atomic percentages (%) | 8.4 | 7.2 | |
| | FWHM (eV) | 1.6 | 1.7 | |
| CaO (2p1), Ca$_3$(PO$_4$)$_2$ (2p1), Ca(HPO$_4$) (2p1) | Binding energy (eV) | 348.6 | 348.9 | |
| | Atomic percentages (%) | 2.4 | 2.0 | |
| | FWHM (eV) | 1.6 | 1.7 | |

Figures 10E, 10F, 10G, 10H:
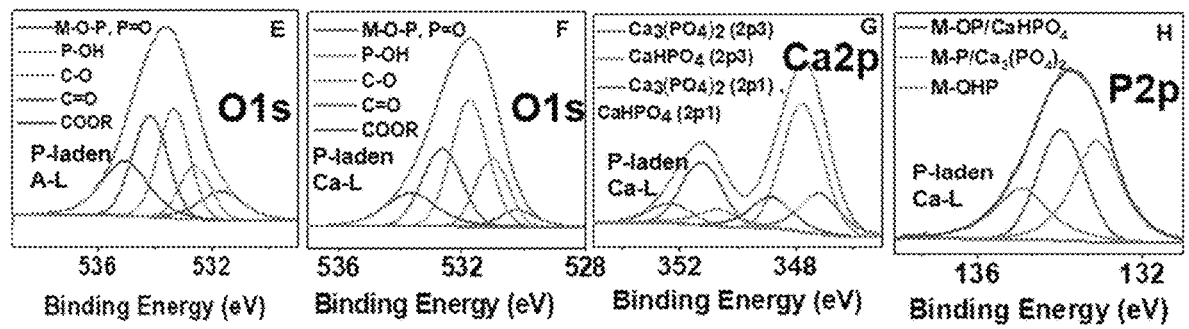

The Ca2p HR XPS analysis of Ca-L exhibited a high CaCO$_3$ percentage (8.4%) and small quantities of Ca(OH)$_2$ (1.3%) and CaO (2p$_{1/2}$) (2.4%) (Table 13). CaO will rapidly and exothermically is converted into Ca(OH)$_2$ in water. Ca2p HR XPS P-laden Ca-L spectrum has three peaks, including 347.2 eV (Ca3(PO4)2 (2p$_{3/2}$)), 347.8 eV (CaHPO4 (2p$_{3/2}$)), and 348.9 eV (Ca$_3$(PO$_4$)$_2$ and CaHPO$_4$ (2p$_{1/2}$)) peaks overlap (Table 13 and FIG. 10G). Stable CaHPO$_4$ (347.8 eV) forms the highest fraction (7.2 at %) of any species resulting from P uptake by Ca-L. A lower intensity (2.2%) peak at 347.2 eV was from Ca$_3$(PO$_4$)$_2$ precipitation. Precipitation of Ca$_3$(PO$_4$)$_2$/CaHPO$_4$ from the near-surface region of Ca-L led to a higher surface P atomic percentage (6.9%) after P uptake versus that of lignite (0.2%) (FIG. 10H and Table 14).

TABLE 14

P2p high-resolution XPS data after PO$_4^{3-}$ adsorption for lignite, A-L, and Ca-L.

| Chemical Species | | Lignite | A-L | Ca-L |
|---|---|---|---|---|
| M-P/ CaHPO$_4$ | Binding energy (eV) | — | — | 133.1 |
| | Atomic percentages (%) | — | — | 2.7 |
| | FWHM (eV) | — | — | 1.4 |
| M-OP/ Ca$_3$(PO$_4$)$_2$ | Binding energy (eV) | 133.6 | — | 134.0 |
| | Atomic percentages (%) | 0.2 | — | 2.6 |
| | FWHM (eV) | 2.0 | — | 1.3 |
| M-OHP | Binding energy (eV) | — | 134.9 | 134.9 |
| | Atomic percentages (%) | — | 0.1 | 1.6 |
| | FWHM (eV) | — | 1.6 | 1.6 |

M = Si or Al in Lignite, A-L, and Ca-L

According to EDX/XRD/XPS analyses and data obtained from the pH and leaching experiments, phosphate uptake by Ca-L predominantly occurs via the formation of insoluble Ca3(PO4)2 and CaHPO$_4$, after the reaction of phosphate species with released Ca$^{2+}$ from the surface (Eqs. (1) and (2)).

8. Column Studies

Figure 11A:
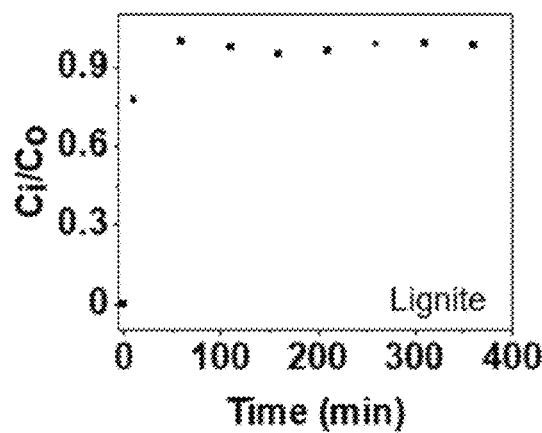
FIGS. 11A-F show graphs illustrating various properties of lignite and lignite-based adsorbants. (A) $PO_4^{3-}$ breakthrough curves of a 46.6 mg/L [$PO_4^{3-}$] for lignite (bed height=3.5 cm, diameter=1 cm, 1.4 g of lignite, particle size 125-150 µm). (B) Effect of Ca-L bed heights (2.5 cm vs 2.0 cm) for diameter=1 cm, 2 g vs. 0.9 g of Ca-L, particle size 125-150 µm. (C) Desorption study for Ca-L using HCl, NaOH, and $NaHCO_3$ stripping agents (~25 mL). (D) Effect of competitive ions (0.05 M and 0.5 M) on phosphate sorption by Ca-L (50 ppm $PO_4^{3-}$ concentration, 25 mL solution volume, 25° C., 24 h). (E) Ca-L real wastewater phosphate (20 mg/L) uptake study at pH 8.0 and 7.0 (adsorbent dose, 0.05 g, solution volume, 25 mL, 25° C., 24 h). Effluent P concentration was below the limit of detection of UV. (F) The cost analysis of lignite, A-L, Ca-L, Ca-A-L, and two commercial activated carbons (Darco KB and Norit ROW GAC). Cost to remove per gram of $PO_4^{3-}$ (Right, Y-axis) and total cost to prepare 1 kg of adsorbent (Left, Y-axis) indicated in the graph.
Figure 11B:
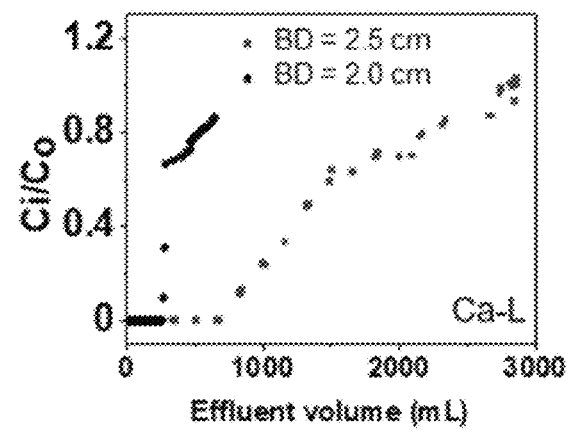

Fixed-bed column studies provide initial flow information for practical scaling. Fixed-bed column (diameter=1 cm, particle size, 125-150 μm, 25° C.) studies were conducted on lignite (3.5 cm bed depth) and Ca-L (2.5 cm and 2.0 cm depths) at a flow rate of 1.5 mL/min for 46.6 mg/L phosphate concentration. The columns were operated under up-flow conditions [44,53]. The process parameters are tabulated in Table 4. FIGS. 11A and B present the lignite and Ca-L column breakthrough curves for phosphate sorption. Two major inflection points occur in the breakthrough curves, (1)

where the column starts to become saturated (breakthrough point) and (2) where it became saturated (exhaustion point) [36]. Breakthrough points occurred after ~15 h for Ca-L and ~2 min for lignite. The adsorbent surface areas, inherent kinetics, capacities, flow rates, temperatures, particle sizes, and shapes play important roles in the breakthrough time. Lignite has lower phosphate adsorption due to lower BET surface area (2.9±0.1 m$^2$/g) than Ca-L (18.0±0.3 m$^2$/g) (Table 3) and reached saturation rapidly. The column uptake capacities were 58.2 mg/g for Ca-L and 4.0 mg/g for lignite (Table 15). Ca-L's column capacity was 4-times lower than its maximum Langmuir phosphate uptake capacity (227.3 mg/g) at 25° C. (Table 5). In contrast, lignite's column capacity was only 1.3 times lower than that of lignite at 25° C. (5.2 mg/g).

TABLE 15

Column parameters for phosphate uptake by Ca-L vs. lignite.

| Parameter | Ca-L | Lignite |
|---|---|---|
| Bed depth (cm) | 2.5 | 3.5 |
| Bed volume (cm$^3$) | 2.0 | 2.7 |
| Weight of carbon (g) | 2.0 | 1.4 |
| Flow rate (mL/min) | 1.5 | 1.5 |
| EBCT (Empty Bed Contact Time) | 1.3 | 1.8 |
| Column capacity (mg/g) | 58.2 | 4.0 |
| Breakpoint capacity (mg/g) | 19.5 | 0.3 |
| Initial PO$_4^{3-}$ concentration (mL/min) | 46.6 | 46.6 |
| PO$_4^{3-}$ concentration at exhaustion point/$C_x$ (mg/L) | 44.7 | 45.0 |
| PO$_4^{3-}$ concentration at break point/$C_b$ (mg/L) | 5.4 | 2.3 |
| Exhaustion volume/$V_x$ (L) | 3.3 | 0.3 |
| Break point volume/$V_b$ (L) | 0.9 | 0.0075 |
| Total time to reach exhaustion point/$T_x$ (min) | 3000 | 60 |
| Total time to reach break point/$T_b$ (min) | 878 | 2 |
| % saturation | 75.6% | 18.7% |

The effect of bed height (2.5 cm and 2.0 cm) was tested for Ca-L's phosphate uptake. Phosphate breakthrough point occurred within 10 h for a 2.0 cm bed height, reducing the column capacity ~3 fold (18.6 mg/g vs. 58.2 mg/g, for bed heights 2.0 cm and 2.5 cm). Insufficient residence time caused by a lower bed depth led to less time for Ca$^{2+}$ dissolution and precipitation Ca3(PO4)2/CaHPO4. Further studies of larger columns with larger adsorbent particle sizes to aid flow considerations are required to better optimize the column parameters for Ca-L and to achieve a breakthrough uptake closer to its Langmuir capacity. Ca-L's experimental data and the relationship between operating parameters were analyzed using Thomas, Yoon-Nelson, and Adams-Bohart models (Supporting Information). Thomas and Yoon-Nelson models gave better fits to the Ca-L phosphate uptake (Table 16). The Thomas model predicted a Ca-L (2.5 cm bed height) phosphate capacity of 44.6 mg/g vs the observed capacity (58.2 mg/g).

9. Ca-L Regeneration, Selectivity, and Real Wastewater Study

Figure 11C:
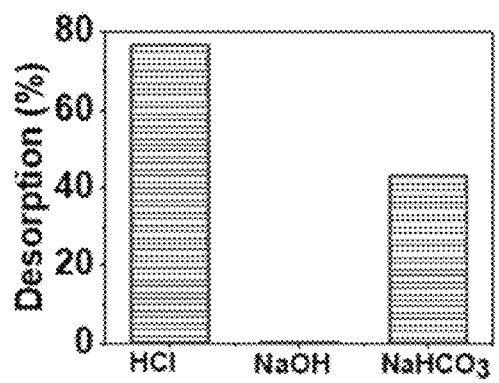

The regeneration of spent Ca-L (FIG. 11C) was examined after phosphate uptake using 20 ppm initial phosphate concentration (0.6 g adsorbent dose, 300 µmL solution volume, 24 h, at pH 7 and 25° C.). Phosphate uptake was 10 mg/g at 25° C. and pH 7. Stripping employed 0.5 M NaHCO3(pH=8.5), 1 M NaOH (pH=14.8), and 0.5 M HCl (pH=0.2). Desorption capacities were calculated by multiplying the desorbed concentration (Cdes) by the stripping agent volume (V) and dividing it by the adsorbent weight (m). Desorbability (%) was defined as the ratio of desorbed capacity vs adsorbed capacity. HCl stripping gave the highest desorption with the stripping strength order HCl (76.7%) >NaHCO$_3$(42.9%)>NaOH (0.4%). About 76% of precipitated phosphate desorbed in HCl because Ca-phosphates/hydrophosphates are highly soluble in HCl. The low brushite (CaHPO4·2H2O) solubility in NaOH caused poor phosphate desorption (0.4%) with 1 M NaOH.

Figure 11D:
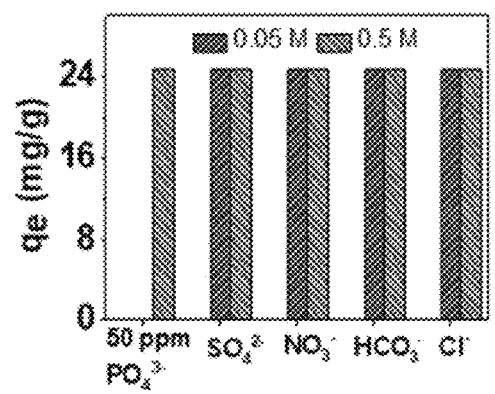

The competitive ion (SO$_4^{2-}$, NO$_3^-$, HCO$_3^-$ and Cl$^-$) effect on phosphate uptake by Ca-L was tested using binary systems at different competitive ion concentrations (0.05 and 0.5 mol/L) (FIG. 11D). Different solution volumes of competitive ions were added to 25 mL of 50 mg/L phosphate solution. Ca-L is highly selective for phosphate anion uptake when SO$_4^{2-}$, NO$_3^-$, HCO$_3^-$, and Cl$^-$ are present. Acid-base properties, geometric shapes, and metal complexing abilities determine the selectivity of an adsorbent for phosphate [45]. According to the hard/soft acid-base theory, Ca$^{2+}$ in Ca-L is a hard acid, and electron pair donating ability is highest in PO$4^{2-}$ and decreases according to the order of PO$4^{2-}$>HCO$_3^-$>SO$_4^{2-}$>Cl$^-$>NO$_3^-$. A maximum phosphate capacity of 24.8 mg/g was obtained at all three concentrations (0.05 M and 0.5 M) for all four competitions.

Figure 11E:
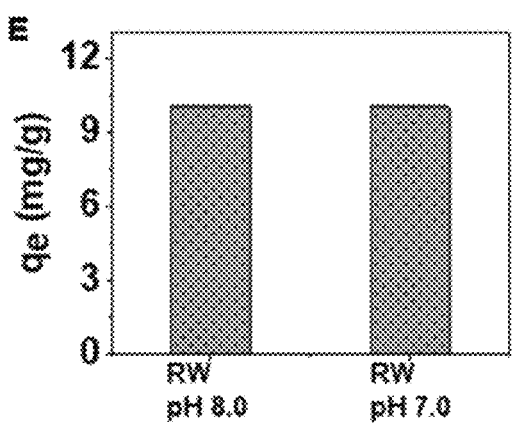

Ca-L showed a 10 mg/g phosphate uptake (100% removal) from 20 mg/L phosphate spiked real wastewater (FIG. 11E). Ca-L is a better candidate to treat real wastewater as it reduces phosphate below the USEPA's suggested aqueous phosphate level (0.01 ppm) to avoid eutrophication [41].

10. Economic Significance

Figure 11F:
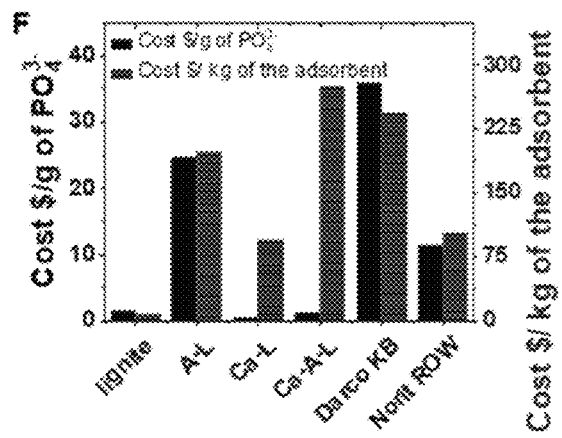

The current study demonstrated that Ca-L was effective in precipitating aqueous phosphates/hydrophosphates as Ca3 (PO4)2/CaHPO4. FIG. 11F displays the cost comparison for unit weight of the adsorbent, including lignite, A-L, Ca-L, Ca-A-L, and two commercial activated carbons, Darco KB and Norit ROW GAC. The total cost of an adsorbent includes the cost for source/chemicals, energy, and labor [15]. The lignite is affordable (0.02$/kg) however, the energy is required for its preparation (drying and milling of lignite during its cleaning), raising its total cost ($7.9/kg of lignite). Although the production cost of Ca-L is higher than lignite (due to required CaCO3), its phosphate (per gram)

TABLE 16

Parameters of Adams-Bohart, Thomas, and Yoon-Nelson model under Ca-L column adsorption process

| | | | Adams-Bohart Model | | | | Thomas Model | | | Yoon-Nelson Model | | |
|---|---|---|---|---|---|---|---|---|---|---|---|---|
| $C_O$ (mg/L) | Q (mL/min) | Z (cm) | $k_{AB} \times 10^{-4}$ (L/mg min) | $N_O$ (mg/L) | $R^2$ | qo (mg/g) | $k_{TH} \times 10^{-4}$ (L/mg min) | $q_O$ (mg/g) | $R^2$ | $k_{TH} \times 10^{-4}$ (L/mg min) | τ (min) | $R^2$ |
| 46.6 | 1.5 | 2.5 | 0.086 | 162744 | 0.37 | 162.7 | 0.32 | 44.7 | 0.22 | 15 | 1276.2 | 0.22 |
| 46.6 | 1.5 | 2.0 | 0.49 | 54220 | 0.31 | 54.2 | 1.2 | 46.7 | 0.52 | 56 | 618.8 | 0.52 | removal is ~26% that of lignite; Ca-L has a higher phosphate-binding potential than lignite, reducing the ratio (cost $/weight of $PO_4^{3-}$) The high cost of KOH ($47.6/kg) and the high KOH: lignite mass ratio (3:1) account for the large cost of A-L ($24.6/g of $PO_4^{3-}$). Two commercial activated carbons, Darco KB ($244/kg) and Norit ROW GAC ($103/kg) have low phosphate removal potentials (6.5 mg/g and 8.9 mg/g) [42] resulted in large costs (90 and 30 times higher than Ca-L) to remove 1 g of $PO_4^{3-}$.

Basic Ca-L can restore acidic soils and increases soil fertility. Due to its high phosphate uptake, Ca-L could potentially serve as a slow-release phosphate fertilizer. It removes 100% phosphate from spiked-real wastewater. Also, ~76% adsorbed phosphate in Ca-L can be des-orbed after 1st cycle of acidic regeneration. Moreover, Ca is non-toxic and abundant, favoring real applications. Overall, our results indicated that Ca-L is a better candidate for phosphate removal with a low phosphate stripping cost. However, further tests are required to evaluate its use for industrial applications. This study includes one regeneration step for Ca-L; further regeneration steps are needed to assess its full reusability potential. $Ca^{2+}$ compounds initially present on Ca-L supply the $Ca^{2+}$ for phosphate precipitation. Thus, larger initial loadings might last through more cycles but not be as efficient in total phosphate uptake per initial Ca content. This study can be further enhanced by employing other Ca additives such as $CaCl_2$), $CaCO_3$ etc. Preparation of Ca-A-L requires more energy expenditure than Ca-L since its production involves two pyrolysis steps. Also, a huge carbon loss occurred during that process.

Conclusions

Engineered lignite carbons including, activated lignite (A-L), $Ca^{2+}$-modified lignite (Ca-L), and $Ca^{2+}$-modified activated lignite (Ca-A-L) were prepared using an affordable lignite system to mitigate phosphate from aqueous solutions. Although A-L has a very high surface area (2854 $m^2$/g) and a large pore volume (0.5 $cm^3$/g), it had poor phosphate sorption capacity. Low surface area Ca-L (18.0±0.3 $m^2$/g) achieved an exceptional phosphate uptake (384.6 mg/g at 45° C.), noted to be the highest value among calcium-modified lignite adsorbents. This uptake was due to the substantial amounts of micro-sized $CaCO_3$, CaO, and $Ca(OH)_2$ particles which act stoichiometrically. XRD, EDX, and XPS revealed that these particles release $Ca^{2+}$ precipitating phosphate/hydrophosphate onto the surface. Spent Ca-L can be recycled effectively using HCl. Furthermore, it exhibited high selectivity towards phosphates and remediates phosphates from synthetically polluted (phosphate spiked) real wastewater. Ca-L shows a high affinity for phosphates in the presence of other anionic contaminants including $SO_4^{2-}$, $NO_3^-$, $HCO_3^-$ and $Cl^-$. Preliminary Ca-L column studies showed the column capacity was 4-times lower than its Langmuir capacity. Therefore, further column studies will be required to determine optimal conditions for adsorption with Ca-L during practical scale-up. Unit weight of phosphate removal cost is less using Ca-L than commercial activated carbons and lignite. High Ca-L phosphate uptake suggests that it could serve as a slow-release phosphate fertilizer. Therefore, studies of the applicability of Ca-L as a soil amendment and its potential commercialization are already planned in a funded study. Moreover, additional interference experiments need to be performed to determine the selectivity of Ca-L for phosphate removal from a variety of real wastewater samples.

Example 4—Lignite, Thermally-Modified and Ca/Mg-Modified Lignite for Phosphate Remediation Abstract Aqueous phosphate uptake is needed to reduce global eutrophication. Negatively charged adsorbent surfaces usually give poor phosphate sorption. Chemically- and thermally-modified lignite (CTL) was prepared by impregnating low-cost lignite (RL) with $Ca^2$ and $Mg^2$ cations, basified with KOH (pH~13.9), followed by a 1 h 600° C. pyrolysis under nitrogen. CTL has a positive surface (PZC=13) due to basic surface Ca and Mg compounds, facilitating the aqueous phosphate uptake. $CaCO_3$, MgO, $Ca(OH)_2$, and $Mg(OH)_2$ surface phases with 0.22 m particle sizes were verified by XRD, XPS, SEM, TEM, and EDX before and after phosphate uptake. Higher amounts of these mineral phases promoted more CTL phosphate uptake than raw lignite (RL) and thermally treated lignite (TL) without Ca/Mg modification. Phosphorous uptake by $Ca^2$/$Mg^2$ occurs not by classic adsorption but by stochiometric precipitation of $Mg_3(PO_4)_2$, $MgHPO_4$, $Ca_3(PO_4)_2$, and $CaHPO_4$. This offers the potential of substantial uptake capacities. CTL's phosphate removal is pH-dependent; the optimum pH was 2.2. Water-washed CTL exhibited a maximum Langmuir phosphate uptake capacity of 15.5 mg/g at pH 7, 6 and 14 times higher than that of TL and RL, respectively (particle size<150 μm, adsorbent dose 50 mg, 25 mL of 25-1000 ppm phosphate concentration, 24 h, 25° C.). The unwashed CTL exhibited a maximum Langmuir phosphate removal capacity (80.6 mg/g), 5.2-times greater than the washed CTL (15.5 mg/g). Insoluble $Ca^2$ and $Mg^2$ phosphates/hydrophosphate particles dominated CTL's phosphate removal. Phosphates were recovered from both exhausted unwashed and washed CTL better in HCl than in NaOH. P-laden washed CTL exhibited a slow phosphate leaching rate under initial pH of 6.5-7.5 (52-57% over 20 days) after phosphate uptake, indicating it could serve as a slow-release fertilizer. Unwashed CTL retained more phosphates than washed CTL (cumulative $q_e$ for 4 cycles=391.8 mg/g vs 374.7 mg/g) and potentially improves soil fertility more.

Introduction

Eutrophication, resulting from the nutrient enrichment of waters, is a current global crisis (Nixon, 2012). Phosphorous, a limiting plant nutrient widely applied in agriculture worldwide, often contaminates stormwater run-off. Environmental aqueous phosphate in concentrations as low as 100 μg/L can stimulate undesirable algal and plant blooms (Carvalho et al., 2013). These blooms lead to water quality deterioration, dissolved oxygen deficiency, biodiversity abatement, and economic losses (Zanchett and Oliveira-Filho, 2013). Annually, the US spends $2.2 billion to combat freshwater eutrophication (Dodds et al., 2009). Phosphorus regulation is essential to mitigate eutrophication. The WHO and EPA recommend that phosphorus levels should be lower than 10 mg/L in natural waters (US EPA, 2015), while phosphate concentrations should be below 0.10 mg/L in rivers and streams and below 0.05 mg/L in lakes and reservoirs, according to the Australian water quality guidelines (Huang et al., 2017). Phosphate recycling and recovery will eventually be necessary for problematic phosphorus depletion.

Phosphorous is discharged into surface waters from point source wastewater and nonpoint source run-off. Typically, municipal wastewater has approximately 5-20 mg/L total phosphorus (organic and inorganic) concentration before treatment (Hasson et al., 2016). Inorganic phosphorus mainly exists as $PO_4^{3-}$, $HPO_4^{2-}$, and $H_2PO_4^-$, depending on the solution pH (Yin et al., 2017). Traditional precipitation, reduction, flotation, coagulation, flocculation, and membrane filtration methods have many drawbacks, including initial investment, chemical consumption, efficiency, simplicity, and scalability (Langer et al., 2017; Leo et al., 2011). Efficient, practical, green, and restorable techniques have been developed for contaminant removal (Bombuwala Dewage et al., 2018; Navarathna et al., 2020). After adsorptive recovery, adsorbed phosphates have been reused as soil fertilizers, making sorption technology more ecofriendly (Mosa et al., 2020). Phosphate recovery from wastewater treatment plants (WWTP) can theoretically replace 40-50% of total phosphate application needs (Egle et al., 2016).

Coal seams are abundant, and various grades of coal can be employed as a support/sorbent to remove contaminants from aqueous solutions (Simate et al., 2016). Aqueous $Cu^{2+}$, $Pb^{2+}$, and $Ni^{2+}$ ions were fixed by surface carboxyl and hydroxyl groups (~60-90%) on the low-rank coal, "lignite," because of its elevated cation exchange capacity and surface complexation ability (Pehlivan and Arslan, 2007). However, these oxygenated active centers have low affinities for anionic pollutants (Qi et al., 2011; Zhang et al., 2010). Introduction of $Al^{3+}$, $Ca^{2+}$, $Bi^{3+}$, $Fe^{3+}$, and $Mg^{2+}$ to cation-deficient adsorbent surfaces previously raised phosphate removal (Fang et al., 2020; Karunanayake et al., 2019; Yang et al., 2018; Zhang et al., 2013; Zhou et al., 2013).

Yao et al., 2013 found that spent Mg-enriched tomato leaf char sorbents were successfully reused even after 10 sorption cycles and employed to treat phosphorus deficiency in soils. Equal amounts of weakly-bound P (~3.2% of the amount of $PO_4^{3-}$ on this char) were released to water each day (average/day) over 11 consecutive days. Therefore, it behaved as a slow-release fertilizer (Yao et al., 2013). These modified, environmentally friendly sorbents could sequester C in soils and are more beneficial than commercial adsorbents. Colloidal and nano-sized MgO and $Mg(OH)_2$ surface particles on anaerobically digested sugar beet biochar improved mononuclear and polynuclear phosphate adsorption (Yao et al., 2011; Zhang et al., 2012). MgO-modified peanut shell biochar adsorbed 20% more $PO_4^{3-}$ than raw peanut shell biochar due to the presence of MgO active surface sites. The application of P-laden MgO-biochar to coastal alkaline soils improved the available P and P uptake by field rice plants, which increased rice yields (Wu et al., 2019). $Ca^{2+}$ was released from alkaline Ca-doped bio-char ($Ca(OH)_2$: biosolids, 20 wt %) at pH=4, into a solution where it reacts with phosphate to form insoluble brushite ($CaHPO_4$), which precipitated (Antunes et al., 2018). The maximum phosphate removal capacity of this biochar was 79 mg-P/g (at initial pH 3). Elevated phosphate sorption was achieved by a novel $Mg(OH)_2/ZrO_2$ composite (MZ) resulting from both 1) ligand exchange between the $ZrO_2$ and $MgHPO_4$ and 2) reaction between $Mg(OH)_2$ and phosphate forming $MgHPO_4$ and $Mg_3(PO_4)_2$ (Lin et al., 2019). Dissolved $Mg^{2+}$ originating from the $Mg(OH)_2$ also synergistically enhanced the phosphate-binding on the $ZrO_2$ component in MZ. $Ca^{2+}$—$Mg^{2+}$ pre-loaded (19 wt % $Mg^{2+}$ and 19 wt % $Ca^{2+}$/biomass) on corncob biochar had a very high (326 mg/g) Langmuir phosphate uptake capacity (Fang et al., 2015). No previous work has been published regarding the $Ca^{2+}/Mg^{2+}$ modification of cheaper and widely available lignite to remove aqueous phosphates.

In this Example, locally abundant raw lignite (RL) was converted into a chemically- and thermally-modified lignite (CTL) via surface deposition of $MgO/Mg(OH)_2$ and $CaO/Ca(OH)_2$ and pyrolysis at 600° C. CTL promoted phosphate removal due to the formation of precipitates ($Mg_3(PO_4)_2$, $MgHPO_4$, $Ca_3(PO_4)_2$, and $CaHPO_4$) formed upon reaction of solution phosphate with $Mg^{2+}$ and $Ca^{2+}$ ions released from CTL. Crystallographic phase structures on pre- and post-P-sorbed materials were characterized by XRD. The particle elemental compositions were further characterized by XPS/EDX analysis. CTL phosphate sorption follows the pseudo-second-order kinetic model. Untreated RL showed significantly higher P specific sorption per unit surface area (12.1 mg/m$^2$) than TL (0.4 mg/m$^2$) and washed CTL (1.2 mg/m$^2$) (40° C., pH 2.2, particle size, particle size<150 µm).

Materials and Methods

Lignite was provided by the Mississippi Lignite Mining Company (Red Hills Mine, Ackerman, Miss., USA). Raw lignite (RL) was washed thoroughly with deionized water to remove extraneous materials such as dirt, sand, and other impurities, followed by oven drying at 80° C. for 48 h (1 atm, air). The dried lignite was ground into fine particles using a high-speed multifunctional grinder (CGOLDENWALL, China, 2500 W, 36000/min, model no: HC150T2) and sieved to 150-300 µm. A high SiO2 fraction was (19.9%) in this lignite's ash (total~25.0%). All chemicals used, including magnesium sulfate, calcium sulfate hemihydrate, potassium hydroxide, concentrated sulfuric acid, ammonium molybdate, and ascorbic acid, were analytical grade and purchased from Sigma Aldrich.

1. Preparation of $Ca^{2+}$ and $Mg^2$-Loaded Lignite Adsorbent (CTL)

RL (100 g), washed and dried as previously described, was impregnated with a single solution of MgSO4 and CaSO4 formed by combining two solutions prepared separately. A 10% aqueous MgSO4 solution (10 g of MgSO4 [0.083 mol] dissolved in 100 mL of water, [1.992 g of Mg]) was prepared. Then a 10% aqueous solution of CaSO4.1/2H2O (10 g of CaSO4.1/2H2O [0.069 mol] dissolved in 100 mL of water, [2.76 g of Ca]) was made and added into the MgSO4 solution. Next, 1.5 M aqueous KOH (350 mL, 29.4 g of KOH, 13.9% wt. of K) was added to the combined MgSO4 and CaSO4.1/2H2O solution to adjust the pH to ~13.9. RL (100 g) was stirred in the $Ca^{2+}$—$Mg^{2+}$ and KOH containing solution for 1 h and aged 24 h. Then, the resulting slurry was transferred into watch glasses. These slurries were then oven-dried (1 atm, 105° C., 4 h) and vacuum oven-dried (0-4.9 atm, 60° C. for overnight). The dried material weighs 139.2 g. This was then pyrolyzed at 600° C. in a muffle furnace under nitrogen at a 20° C./min ramp rate to 600° C., followed by holding at 600° C. 1 h. This temperature was chosen according to Takaya et al., 2016. The resulting solid (wt. 89.0 g) was washed with DI water, oven-dried (1 atm, 80° C. overnight), giving a solid (wt., 53.9 g). This difference showed that substantial amounts (35.1 g) of soluble $Ca^{2+}$, $Mg^{2+}$, and K+ compounds were removed. This resulting CTL was crushed to particle sizes smaller than 0.3 mm. CTL (chemically- and thermally-treated lignite) was sieved into three particle sizes (<150, 150-300, and >300 µm) and stored in air-sealed containers for future characterization and adsorption experiments. An as-received raw lignite sample (100 g) was identically pyrolyzed at 600° C., without adding any chemicals, generating thermally-treated lignite (TL) (59.5 g) to compare with CTL and RL, after a wt. loss of 40.5 g.

2. Characterization Techniques

Detailed characterization methods can be found in the supplementary materials. Surface areas, DFT pore sizes, pore volumes, and micropore volumes of RL, TL, and CTL were determined. The surface areas were measured using $N_2$ and $CO_2$ physisorption using the BET method run on a Micromeritics Tristar II Plus surface analyzer. Scanning electron microscopy (SEM) was performed on adsorbents using a Carl Zeiss EVO50VP Variable Pressure Scanning Electron Microscope with an accelerating 15 kV voltage. A JEOL 2100 200 KV TEM with Oxford X-max 80 EDS detector was used to evaluate the CTL's inner morphology. Surface region (depth of 3.1 m) elemental distribution was determined by Energy-dispersive X-ray spectroscopy using a Bruker Quantax 200× Flash EDX Spectrometer System (LN2-free high-speed 30 mm² SDD Detector) under a magnification 150×, employing an interaction diameter of ~3.8 μm. Surface chemistry was studied using X-ray photoelectron spectroscopy to elucidate elements present and their oxidation states to a maximum detection depth of 80 Å. XRD analysis was performed on RL, TL, and CTL to a penetration depth of 0.5 mm and a spot size of 1 cm². An ECS 4010 elemental combustion system (Costect Analytical Technologies Inc.) was used to analyze the C, H, and N composition. The samples were oven-dried for 2 h at 105° C. before assessing their moisture contents. The samples were heated in air in a muffle furnace at 750° C. for 4 h in an uncovered porcelain dish to determine their ash contents. Organic oxygen percentage was calculated by (100−[C+H+N+ash]). NaCl solutions, adjusted from pH 2-12 using 1 M $HNO_3$ and 1 M NaOH, were used with a pH meter to determine the adsorbents' point of zero charges (PZC). Total Mg and Ca loadings of CTL were determined using AAS after complete acid digestion with 1:1 95% $H_2SO_4$/70% $HNO_3$ (50 mL).

3. Adsorption Experiments

Unless otherwise specified, a 0.05 g adsorbent dose, 50 ppm phosphate concentration, and 25 mL solution volume were used in batch experiments without a pH adjustment (pH=5.5). This initial pH changed due to leaching of $Ca^{2+}$/$Mg^{2+}$ from the CTL. Batch experiments were conducted in a Thermo Forma Orbital Shaker (200 rpm, 25±0.5° C.) for 24 h to achieve equilibrium. The vials were removed after the shaking period, and the suspensions were filtered through Whatman 1001-110 Qualitative filter papers (11.0 cm diameter, pore size, 11 m). Three replicates of each experiment were performed. Solution pH was determined before and after adsorption. The residual phosphate concentrations in the filtrates were determined calorimetrically by following the reduction of the blue-colored molybdenum phosphate complex at 830 nm using a Shimadzu, UV-2550 double beam Spectrophotometer. The analysis was conducted according to the ascorbic acid method (Lozano-Calero et al., 1996). The detailed phosphate determination procedure is described in the supplementary materials.

Phosphate sorption versus pH was determined by varying the solution pH from 2.2 to 11.5 by dropwise addition of 1 M HCl or 1 M NaOH. Kinetic experiments employed samples containing 50 ppm phosphate concentrations, collected at preselected times (5 min. up to 24 h). Adsorption isotherm experiments were conducted using 25-1000 ppm phosphate solutions under the optimum adsorption pH (~2.2) and practically important pH level (pH~7) at 25, 30, and 40±0.5° C. for 24 h. Data evaluation methods (including isotherm and kinetic model fittings) and equations were shown in supplementary materials.

4. Ca and Mg Leaching from CTL

A control experiment was conducted to investigate $Ca^{2+}$ and $Mg^{2+}$ leaching into DI water at pH 2.2. Washed CTL (0.1 g) was added into 50 mL DI water (without phosphates) at pH 2.2. This suspension was stirred for 24 h, at 25° C. (200 rpm), filtered, and the filtrates were quantified using AAS for leached Ca and Mg amounts.

5. CTL Regeneration, Reuse, and Desorption Kinetics

Figures 24A, 24B:
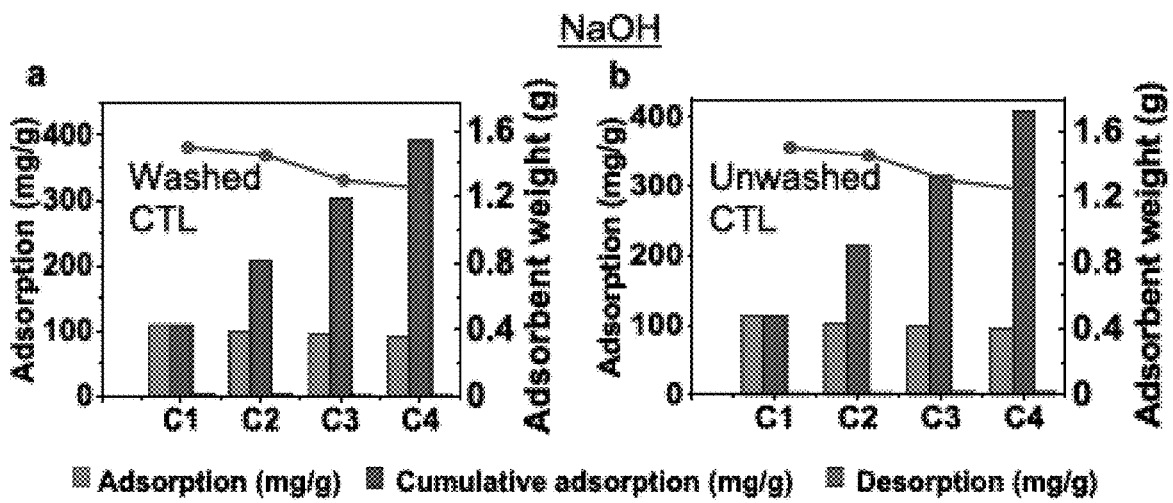
FIGS. 24A-G show graphs illustrating analysis of adsorption-desorption. (A) Washed CTL and (B) unwashed CTL adsorption-desorption tested for 4 cycles (adsorbent dose 50 mg, 25 mL of 1000 ppm phosphate, 24 h, pH 2.2, 40° C.). Desorption performed using 1 M NaOH as the stripping agent. (C) Washed CTL and (D) unwashed CTL adsorption-desorption test for 4 cycles, C1-C4 (adsorbent dose 1.5 g, 750 mL of 1000 ppm phosphate, 24 h, pH 7, 25° C.). Desorption performed using 0.5 M HCl (10 mL) as the stripping agent. Adsorbent weight (Right Y-axis) was lost after each cycle. (E) XRD analysis of P-laden unwashed CTL and P laden washed CTL. (F) phosphate desorption kinetics from washed CTL for 20 days. Equilibrium phosphate concentrations (Y-axis) were determined for pH 6.5, 7.0, and 7.5 DI water after 20 days (X-axis) (0.15 g of P-laden CTL where 17.3 mg of phosphate uptake occurred per g of CTL) was added into each pH level. (G) Final pH after each day vs. initial pH of DI water.
Figures 24C, 24D:
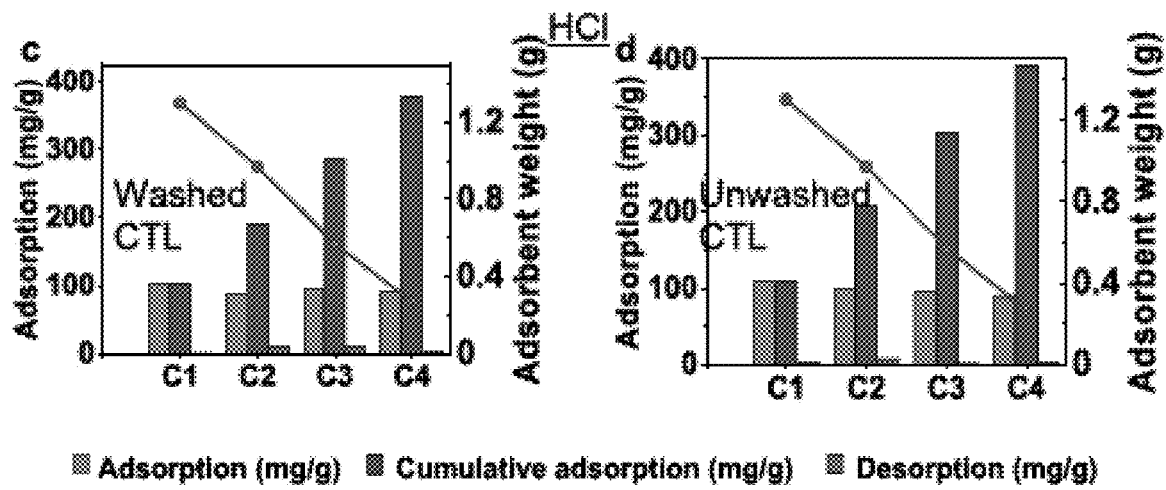

The regeneration tests for P-laden washed CTL and P-laden unwashed CTL were conducted using an aqueous NaOH stripper and performed according to Du et al., 2019 with a minor modification. CTL (1.5 g) was first equilibrated with 750 mL of 1000 ppm phosphate solution in a mechanical shaker (200 rpm, 25° C., 24 h) at pH 7. After phosphate uptake, the suspension was filtered, and the P-loaded CTL was washed with DI water (~50 mL) to remove traces of unadsorbed P and only H-bonded phosphate on the CTL surface. After oven-drying (1 atm, 2 h, 105° C.), P-loaded CTL was desorbed using a 1 M NaOH (10 mL, 25° C.) stripping treatment while stirring in a single batch. The filtrates were analyzed for released phosphate concentrations using the same colorimetric technique as previously described. Four adsorption-desorption cycles were performed. Since NaOH was not a potent phosphate stripping agent, both washed CTL and unwashed CTL sorbents were subjected to acidic stripping (FIGS. 24C-D). Initially, a 1000 ppm phosphate solution (750 mL for both) was used to load P onto 1.5 g of each adsorbent at pH 7. Desorption was performed using 0.5 M HCl (10 mL) as the stripping agent.

A desorption kinetic study was conducted on P-laden washed CTL. Initially, phosphate was adsorbed onto CTL (0.6 g) from a solution (100 ppm, 300 μmL) in a plastic bottle during vigorous shaking for 24 h (pH 7, 25° C., 200 rpm). This suspension was filtered; the P-loaded CTL was washed with DI water (~150 μmL) to remove unadsorbed P and then oven-dried (1 atm, 105° C.) overnight. A series of 100 mL DI water samples (pH=6.5, 7.0, and 7.5) were prepared, and P-loaded CTL (0.15 g) was added to each. Samples (1 mL aliquots) were removed on consecutive days, and leached phosphate concentrations were determined. The pH of the DI water was also measured each day.

Results and Discussion

1. Composition and textural properties of RL, TL, and CTL

Coal surface area per unit weight depends on its source and rank and are typically ~100 m²/g for lignite (Mohan and Pittman Jr., 2006). A very low lignite surface area ($S_{BET}$, 1 m²/g) was also reported (Milicevic et al., 2012). Specific surface areas for RL, TL, and CTL were calculated through Brunauer-Emmett-Teller (BET) theory and shown in Table 17. $CO_2$ and $N_2$ were employed as adsorbates for the BET surface area determinations. BET using $N_2$ can be inaccurate for samples with higher micropore contents (<1.2 nm) because the slow rate of $N_2$ diffusion blocks pore filling at 77 K (de Jonge and Mittelmeijer-Hazeleger, 1996). In contrast, $CO_2$ fills micropores far faster because of its far higher thermal energy at 0° C. (McLaughlin, 2012). Specifically, the BET surface areas using $N_2$ were 2.9, 46, and 21 m²/g (Table 17) for RL, TL, and CTL, respectively (particle size, 150-300 μm) (Table 17). The corresponding surface areas using $CO_2$ were significantly larger (35, 127, and 120 m²/g for RL, TL, and CTL, respectively), indicating the abundance of narrow micropores in these samples.

TABLE 17

Textural and elemental properties of Rl, Tl, and CTL (washed form)

| Parameter | Adsorbent | | |
|---|---|---|---|
| | RL | TL | CTL (washed form) |
| BET (m2/g)[a] at the particle size 150-300 μm | | | |
| $N_2$ | 0.4 | 46.0 | 21.0 |
| $CO_2$ | 35 | 127 | 120 |
| $q_e$ (mg/g)[b] at 25° C. | 2.4 | 0.6 | 11.6 |
| Sorption ability (mg/m²) ($N_2$ BET)[c] | 6.0 | 0.01 | 0.6 |
| Sorption ability (mg/m²) ($CO_2$ BET) | 0.07 | 0.05 | 0.10 |
| Pore volume (cm³/g) | | | |
| $N_2$ | 0.0008 | 0.0109 | 0.0054 |
| $CO_2$ | 0.0077 | 0.0270 | 0.0184 |
| Micropore volume (cm³/g) | | | |
| $N_2$ | 0.0003 | 0.0100 | 0.0031 |
| $CO_2$[d] | N/A | N/A | N/A |
| DFT pore size (nm)[e] | | | |
| $N_2$ | 2.9 | 2.3 | 1.7 |
| $CO_2$ | 0.54 | 0.50 | 0.49 |
| Moisture (%) | 3.2 | 3.2 | 2.5 |
| C (%) | 39.4 | 26.5 | 13.5 |
| H (%) | 2.7 | 1.4 | 0.8 |
| N (%) | 1.2 | 1.4 | 0.9 |
| O[f] (%) | 16.7 | 11.7 | 9.8 |
| Ash (%) | 25.0 | 59.0 | 75.0 |
| PZC | 3.9 | 9.4 | 11.8 |
| Yield (%) | — | 59.5 | 38.7 |

[a]Adsorbent surface areas were measured at the particle size 150-300 μm. When the particle size of all three adsorbents decreased to <150 μm, their BET surface areas (using N2) increased (RL = 2.9 m²/g, TL = 120 m²/g, CTL = 60 m²/g).
[b]RL, TL, and CTL uptake capacities ($q_e$) at the particle size 150-300 μm were obtained from FIG. 29A.
[c]Phosphate removal capacity was divided by the absorbent surface area to obtain specific sorption ability (mg/m²).
[d]Micropore volumes using CO2 were negligible for all three adsorbents.
[e]DFT theory accurately describes the pores in micro- and mesopore range.
[f]O content presented here does not reflect the oxygen associated with their inorganic constituents.

RL's low surface area (35 m²/g) increased to 127 m²/g in TL after heating at 600° C. under $N_2$. When the lignite is pyrolyzed, the moisture and volatile and decomposing matter are evaporated. This out-gassing leads to new pore formation, or opening of closed pores, creating higher surface area materials. The average pore volume increased, and the average pore radius decreased slightly in TL vs. RL (Table 17). A 40.5% weight loss occurred after RL's thermal treatment at 600° C. (yield of TL was 59.5%). The CTL surface area tripled versus RL (120 vs. 35 m²/g) due to fine $MgO/Mg(OH)_2$, $CaO/Ca(OH)_2$, and $CaCO_3$ particle formation, possibly loss of tightly held water and lignite structural changes. The oxides form the corresponding hydroxides on water washing. These surface deposits close some CTL pores, reducing total pore volume relative to TL. Mg/Ca compound existence on the CTL surface was observed from SEM/EDX observations (FIGS. 21D-I), which increase the removal of phosphate. CTL's surface area, measured using $CO_2$, is slightly lower than TL (Table 17), which is consistent with the previous literature. The incorporation of $MgCl_2$ into wood biomass caused the micropores' blockage (MgO precipitation) and reduced the surface area by over one-third (Chen et al., 2020).

Figures 26D, 26E, 26F:
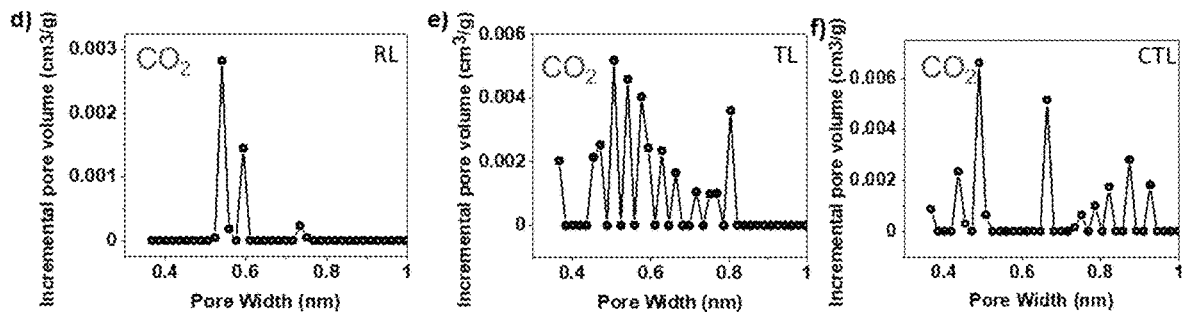

Coals contain micropores (<1.2 nm), mesopores (1.2-30 nm), and macropores (>30 nm) (Simate et al., 2016). Pore sizes obtained from the NL-DFT method were presented in Table 17. DFT theory accurately describes the pores in the micro- and mesopore range. NL-DFT treats the sample as an effective porous material, where heterogeneity is approximated by a distribution of pore sizes. Thus, heterogeneity due to the chemical groups on the surface, pore shape variations, pore networking, and blocking effects is not accounted for explicitly (Fraissard and Conner, 1997; Inagaki, 2006). Pore size distributions of RL, TL, and CTL were obtained using both $N_2$-DFT (FIGS. 26A-C) and $CO_2$-DFT (FIGS. 26D-F). RL has a wide pore size distribution (2-25 nm), as illustrated in FIG. 26A. TL has a higher mesopore fraction than RL, distributed from 1.8 to 2.3 nm by $N_2$-DFT (FIG. 26B). CTL is highly microporous, with pores narrowly distributed around 1.8 nm (FIG. 26C). $CO_2$-DFT found average pore diameters ranging from 0.49 to 0.54 nm for these three lignite adsorbents (FIGS. 26D-F and Table 17). Phosphate anions have diameters of 0.223 nm, which increase to 0.339 nm with its water hydration shell (Zhong et al., 2015). Thus, a portion of micropores in all three adsorbents have access to hydrated phosphate.

Figure 20A:
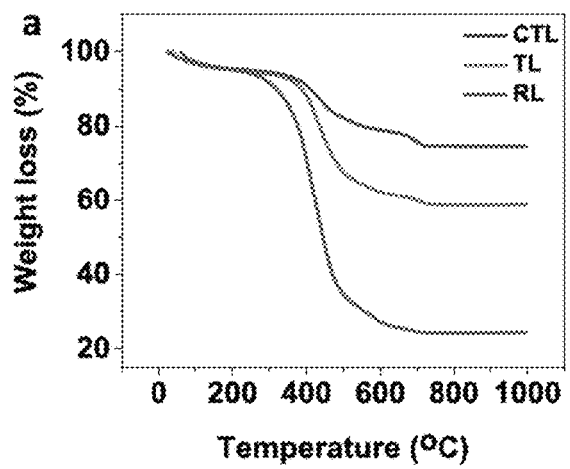
FIGS. 20A-B show graphs illustrating analysis of RL, TL, and washed CTL. (A) TGA analysis of RL, TL, and washed CTL under 02 (heating rate, 10° C./min). (B) XRD analysis of RL, TL, washed CTL, and P-laden washed CTL. Phosphates were adsorbed to the CTL surface at pH=2.2.

The PZC of TL (−9.4) versus RL (−3.9) (Table 17) reflects the presence of basic oxides, hydroxides, and carbonates formed during the 600° C. lignite pyrolysis. The high TL porosity was caused by mass loss. The following extensive washings removed many basic oxides, hydroxides, and some carbonates from TL. The PZC of CTL increased to 11.8. The abundant silica was detected in both CTL and TL is from original lignite ash (19.9%, SiO2), which is in good agreement with XRD analysis. Lignites are carbonaceous with 20-25% fixed carbon (Bowen and Irwin, 2008). RL contains 39.4% C (Table 17). Heat treatment of RL reduced the C percentages remaining in TL (26.5%) (Table 17) while increasing the Al (0.3% to 2.3%) and Si (9.3% to 35.7%) contents in TL vs. RL (Table 18, FIGS. 27-28). Organic matter gasification during thermolysis reduced carbon levels (Cao and Harris, 2010). The ash content of washed CTL (SiO2, 54.4%, $Al_2O_3$, 12.1%, CaCO3, 3.75%, and MgO, 4.8%) totals 75.0% (Table 17), is consistent with the ash content (−74.6%) determined by TGA analysis run at 0-1000° C. under 02 (heating rate 10° C./min) (FIG. 20A).

TABLE 18

The mineral composition of RL, TL, and CTL via AAS, SEM-EDX, and XPS (HR)

| | | Elemental percentages (wt., dry basis) | | | | |
|---|---|---|---|---|---|---|
| Method | Adsorbent | Mg | Ca | K | Si | Al |
| AAS[a] | RL | 0.3 | 1.3 | 0.1 | 9.3 | 0.3 |
| | TL | 0.5 | 1.1 | 0.02 | 35.7 | 0.9 |
| | CTL | 2.9 | 1.5 | 0.0 | 25.4 | 3.0 |
| SEM/EDX | RL | 0.01 | 0.02 | 0.0 | 0.04 | — |
| | TL | 0.08 | 0.3 | 0.05 | 1.2 | 2.9 |
| | CTL | 2.8 | 5.9 | 2.5 | 6.3 | 0.3 |
| XPS (HR) | RL | 0.5 | 1.0 | — | — | — |
| | TL | 4.5 | — | — | — | — |
| | CTL | 12.4 | 4.8 | 1.8 | — | — |

[a]Bulk analyses were done by digestion of samples using 1:1 95% H2SO4/70% HNO3 (50 mL) for 24 h at 25° C., followed by AAS analysis. Calculated Ca and Mg yields in the final CTL adsorbent were 29.3% and 78.5%, indicating higher Ca amounts were lost due to the washing during its production.

After complete acid digestion of washed CTL, Mg (2.9%) and Ca (1.5%) weight percentages were determined using AAS (Table 18). Bulk Ca and Mg percentages were smaller than the amounts detected using SEM/EDX studies (Mg=2.8% vs. Ca=5.9%), and the percentages quantified using XPS (Mg=12.4% and Ca=4.8%). Thus, Ca and Mg species are more concentrated on the top −8 nm of the CTL sample. After washing and drying, RL (1 atm, several days, 80° C.) and TL moisture contents were similar (−3.2%)

(Table 17). The inherent moisture of coal can be either the moisture within the micropores and microcapillaries while deposited in the ground (interior adsorbed water) or surface-bound water (Karthikeyan et al., 2009). CTL has a lower moisture content (~2.5%) than TL and RL (~3.2% in both) after heating the samples for 2 h in a hot air-oven at 105° C.

2. XRD Analysis

Figure 20B:
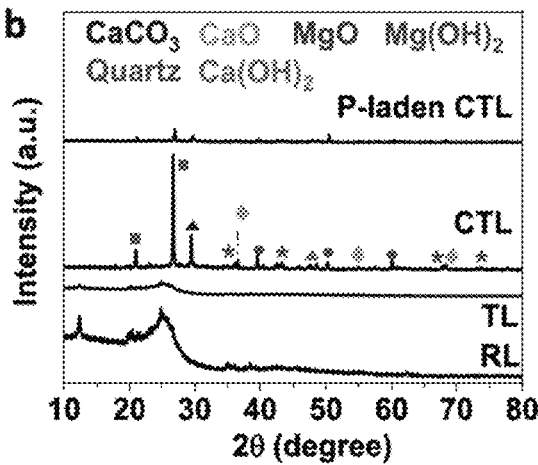

The high background intensity in the RL XRD spectrum indicates an extensive amorphous carbon nature (FIG. 20B). The crystalline peaks at 2θ=24.9° (002) and 38.4° (100) depict the coal samples' aromatic stacking in some graphitic like carbon structures. The (002) peak's asymmetric nature is due to the association of a γ peak from aliphatic side chains attached to the aromatic carbon (Zhao et al., 2020). CTL's XRD spectrum has many crystallite phases, in which the peaks are sharp, complicated, and highly ordered compared to RL (FIG. 20B). Specifically, sharp peaks located at 2θ=20.8° ("Quartz R100134—RRUFF Database,", 2020) and 26.6° correspond to the (100) and (011) reflection of quartz ($SiO_2$). Amorphous $SiO_2$ existed in RL, but after thermal treatment at 600° C. for 1 h in the presence of Ca and Mg salts, sintering produces larger $SiO_2$ crystallites. These exhibit high-intensity peaks in XRD patterns (Buscarino et al., 2011). The intense peak at 2θ=29.4° is due to the $CaCO_3$ formed in the CTL, with an average $CaCO_3$ crystal size of 38.5 nm, determined by the Debye-Scherrer equation. This demonstrates the formation of nano-sized $CaCO_3$ grains on the CTL during the pyrolysis. $Mg(OH)_2$ and $Ca(OH)_2$ also formed and precipitated onto the CTL surface during synthesis when the pH rose using KOH. These hydroxides have lower solubility product constants than their sulfate precursors (Table 19). Calcite was formed due to the inert pyrolytic atmosphere, where calcium hydroxide reacts with carbon dioxide produced from char particles during the pyrolysis process. Small amounts of $Ca(OH)_2$ (2θ=47.60 and 50.7°) and CaO (2θ=37.0°, 54.0°, and 67.0°) are present on the CTL surface (FIG. 20B). CaO peaks were less intense than $Ca(OH)_2$, indicating the surface exothermic ($\Delta H$=−104 kJ/mol) hydration of CaO to $Ca(OH)_2$ occurred (Criado et al., 2014). Residual CaO/Ca(OH)$_2$, MgO/Mg(OH)$_2$, $K_2O$, KOH, and $K_2CO_3$ on the CTL surface and encapsulated onto some pores was removed during the washing step after the pyrolysis. In this wash, the initial 89.0 g mass was reduced by 35.1 g leaving 53.9 g afterwards.

TABLE 19

Solubility product constants in water (pH 7)

| Compound | Solubility product at 25° C. | References |
|---|---|---|
| $Mg(OH)_2$ | $5.61 \times 10^{-12}$ | (Lide D. R., 2006) |
| $Ca(OH)_2$ | $5.5 \times 10^{-6}$ | (Chen et al., 2007) |
| $CaSO_4$ | $9.1 \times 10^{-6}$ | (Antunes et al., 2018) |
| $CaCO_3$ | $2.9 \times 10^{-9}$ | (Chen et al., 2007) |
| $MgSO_4$ | $5.9 \times 10^{-3}$ | ("Clutch Prep," 2019) |
| $MgCO_3$ | $6.8 \times 10^{-6}$ | (Lide D. R., 2006) |
| $Ca_3(PO_4)_2$ | $2.1 \times 10^{-33}$ | |
| $Mg_3(PO_4)_2$ | $1.0 \times 10^{-24}$ | |
| $CaHPO_4$ | $1.3 \times 10^{-7}$ | (Chow, 2001) |

Other CTL peaks at 21.2°, 39.7°, 50.5°, and 60.0° accredited to Mg (OH)2 (Zhang et al., 2015). The peaks at 2θ=36.6°, 43.4°, 62.6°, and 74.7° can be indexed to the 111, 200, 220, and 311 planes of face-centered cubic surface MgO. The tiny 43.3° peak indicated traces of MgO (~50.5 nm) exist on the CTL. MgO formation on the CTL is caused by the dehydration of $Mg(OH)_2$ ($\Delta H$=+81 kJ/mol) (Mastronardo et al., 2016). If $MgSO_4$ was present, it could decompose to MgO under the reducing atmosphere (Scheidema and Taskinen, 2011).

After P removal at pH 2.2, peaks located at 2θ=29.8° and 39.7° ($CaCO_3$ and $Mg(OH)_2$) suffered significant intensity reduction, and the peaks centered at 600 and 36°-37° (Mg (OH)2) and 47°-48° ($Ca(OH)_2$) vanished in P-laden CTL (FIG. 20B). Dissolution of $CaCO_3$, $Mg(OH)_2$, and $Ca(OH)_2$ in an acidic medium form soluble $Ca^{2+}/Mg^{2+}$, which reacts with phosphate anions in solution and forms corresponding insoluble phosphates and hydrophosphates in the CTL. This reduced the $CaCO_3$ and $Mg(OH)_2$ peak intensities (FIG. 20B). The new XRD peaks in P-laden CTL (FIG. 20B) were assigned to $MgHPO_4 \cdot 1.2H_2O$, $Mg_3(PO_4)_2 \cdot 8H_2O$, $CaHPO_4$ and $Ca_3(PO_4)_2$ (Binitha and Pradyumnan, 2013; Hung et al., 2012, p. 50; Zhang et al., 2016). No $Ca(OH)_2$ is retained in CTL at pH=2.2 ($K_{sp}$=5.5×10$^{-6}$) (Table 19, supplementary materials). The hydroxyapatite ($Ca_5(PO_4)_3(OH)$) diffraction pattern was not observed in the P-laden XRD spectrum. Next, when CTL was exposed to 1000 ppm phosphate solution (pH 2.2) at 25° C., the pH increased to ~10.0 immediately. At this pH, phosphates mainly exist as HPO4 2−/PO43−. The $Ca(OH)_2$ released under acidic conditions precipitated as brushite ($CaHPO_4$). Brushite is the most thermodynamically stable phase relative to other calcium compounds at room temperature in the lower pH region. Here, $Ca^{2+}$ reacts with $H_2PO_4$ producing brushite, as demonstrated by XRD (Wuthier et al., 1985). Previously, brushite was formed on P-laden Ca-doped biochar (~20 wt % $Ca(OH)_2$/biochar) at pH=2 (Antunes et al., 2018). $CaCO_3$, the major phase retained in the CTL surface, is insoluble ($K_{sp}$=2.9×10$^{-9}$). However, it releases dissolved $Ca^{2+}$ at pH 2.2, which forms a surface $CaHPO_4$ precipitate.

3. Adsorbent Morphologies 3.1. SEM, SEM-EDX, and TEM Analysis of Adsorbents

Figures 21A, 21B, 21C:
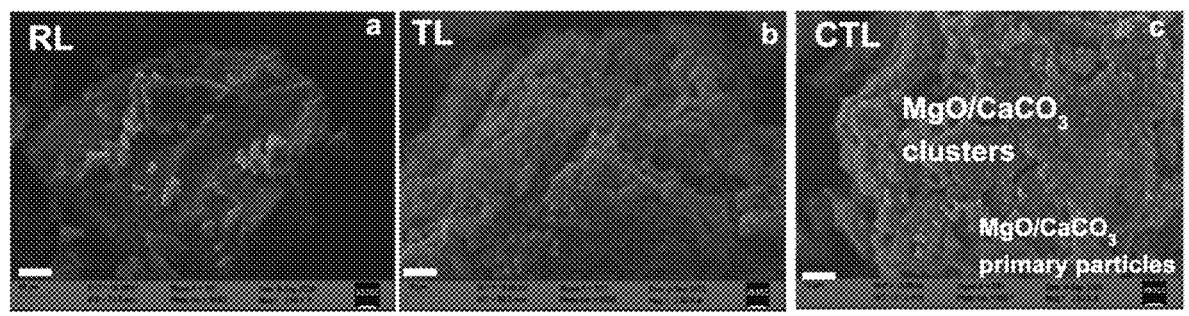
FIGS. 21A-R show images and graphs illustrating analysis of RL, TL, and washed CTL. (A-C) SEM images of RL, TL, and washed CTL (15 kV, scale bar 20 µm, resolution 2.50 kX); brightly colored areas covered with red circles in (C) indicate the surfaces of Mg and Ca hydroxide/oxide/carbonates of washed CTL. SEM-EDX mapping of washed CTL before (D-I) and after (J-O) P uptake (scale bar 20 m, resolution 2.5 kX). P-laden washed CTL (J-O) confirms phosphates were adsorbed onto the surface Mg oxides/carbonates of CTL (scale bar 20 m, resolution 2.5 kX). P-loaded washed CTL was prepared at pH 7, with 100 mg/L phosphate (25 mL) equilibrated with 50 mg of CTL for 1 h at 25° C. (2 g/L dose). SEM/EDX electron spectra for washed CTL (P), washed CTL (2 g/L) was exposed to water at pH=2.2 (Q), and 1000 mg/L phosphate (25 mL) at pH=2.2 (R), depicting the surface regions elemental composition.
Figures 21D, 21E, 21F, 21G, 21H, 21I:
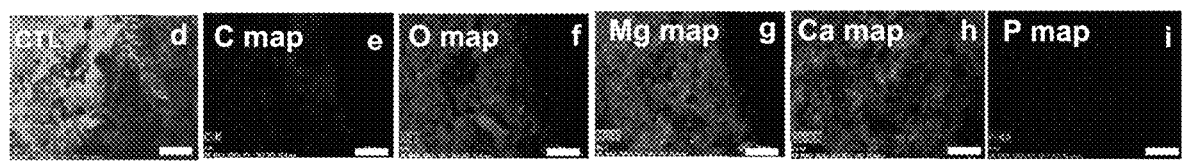
Figures 21J, 21K, 21L, 21M, 21N, 21O:
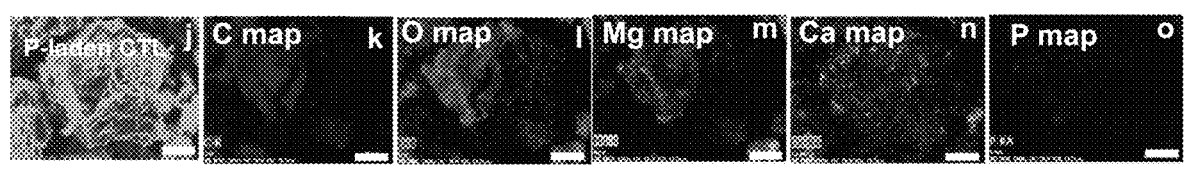
Figure 27:
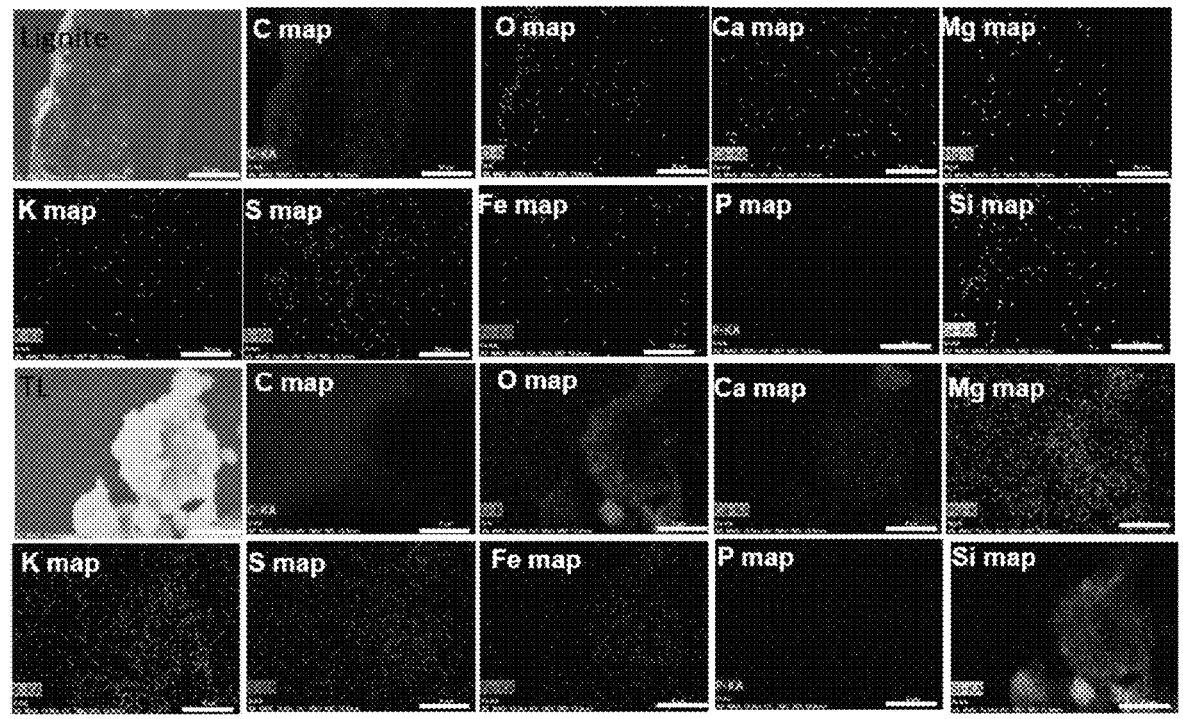
FIG. 27 shows images illustrating SEM-EDX analysis of RL and TL before P adsorption (scale bar 300 μm, resolution 150×).
Figure 28:
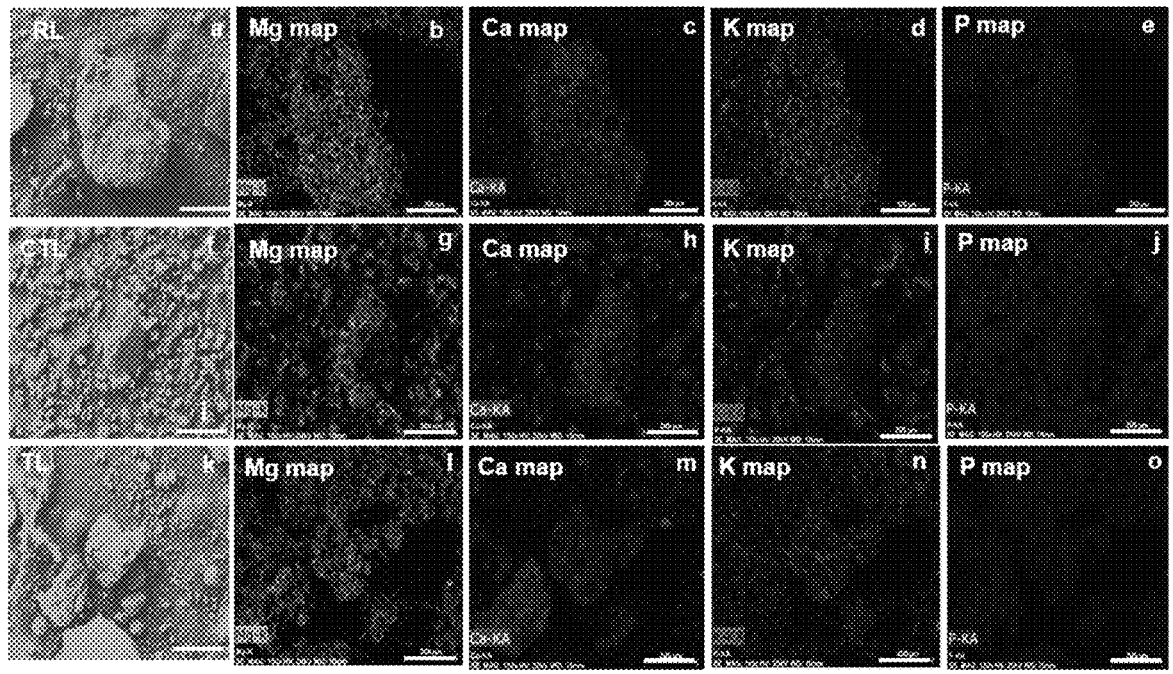
FIG. 28 shows images illustrating electron images from the SEM-EDX analysis representing mineral composition of post-sorbed phosphate samples of RL (top row), CTL (middle row), and TL (bottom row) surfaces (scale bar, 300 μm, resolution, 150×). P is concentrated on overlapped regions of Ca, Mg and K on the surfaces, in all three adsorbents. P is highly concentrated on the CTL surface than RL and TL.

SEM analyses examined the morphology and chemistry changes after thermal and chemical modifications to RL (FIGS. 21A-R and 27). RL's relatively smooth surface morphology became more irregular in TL and washed CTL (FIG. 21A). TL contained many micron-sized pores (FIG. 21B, marked with arrows). Most surface particles deposited on CTL are agglomerated and roughen the surface (FIG. 21C). SEM/EDX mapping of CTL (FIGS. 21D-H) displayed Mg, Ca, C, and O that are distributed in overlapped regions, in accordance with $MgCO_3$, $CaCO_3$, MgO, $Mg(OH)_2$, and $Ca(OH)_2$ present on the surface. These particle size diameters were mostly below 2 m (FIG. 21C). Chemical impregnation and subsequent thermal conversion at 600° C. deposits Ca and Mg minerals onto CTL, appearing as lightly shaded primary particles and/or aggregated clusters (FIG. 21C).

RL exhibits abundant C, O, with Al, Si, Mg, Ca, K, and Fe in the surface region (FIG. 27). SEM-EDX analysis of CTL after exposure to pH=2.2 DI water (25 mL, 200 rpm, 24 h, 25° C.), filtering and drying showed smaller Ca, Mg, Si, K, and O atomic percentages (FIGS. 21P-Q) compared to before washing. Also, pH increased from pH=2.2 to pH 9.3, and a 30% CTL weight loss occurred. Acidic rinsing dissolved many mineral oxides from the surface and caused the EDS peak reductions. The obvious loss of basic Mg and Ca compounds took place from CTL under acidic conditions. The $Mg^{2+}$ and $Ca^{2+}$ ions released then reacted to form insoluble phosphates, which precipitated and were observed in the P-laden CTL EDX spectrum (FIG. 21R). Ca and Mg compounds retained in unwashed CTL exhibited more phosphate removal than washed CTL (80.6 mg/g vs. 15.5 mg/g).

FIGS. 21J-O shows the washed CTL SEM/EDX analysis after exposure to 100 ppm phosphate solution (labeled P-laden CTL). After phosphate uptake, Ca dropped from 5.9% to 1.5% and Mg dropped from 2.8% to 1.3% atomic percentages on the P-laden CTL surface. P-laden CTL EDX elemental mapping found that phosphorus was concentrated in the regions where Ca, Mg, and O had deposited (FIGS. 21L-O). $Mg_3(PO_4)_2$, $MgHPO_4$, and $CaHPO_4$ were precipitated on CTL at pH 2.2 during this P uptake, according to XRD/XPS studies. This occurred because both $Ca^{2+}$ and $Mg^{2+}$ dissolved into water, where it reacted with $HPO_4^{2-}/PO_4^{3-}$. Previous studies found that phosphate uptake also occurs by surface deposition (Yao et al., 2011). The EDX electron spectrum found 3.5 wt % P in P-laden CTL (FIG. 21R). This contrasts sharply with P-laden RL (0.8 wt % P) and P-laden TL (1.3 wt % P) (data is not presented). The CTL vs RL wt % of Mg (2.8% vs 0%) and Ca (5.9% vs. 0.02%) (Table 18) favor phosphate uptake by CTL. This confirms the combined chemical and thermal modification process using Mg and Ca enhances lignite's use for phosphate remediation. Nevertheless, RL can be used alone without expending any process modification costs to adsorb phosphate.

TEM images of CTL showed MgO clusters (black) dispersed on the char matrix (grey) (FIG. 22A). The flake-like morphology of MgO at a higher resolution (FIG. 22B) displayed tiny MgO crystallites (size 20-30 nm) aggregated to larger MgO cluster sizes between 200 nm to 2 m. The dark field image of CTL showed the MgO clusters (white) in a dark background (char matrix). These MgO clusters were confirmed by acquiring the sample's SAED pattern (FIG. 22D), with a d spacing of 0.211 nm. This d spacing belonged to MgO-002 crystal phase according to the crystal structure database. CaO hydration is an exothermic ($\Delta H=-104$ kJ/mol) and a spontaneous process (Criado et al., 2014). However, precipitated $Ca(OH)_2$ has a high solubility product (Table 19), and it is hard to observe on CTL after washing. Low hydration of MgO was reported ($\Delta H=+81$ kJ/mol) (Dung and Unluer, 2017; Mastronardo et al., 2016), making it comparatively more stable than CaO on the CTL.

4. Adsorption Performance 4.1. Effects of Low Initial Phosphate Concentration, Adsorbent Particle Size and Adsorption Kinetics Efficient sorbents have a high adsorbate affinity at low adsorbate concentrations (Wu et al., 2020). Sorption affinities of RL, TL, washed CTL, and unwashed CTL were tested at low phosphate concentration (0.4 ppm) (FIG. 22E). The unwashed CTL afforded more than 98% of phosphate removal versus RL (8%), TL (38%), and washed CTL (86%), making it a promising selective phosphate adsorbent. Unwashed CTL achieved ultra-low equilibrium phosphate concentration (0.006 ppm) at an initial phosphate conc. of 0.4 ppm. This value is below USEPA's suggested phosphate level in water, 0.01 ppm to prevent possibility of eutrophication (US EPA, 2018).

When the particle size decreased from >300 to <150 μm, phosphate adsorption increased by 37% (RL), 80% (TL), and 33% (CTL) (FIG. 29A) (Adsorbent dose 50 mg, 25 mL of 50 ppm [phosphate], 24 h, pH 5.5, 25° C.). The <150 μm particle size had a higher phosphate removal and was selected for adsorption isotherm experiments. Interestingly, RL surfaces have a higher specific sorption ability per unit surface area (6.0 mg/m$^2$) than CTL (0.6 mg/m$^2$) and TL (0.01 mg/m$^2$) (adsorbent dose 50 mg, 25 mL of 50 ppm [phosphate], 24 h, pH 2.2, 25° C., particle size, 150-300 μm) (Table 17). When RL was ground to smaller particle size, <150 μm RL's sorption ability was lower (1.0 mg/m$^2$). This is due to the increase of its surface area (2.9 m$^2$/g) at the size<150 μm. RL can be used for water treatment with lower production costs than CTL, as it requires no pre-treatment, and is plentiful and cheap. CTL's higher capacity (11.6 mg/g) (Table 17) is due to the dissolution of $Ca^{2+}$ and $Mg^{2+}$ ions, which precipitates its phosphate and hydrophosphate salts.

The CTL P uptake initially increased rapidly (FIG. 29B), and >80% of the maximum adsorption capacity (17.9 mg/g) was adsorbed within 5 h (adsorbent dose 50 mg, 25 mL solution volume, 50 ppm phosphate concentration, 25° C.). This rise was due to the presence of un-occupied adsorption sites on the CTL surface at the beginning. However, CTL P removal equilibrium was achieved after ~20 h, similar to phosphate adsorption into MgO-digested sugar beet tailings biochar (Yao et al., 2011) and Mg-enriched tomato tissue biochar (Yao et al., 2013). Rapid initial and slow subsequent uptake suggest that precipitation is not the only removal path. The reported abundant nano-CaO and MgO (PZC>10) surface species and a very high BET specific surface area of Ca—Mg/biochar (487.5 m$^2$/g) accelerated the P binding equilibrium to within 30 min. (Fang et al., 2015). The slow P removal kinetics by washed CTL can be due to the much smaller quantities of MgO and —$Mg(OH)_2$ (after washing), which reduces the amount and rate of phosphate uptake by precipitation and adsorption. The relatively low CTL surface area (BET\\N2, 21 m$^2$/g and BET-C02, 120 m$^2$/g) reduces the extent of physisorption. The best-fit parameters of each kinetic model are listed in Table 20. The calculated $q_e$ of CTL (18.9 mg/g) is close to the experimental value (17.9 mg/g). CTL phosphate removal follows the pseudo-second-order kinetic model ($R^2=0.99$), suggesting chemical bond formation. Similar trends were observed in Ca-doped biochar (Antunes et al., 2018) and MgO-modified diatomite (Xie et al., 2014). Phosphate binding onto Mg-enriched tomato tissue could be better described by an n$^{th}$ order model and followed multiple mechanisms (Yao et al., 2013).

TABLE 20

Phosphate adsorption kinetics of all three RL, TL, and washed CTL (Adsorbent dose 50 mg, 25 mL of 50 ppm phosphate concentration, time 5 min-24 h, pH 5.5, 25° C., particle size <150 μm)

| | Parameters | | | | | | |
|---|---|---|---|---|---|---|---|
| | Pseudo-first order model | | | Pseudo-second order model | | | |
| Adsorbent | $k_1$ | $q_e$ | $R^2$ | $k_2$ | $q_e$ | $R^2$ | Actual $q_e$ |
| RL | 0.1 | 0.5 | 0.05 | −2.2 | 0.17 | 0.57 | 0.9 |
| TL | 0.05 | 0.7 | 0.11 | 0.3 | 1.9 | 0.78 | 2.0 |
| CTL | 0.2 | 10.9 | 0.90 | 0.04 | 18.9 | 0.99 | 17.9 |

$q_e$ (mg/g) Equilibrium phosphate capacity (mg/g)
$q_t$ (mg/g) - Phosphate capacity at time t (mg/g)
$k_1$ - First order rate constant (min$^{-1}$)
$k_2$ - Second order rate constant (g/mg min)

Phosphate adsorption into TL ($k_2$=0.3 g/mg min) is faster than CTL ($k_2$=0.04 g/mg min). As the contact time increases, TL's kinetic curve exhibited a rapid phosphate uptake and plateaued ~5 h, with a maximum phosphate absorbance of 1.9 mg/g. Pseudo-second-order kinetic model describes TL phosphate removal well.

4.2. pH Dependence of P Adsorption

Phosphate sorption by RL is only weakly pH-dependent (FIG. 23A). At ~pH 2.2, phosphate sorption was highest on washed CTL (22.9%) versus TL (14.7%) and RL (1.7%) (adsorbent dose 50 mg, 25 mL of 50 ppm phosphate concentration, 24 h, particle size 150-300 m, 25° C.). The CTL and TL (PZCs, 11.8, and 9.4) were positively charged under typical wastewater pH conditions (pH=6-9); therefore, they can be successfully employed in phosphate removal from acidic wastewaters (mining wastewater, acidic leachates from wet chemical P-recovery process). Both CTL and TL (Table 17) demonstrated higher phosphate uptake per unit weight than RL due to their more basic PZC (FIG. 23A) and higher surface areas. Removal efficiency changes occur with surface property alterations and phosphate speciation. $H_3PO_4$ exhibits $pKa1$=2.12, $pKa2$=7.21 and $pKa3$=12.67 and its aqueous speciation is plotted in FIG. 23A. When the initial pH is ~2-3 (but with a highly alkaline final equilibrium pH~9.4), positive sites on the CTL and TL surfaces can attract $HPO_4^{2-}/PO_4^{3-}$ adsorption. In an earlier study, phosphate anion adsorption was favorable when the solution pH was below the PZC of a Fe—Al—Mn tri-metal oxide (~9.0) (Lü et al., 2013).

Leaching of $Mg^{2+}$ and $Ca^{2+}$ from washed CTL was investigated at pH 2.2, 7, and 10 in the presence/absence of dissolved phosphate (0, 25, and 100 ppm) (25 mL solution volume, 25° C.). After reaching equilibrium with either phosphate-containing or -free solutions, the final pHs had risen (FIG. 23B). The average final pH values were 9.4, 10.5, and 10.8 versus initial pH 2.2, 7, and 10 values, respectively. Surface deposited $Mg(OH)2$, MgO, $Ca(OH)2$, and $CaCO3$ were identified on the CTL during XRD/XPS/EDX analysis. $Ca^{2+}$ leaching from $CaCO_3$ dissolution in the CTL was negligible at pH 7 because of its lower solubility ($Ksp$=2.9×10$^{-9}$) versus $Ca(OH)2$ ($Ksp$=5.5×10$^{-6}$). At pH 7, $Ca(OH)2$ has a higher solubility than $Mg(OH)2$ ($Ksp$=5.61×10$^{-12}$) (Table 19). This caused higher $Ca^{2+}$ leaching (3.5 mg/L) than $Mg^{2+}$ (2.6 mg/L) leaching in the absence of phosphates (FIGS. 23C-D). These discharges were most pronounced at the initial pH 2.2. Dissolution of basic surface oxides/hydroxides ($Mg(OH)2$, MgO, $CaCO3$, and $Ca(OH)2$) caused the equilibrium pH to rise. More dissolved $Mg^{2+}$ and $Ca^{2+}$ (15.2 ppm and 10 ppm) were detected when the initial solution pH=2.2 than in solutions with an initial pH 7 (2.6 ppm and 3.5 ppm) or 10 (2.1 ppm and 2.9 ppm) in phosphate-free solutions (FIGS. 23C-D). Of course, these pH values were time-dependent as pH changes with the adsorption of phosphate.

In the presence of the dissolved phosphates, pollutant species (speciation quantities which depend on the pH), $Mg_3(PO_4)_2$, $CaHPO_4$, $MgHPO_4$, and $Ca_3(PO_4)_2$ were deposited onto the CTL, as demonstrated by XRD/XPS analysis. When the phosphate concentration rose to 25 ppm, $Ca^{2+}$ precipitates as less soluble $Ca_3(PO_4)_2$($Ksp$=2.1×10$^{-33}$) giving less measured $Ca^{2+}$ leaching (2.2 mg/L) at pH 7 (FIG. 23D). Precipitated $Mg_3(PO_4)_2$ ($Ksp$=1.0×10$^{-24}$) from $Mg^{2+}$ leaching is somewhat more soluble than Ca3(PO4)2. Therefore, it leads to observing a slightly higher $Mg^{2+}$ leaching amount (3.2 mg/L) than $Ca^{2+}$ (FIGS. 23C-D). Further increasing the phosphate concentration to 100 ppm released more $Mg^{2+}$ (5.8 mg/L) from deposited Mg3(PO4)2, whereas further dropping the amount of $Ca^{2+}$ leaching (FIGS. 23C-D). Reduced $Mg^{2+}$ and $Ca^{2+}$ leaching at pH 7 is attributed at least in part to the low CTL Langmuir adsorption capacity at pH 7. Leaching of $Mg^{2+}$ and $Ca^{2+}$ from sorbents under acidic conditions was previously reported (Lim and Kim, 2017).

Partial dissolution of Mg(OH)2, MgO, $Ca(OH)_2$, and $CaCO_3$ sites on the CTL surface is followed by precipitation of $Ca^{2+}$ and $Mg^{2+}$ phosphates/hydrophosphates and sorption occurs at protonated surfaces which attract $HPO_4^{2-}/PO_4^{3-}$. This gives high CTL P removal efficiency (19.9%) at pH=2.2 (FIG. 23A). A control experiment conducted using acidic water (phosphate-free) at pH=2.2, and 36% of the Mg and 72% of the Ca originally on CTL were leached into DI water. Therefore, precipitation-controlled P removal is also possible with CTL under an acidic pH. As the pH level increases, the CTL's P removal efficiency significantly decreased from 19.9% (pH=2.2) to 0.3% (pH=10). Several reasons govern this decline of P uptake. CTL's surface positive charge drops at high pH, which reduces the phosphate anion adsorption. High solution pH generates columbic repulsion between the deprotonated surface $Mg(OH)_2$/MgO sites and $HPO_4^{2-}/PO_4^{3-}$, lowering phosphate uptake. Lower amounts of $Ca^{2+}$ and $Mg^{2+}$ were released from CTL at high pH (FIGS. 23C-D); therefore, phosphate precipitation declines. High Ca quantities can immobilize phosphate (Chen et al., 2007).

At low pH ~2, TL has greater phosphate adsorption than RL, due to the higher Al (0.9% vs 0.3%) and Mg contents (0.5% vs. 0.3%) (Table 18), and higher surface area. Al content on bio-char improved phosphate adsorption (Yin et al., 2018). Lower surface area and a surface-cation-deficiency account for the lower P-binding of RL. A mild increase in RL adsorption at pH 11.5 may be caused by some surface OH groups ion exchanging with phosphate ions.

4.3. Adsorption Isotherms and Thermodynamics

Isotherm studies were conducted at the optimal pH (pH 2.2) and the environmentally relevant pH level (pH 7) (FIGS. 23E-F). Washed CTL exhibited a higher maximum Sips P uptake capacity (74 mg/g) than RL (35 mg/g) and TL (50 mg/g) at 40° C. using 1000 ppm initial phosphate level (adsorbent dose 50 mg, 24 h, pH 2.2, particle size<150 μm) (FIG. 23E). Langmuir, Freundlich, and Sips isotherm model fitted parameters (Jeppu and Clement, 2012) are presented (Tables 21-23). Regression coefficients were obtained for Langmuir (0.57-0.99), Freundlich (0.89-0.99), and Sips (0.98-1.00). The Sips model better describes phosphate removal by RL, TL, and washed CTL. All three of these phosphate removals are combined Langmuir-Freundlich processes, consistent with previous findings (Yao et al., 2013). The specific sorption per unit surface area of RL was greater (12.1 mg/m$^2$) than those of TL (0.4 mg/m$^2$) and washed CTL (1.2 mg/m$^2$) (40° C., pH 2.2, particle size, particle size<150 μm). The BET surface areas of RL, TL, and CTL at the particle size<150 μm were 2.9 m$^2$/g, 120 m$^2$/g, and 60 m$^2$/g, respectively.

TABLE 21

Langmuir adsorption isotherm parameters for RL, TL, and washed CTL at 25, 30 and 40° C. (adsorbent dose 50 mg, 25 mL of 25-1000 ppm phosphate concentration, time 24 h, pH 2.2, particle size <150 μm).

| Temperature | Adsorbent | $R^2$ | $q_m$ (mg/g) | $K_L$ |
|---|---|---|---|---|
| 25° C. | RL | 0.57 | 5.2 | 0.015 |
| | TL | 0.97 | 13.2 | 0.005 |
| | CTL | 0.99 | 24.8 | 0.015 |
| 30° C. | RL | 0.55 | 14.0 | 0.008 |
| | TL | 0.94 | 49.0 | 0.004 |
| | CTL | 0.97 | 53.0 | 0.005 |
| 40° C. | RL | 0.82 | 35.0 | 0.003 |
| | TL | 0.86 | 50.0 | 0.003 |
| | CTL | 0.98 | 65.0 | 0.007 |

$q_m$ - Maximum adsorption capacity (mg/g)
$K_L$ - Langmuir isotherm constant indicating the adsorption energy (L/mg)

TABLE 22

Freundlich adsorption isotherm parameters for RL, TL, and CTL at 25, 30 and 40° C. (adsorbent dose 50 mg, 25 mL of 25-1000 ppm phosphate concentration, time 24 h, pH 2.2, particle size <150 μm)

| Temperature | Adsorbent | $K_f$ | n | $R^2$ |
|---|---|---|---|---|
| 25° C. | RL | 0.7 | 3.5 | 0.99 |
| | TL | 0.4 | 2.0 | 0.97 |
| | CTL | 3.2 | 3.3 | 0.89 |
| 30° C. | RL | 0.01 | 0.9 | 0.97 |
| | TL | 0.3 | 1.5 | 0.94 |
| | CTL | 0.6 | 1.5 | 0.96 |
| 40° C. | RL | 0.17 | 1.3 | 0.97 |
| | TL | 0.2 | 1.3 | 0.94 |
| | CTL | 4.0 | 2.4 | 0.94 |

$K_f$ - Freundlich distribution coefficient indicating adsorption capacity
1/n - Freundlich dimensionless parameter indicating adsorption intensity

TABLE 23

Sips adsorption isotherm parameters for RL, TL, and CTL at 25, 30 and 40° C. (adsorbent dose 50 mg, 25 mL of 25-1000 ppm phosphate concentration, time 24 h, pH 2.2, particle size <150 μm)

| Temperature | Adsorbent | $R^2$ | $q_m$ (mg/g) | k | n |
|---|---|---|---|---|---|
| 25° C. | RL | 0.99 | 4.5 | 0.003 | 0.7 |
| | TL | 1.00 | 18.8 | 0.002 | 0.8 |
| | CTL | 0.99 | 24.9 | 0.008 | 0.9 |
| 30° C. | RL | 0.99 | 26.6 | 2.4 | 0.4 |
| | TL | 0.99 | 40.0 | 9.8 | 0.6 |
| | CTL | 0.99 | 52.6 | 4.3 | 0.7 |
| 40° C. | RL | 0.99 | 30.0 | 8.2 | 0.6 |
| | TL | 0.99 | 52.0 | 5.2 | 0.6 |
| | CTL | 0.98 | 74.0 | 0.01 | 1.1 |

The isotherm studies were conducted for pyrolyzed and washed CTL, and pyrolyzed but unwashed CTL at pH 7, 25° C. (FIG. 23G). The washed CTL exhibited a maximum Langmuir phosphate removal capacity of 15.5 mg/g (Table 24) versus TL (2.5 mg/g) and RL (1.1 mg/g) (pH 7, particle size<150 μm, adsorbent dose 50 mg, 25 mL of 25-1000 ppm phosphate concentration, 24 h). Maximum Langmuir phosphate removal capacity of the unwashed CTL sample after pyrolysis at 600° C. (80.6 mg/g) (Table 24) was five times higher than that of washed CTL sample (15.5 mg/g) because far more $CaO/Ca(OH)_2$, $MgO/Mg(OH)_2$ and $K_2CO_3$ remained on the surface. The uptake capacities obtained at 25° C. and pH 7 (CTL, 15.5 mg/g, TL, 2.5 mg/g, and RL, 1.1 mg/g) are lower than the uptake capacities obtained at 25° C., pH 2.2 (CTL, 24.8 mg/g, TL, 13.2 mg/g, and RL, 5.2 mg/g) (Table 23) due to the greater $Ca^{2+}/Mg^{2+}$ dissolution from CTL at the more acidic pH which allows more $HPO_4^{2-}/PO_4^{3-}$ to precipitate as $Ca^{2+}/Mg^{2+}$ salts. Declining electrostatic attraction of $HPO_4^{2-}/PO_4^{3-}$ with $MgO/Mg(OH)_2$ on CTL (PZC=13) is also occurring at pH 7 compared to pH 2.2. Maximum phosphate sorption capacities of CTL (washed/unwashed) were compared with the previously developed adsorbents (Table 24).

TABLE 24

Phosphate removal using different Mg and Ca modified adsorbents.

| Adsorbent | Initial (Mg/Ca compound:adsorbent) mass ratio | Experimental conditions | Adsorption capacity (mg/g) | Reference |
|---|---|---|---|---|
| Magnesium oxide nanoflake-modified diatomite adsorbent (MOD) | 3:5 (as $MgCl_2 \cdot 6H_2O$) | $PO_4^{3-}$ (100 mL), 4-50 mg/L, pH 5.0, MOD (50 mg), 12 h, 25° C. | 45.7 | (Xie et al, 2014) |
| Calcium decorated sludge carbon (Ca-SC) | 2:1, 1:1 (as $CaCO_3$) | Adsorbent dosage 3 g/L. 200-1000 mg/L [Phosphate], 25° C. | 116.8 | (Kong et al., 2018) |
| Sugarcane bagasse biochar | 1:1 ($MgCl_2 \cdot 6H_2O$ and $CaCl_2 \cdot 2H_2O$) | 3-5800 mg/L [$PO_4^{3-}$], pH 2, 5, 10, 20, 40, 60, 80, 120, 240, 360, and 720 min, 25° C. | 129.8 | (Fang et al., 2020) |
| $Mg(OH)_2/ZrO_2$ composite (MZ) | 6:5 ($MgCl_2 \cdot 6H_2O$ and $ZrOCl_2 \cdot 8H_2O$) | pH 7, 15 mg of adsorbent, 50 mL solution volume, 5 to 50 mg $PO_4$/L, 24 h, 25° C. | 87.2 ($PO_4$) | (Lin et al., 2019) |
| Washed CTL | 1:10 (as $MgSO_4$) 1:10 (as $CaSO_4$) | 1-1000 ppm, 40° C., pH 2.2, 25 mL solution volume, and 0.05 g of CTL | 74 | This study |
| Washed CTL | 1:10 (as $MgSO_4$) 1:10 (as $CaSO_4$) | 1-1000 ppm, 25° C., pH 7, 25 mL solution volume, and 0.05 g of CTL | 15.5 | This study |
| Unwashed CTL | 1:10 (as $MgSO_4$) 1:10 (as $CaSO_4$) | 1-1000 ppm, 25° C., pH 7, 25 mL solution volume, and 0.05 g of CTL | 80.6 | This study |
| Unwashed CTL | 1:10 (as $MgSO_4$) 1:10 (as $CaSO_4$) | 1-1000 ppm, 40° C., pH 7, 25 mL solution volume, and 0.05 g of CTL | 378.2 | This study |

Thermodynamic parameters (ΔG, ΔH, and ΔS) were calculated for all isothermal studies performed at pH 2.2 (Table 25). Phosphate sorption was spontaneous on RL, TL, and washed CTL (negative ΔG values) and all ΔH values were endothermic (positive). ΔH values were RL (308.9 kJ/mol) TL (241.5 kJ/mol), and washed CTL (100.4 kJ/mol) were consistent with chemisorption (greater than 40 kJ/mol) (Monárrez-Cordero et al., 2018) and not physisorption (less than 20 kJ/mol). This is consistent with the kinetic analysis. Positive values of ΔS (RL [1.11], TL [0.91], and washed CTL [0.43] kJ/mol) revealed increased randomness in the uptake processes.

TABLE 25

Determination of thermodynamic parameters for phosphate adsorption by RL, TL, and CTL (adsorbent dose 50 mg, 25 mL of 25-1000 ppm phosphate concentration, time 24 h, pH 2.2, particle size <150 μm, temperatures 25, 30 and 40° C.).

|     | T (K) | $K_L$ (L/mg) | k ads | lnk | 1/T | ΔG (kJ/mol) | ΔH (kJ/mol) | ΔS (J/mol/K) |
|-----|-------|--------------|----------|------|---------|-------|-------|------|
| RL  | 293   | 0.003        | 3.00E+03 | 8.0  | 0.0034  | −19.5 | 303.9 | 1.11 |
|     | 303   | 2.4          | 2.40E+06 | 14.7 | 0.0033  | −37.0 |       |      |
|     | 313   | 8.2          | 8.20E+06 | 15.9 | 0.0032  | −41.4 |       |      |
| TL  | 293   | 0.01         | 1.00E+04 | 9.2  | 0.0034  | −22.4 | 241.5 | 0.91 |
|     | 303   | 9.8          | 9.80E+06 | 16.1 | 0.0033  | −40.6 |       |      |
|     | 313   | 5.2          | 5.20E+06 | 15.4 | 0.0032  | −40.2 |       |      |
| CTL | 293   | 0.008        | 8.00E+03 | 9.0  | 0.003413| −21.9 | 100.4 | 0.43 |
|     | 303   | 4.3          | 4.30E+06 | 15.3 | 0.0033  | −38.4 |       |      |
|     | 313   | 0.1          | 1.00E+05 | 11.5 | 0.003195| −30.0 |       |      |

$K_L$ - Langmuir isotherm constant indicating the adsorption energy (L/mg)
ΔG - Gibbs energy change (kJ/mol)
ΔH - Enthalpy change (kJ/mol)
ΔS - Entropy change (J/mol/K)

5. Reuse, Regeneration, and Phosphate Leaching by CTL

Washed and unwashed CTLs' recycling and use as a fertilizer was investigated after adsorbing phosphates. The phosphate adsorption-desorption was studied under 1000 ppm phosphate solution and 1.5 g of CTL dose, at pH 7, 25° C. (FIGS. 24A-B). P-loaded CTL was desorbed with a 1 M NaOH stripping agent. Both the adsorption amount in each cycle (mg/g) and the cumulative amount of removed (mg/g) are presented. Washed CTL's P uptake decreased slightly more in the second cycle (98.3 mg/g) over the first cycle (108.0 mg/g) and decreased slightly in the third and fourth (94.7 and 90.0 mg/g) (FIG. 24A). About 113.0 mg/g of Phosphate adsorbed on unwashed CTL in the first cycle (FIG. 24B). This amount sharply dropped to (102.2, 98.9, and 94.7 mg/g) in the second, third and fourth cycles. However, only a very small fraction of the adsorbed or precipitated phosphates on both CTLs were desorbed in each cycle. While only these cycles were run, continued phosphate uptake would likely continue until no more $Ca^{2+}$ or $Mg^{2+}$ could leach from CTLs into the solution to precipitate phosphates. Stable $MgHPO_4$, $Mg_3(PO_4)_2$, $CaHPO_4$, and $Ca_3(PO_4)_2$ formation on CTLs and diffusion of phosphate moieties to CTLs pores may eventually cover leachable $Ca^{2+}$ and $Mg^{2+}$ oxides and hydroxides (Kajjumba et al., 2019). Desorption capacities were found by multiplying the equilibrium phosphate concentration by the stripping agent's volume and dividing it by the adsorbent weight. The P-laden washed CTL's desorption (mg/g) decreased each successive cycle (4.7 mg/g in cycle 1, 4.6 mg/g in cycle 2, 4.2 mg/g in cycle 3, and 4.0 mg/g in cycle 4) slightly. 1 M NaOH is not a suitable phosphate stripper for phosphate because the precipitated Mg and Ca phosphates/hydrophosphates have very low solubilities in aqueous NaOH (Sugiyama et al., 2005). The inner-sphere complexation (ligand exchange) of surface R—OH (R=mineral or carbonaceous) sites for phosphate oxygen atoms to chemisorb as $R—O—PO_3^{3−}$ (or its hydrogen phosphate analogs) is not the dominant mechanism of CTL's phosphate removal. Thus, basic stripping was unable to succeed in phosphate recovery (Wu et al., 2020). A 20 w/v % NaOH solution desorbed 80% phosphate from exhausted synthetic hydrocalcite, in which the reversible ion exchange is one of the major mechanisms (Kuzawa et al., 2006).

Figures 24E, 24F, 24G:
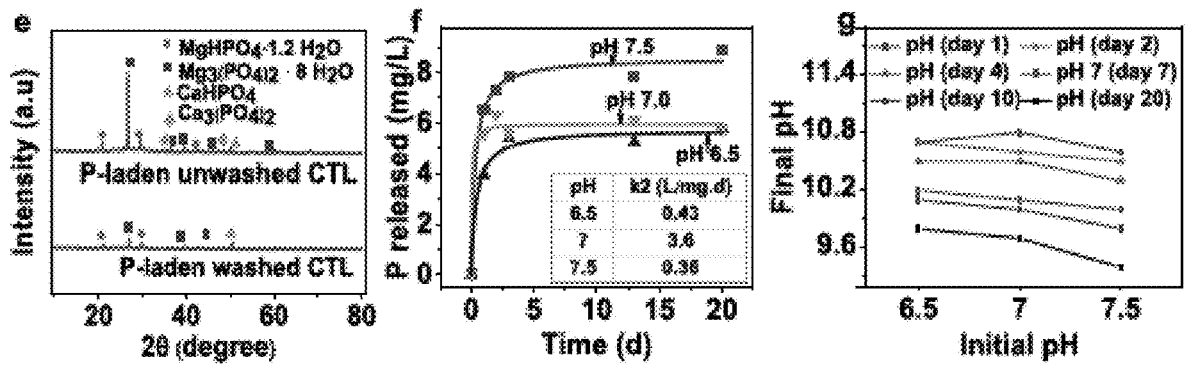

XRD patterns of P-laden unwashed CTL and washed CTL illustrate the crystallographic structures formed upon P uptake (FIG. 24E). In both spectra, calcium phosphates/hydrophosphates peak intensities are lower than the magnesium phosphates/hydrophosphates. This could be because $CaHPO_4$ ($K_{sp}$ $1.3×10^{−7}$) is more highly soluble than $Mg_3(PO_4)_2$ ($K_{sp}$ $1.0×10^{−24}$) (Table 19) in aqueous solutions. This led to more Ca2+ in the solution than Mg2+ (Antunes et al., 2018). Stable $MgHPO_4$ and $Mg_3(PO_4)_2$ crystals are harder to desorb using 1 M NaOH. Very low (~3.8%) phosphate desorbability from $Mg(OH)_2$ abundant diatomite was reported in 1 mmol NaOH solution (Xie et al., 2014). A classic stripping process would need to efficiently dissolve the surface $Mg_3(PO_4)_2$, $CaHPO_4$, $MgHPO_4$ and $Ca_3(PO_4)_2$ salts deposited on CTL.

Batch desorptions were carried out by stirring the P-laden washed CTL and P-laden unwashed CTL with 10 mL of 0.5 M HCl. The amount desorbed by 0.5 M HCl from the washed CTL was 0 mg/g in the first cycle because phosphate precipitation as $Ca^{2+}/Mg^{2+}$ salts is more preferable at acidic pH (FIG. 24C). The underlying $Ca^{2+}/Mg^{2+}$ basic species leach into the solution, where they immediately reprecipitate as insoluble phosphates/hydrogen phosphates. More $Ca^{2+}/Mg^{2+}$ leach from hydroxides, oxides, carbonates at pH 2.2, forming more phosphate and hydrophosphate salts precipitate back on the surface. Succeeding stripping cycles remove more phosphorus from the sorbent because less $Ca^{2+}/Mg^{2+}$ species can strip from the dwindling supply of basic compounds on the surface. This causes the pH near the surface to drop and the water-insoluble phosphate and hydrogen phosphate precipitates can now dissolve in the acidic stripper solution near the surface. Phosphate adsorption onto washed CTL in the second cycle (87.6 mg/g) was lower than the first cycle (112.2 mg/g) because the sorbent active sites were mostly occupied by phosphates on the first cycle. Phosphates were desorbed (10.8 mg/g) in the second cycle (FIG. 24C), as the stronger acid (lower pH near the surface)

could dissolve Mg and Ca phosphates/hydrophosphate. Each cycle might also dissolve some of the $Mg^{2+}$ and $Ca^{2+}$ basic compounds originally deposited on washed CTL which might eventually deplete the original stoichiometric capability of washed CTL to precipitate insoluble phosphate salts on the CTL. Acidic desorption was employed by Li et al., 2016a and Zhang et al., 2019. Ca-bound P in earlier work was extracted using HCl (Mitrogiannis et al., 2017). Phosphate desorption from washed CTL decreased to 2 mg/g in the fourth cycle, without affecting the subsequent phosphate sorption performance. Desorptions (mg/g) obtained for washed CTL in HCl on two through four cycles (10.8 mg/g, 11.1 mg/g, and 2.5 mg/g) are higher than in NaOH on cycles 1-4 (4.7 mg/g, 4.6 mg/g, 4.2 mg/g, and 4.0 mg/g) (FIGS. 24A and C). The adsorbent weight decreased after each cycle due to the dissolution of precipitated phosphate salts by HCl or weight loss caused by the filtering process after each cycle (FIG. 24C). This reduces the ability to use several adsorption/desorption cycles. This is not classic adsorption/desorption. These are stoichiometric dissolutions of $Ca(OH)_2$, $CaCO_3$, $MgO$, and $Mg(OH)_2$ with reprecipitation of $Mg_3(PO_4)_2$, $MgHPO_4$, $Ca_3(PO_4)_2$, and $CaHPO_4$, all occurring in competition as a function of the surrounding pH.

Phosphate uptake of unwashed CTL (108.8, 98.3, 96.7, and 92.0 mg/g) is far better than the washed CTL (102.2, 87.6, 94.9, and 90.0 mg/g) on four regeneration cycles (FIGS. 24C-D). P-laden unwashed CTL has greater quantities of Mg3(PO4)2, MgHPO4, Ca3(PO4)2, and CaHPO4 than P-laden washed CTL (FIG. 24E), which can be attributed to its higher phosphate uptake. Furthermore, larger phosphate cumulative capacity was observed in unwashed CTL (391.8 mg/g) than washed CTL (374.7 mg/g) after four cycles. Therefore, exhausted unwashed CTL potentially improves soil fertility as it retained more phosphates. Higher desorption from P-laden unwashed CTL (3.1 mg/g) than from P-laden washed CTL (0 mg/g) was recorded in the first cycle. Low Ca/Mg phosphates/hydrophosphate quantities precipitated on P-laden washed CTL (FIG. 24B) could be more easily desorbed in HCl than unwashed CTL. The desorbed P from the exhausted washed CTL (~29,000 mg P $kg^{-1}$) and unwashed CTL (~19,100 mg P $kg^{-1}$) for 4 cycles are much higher than the level of soil P requirement, i.e., 45-50 mg P $kg^{-1}$.

Phosphate desorption kinetics of P-laden washed CTL was investigated at different pH levels (6.5, 7.0, and 7.5) using deionized water, and the data were fitted using a second-order kinetic model (FIG. 24F). Initially, phosphates were adsorbed onto the 0.45 g of the adsorbent used to follow desorption using 300 μmL of 100 ppm $PO_4^{3-}$ at pH 7. The phosphate uptake was 52 mg/g (under these conditions, washed CTL does not meet a saturation as the supply of solute concentration is inadequate for a large dose of the adsorbent). This P-laden material was divided equally into three portions and treated with different DI water (pH=6.5, 7.0, and 7.5) solutions. The desorption of phosphates from these samples is shown in FIG. 24F. At all pH levels, the phosphate released rate is initially high before reaching equilibrium after 1-4 d (however, initial pH levels can be confusing since the pH became much more basic or contradict with the P-laden samples due to further basic $Ca^{2+}/Mg^{2+}$ compounds remaining on their surfaces). Equilibrium released rates were 8 mg/L P at initial pH 7.5 (t=4 d), 5.9 mg/L at initial pH 7 (t=2.5 d), and 4 mg/L at initial pH 6.5 (t=1 d). Therefore, washed CTL behaves as a slow-release fertilizer under different pH conditions. Slow-release fertilizers are beneficial because their nutrients are released slowly, avoiding the need for frequent soil applications.

At low pH, Ca/Mg phosphates tend to precipitate and becomes unavailable to plants. When the initial pH rose from pH 6.5 to 7.5, the equilibrium P concentrations in DI water also rose after 20 days where the final pH values were, 9.8, 9.7, and 9.4, respectively (FIG. 24F). The highest leached P concentration (8.9 mg/L) was found at pH=7.5 after 20 d. The P adsorption affinity of washed CTL decreases as pH increases because the competition between phosphates and hydroxide ions is high. After day three, solutions with initial pH=7 and 6.5 exhibited constant phosphate concentrations. After adding P-laden adsorbents, all solution pH values were initially greater than 10 before decreasing with time (FIG. 24G). P-loaded CTL (initial concentration, 100 ppm) underwent 52.9% (initial pH=6.5), 51.7% (initial pH=7), and 57.4% (initial pH=7.5) $PO^34^-$ leaching within a 20-d period. Therefore, further studies are required to investigate the washed CTL's desorption behavior under optimum sorption conditions and utilize as a slow-release fertilizer for a relatively long period of time. The spent CTL adsorbent could replace current commercial P-based fertilizers to treat P deficient agricultural soils.

6. XPS Analysis and CTL Phosphate-Binding Interactions

Figure 25:
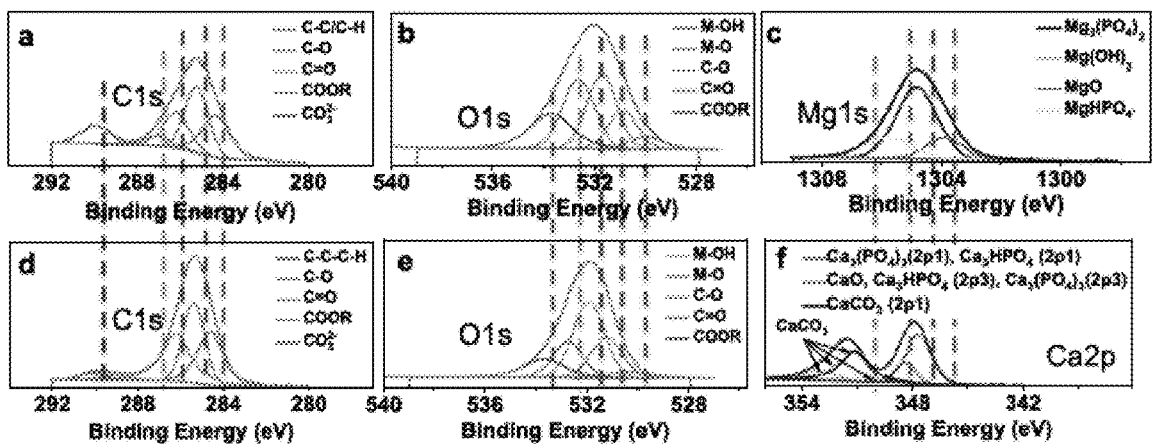
FIG. 25 shows graphs illustrating XPS analysis of CTL before and after P removal. CTL HR C1s and O1S XPS spectra before (a, b) and after (d, e) P removal at pH 2.2. CTL HR Mg1s and Ca2p XPS spectra after (c, f) P removal at pH 2.2.

Phosphate-binding interactions on CTL were further characterized by XPS before and after P removal. CTL high resolution (HR) C1s XPS spectrum before P uptake contained five deconvoluted peaks assigned to C—C/C—H (284.3 eV), C\\O (285.2 eV), C_O (286.2 eV), COOR (287.1 eV), and $CO3^{2-}$ (290.0) (Table 26, FIG. 25). After phosphate uptake, the atomic percentages of COOH and $CO3^{2-}$ on CTL dropped (from 1.3% to 0.7% and from 2.1% to 0.7%) (Table 26 and FIG. 25). CaCO3 dissolution at pH 2.2 explains the $CO3^{2-}$ atomic percentage reduction. The CTL HR O1s XPS spectrum was deconvoluted into five peaks belonging to metal hydroxides (M-OH) (530.0 eV), metal oxides (MO) (531.0 eV), C\\O (531.8 eV), C_O (532.7 eV), and COOR/$CO3^{2-}$ (533.7 eV) (Table 27, FIG. 25). CTL surface O percentages of C_O and $CO3^{2-}$ decreased from 17.9 to 10.2% and 12.8 to 7.7% after phosphate removal (Table 27). These oxygen content decrements imply the oxidation resistance of Mg\\Ca impregnated biochar was enhanced, contributing to its soil stability as previously described (Wu et al., 2019).

TABLE 26

C1s XPS data for RL, washed CTL, and TL before and after $PO_4^{3-}$ adsorption.

| Chemical | | Before $PO_4^{3-}$ adsorption | | | After $PO_4^{3-}$ adsorption | | |
|---|---|---|---|---|---|---|---|
| Species | | RL | TL | CTL | RL | TL | CTL |
| C—C/C—H | Binding energy (eV) | 284.8 | 284.3 | 284.3 | 285.0 | 284.5 | 284.6 |
| | Atomic percentages (%) | 14.4 | 10.1 | 4.9 | 20.7 | 17.2 | 6.8 |
| | FWHM (eV) | 1.5 | 1.5 | 1.5 | 1.4 | 1.5 | 1.4 |

TABLE 26-continued

C1s XPS data for RL, washed CTL, and TL before and after $PO_4^{3-}$ adsorption.

| Chemical Species | | Before $PO_4^{3-}$ adsorption | | | After $PO_4^{3-}$ adsorption | | |
|---|---|---|---|---|---|---|---|
| | | RL | TL | CTL | RL | TL | CTL |
| C—O | Binding energy (eV) | 285.5 | 285.5 | 285.2 | 285.6 | 285.8 | 285.4 |
| | Atomic percentages (%) | 17.8 | 11.6 | 6.2 | 10.1 | 7.8 | 8.2 |
| | FWHM (eV) | 1.6 | 1.6 | 1.3 | 1.3 | 1.6 | 1.2 |
| C═O | Binding energy (eV) | 286.9 | 286.2 | 286.2 | 286.7 | 287.1 | 286.2 |
| | Atomic percentages (%) | 8.0 | 4.7 | 3.9 | 9.0 | 3.7 | 7.4 |
| | FWHM (eV) | 1.6 | 1.6 | 1.4 | 1.6 | 1.6 | 1.6 |
| COOH(R), | Binding energy (eV) | 288.5 | 288.3 | 287.1 | 288.2 | 288.5 | 289.1 |
| | Atomic percentages (%) | 3.9 | 1.4 | 1.3 | 3.1 | 1.7 | 0.7 |
| | FWHM (eV) | 1.6 | 1.6 | 1.4 | 1.6 | 1.6 | 1.5 |
| $CO_3^{2-}$ | Binding energy (eV) | 289.6 | 290.4 | 290.0 | 289.3 | 290.2 | 290.1 |
| | Atomic percentages (%) | 3.0 | 2.3 | 2.1 | 4.7 | 0.7 | 0.7 |
| | FWHM (eV) | 1.6 | 1.6 | 1.6 | 1.6 | 1.66 | 1.3 |

TABLE 27

O1s XPS data for, CTL, and TL before and after $PO_4^{3-}$ adsorption.

| Chemical Species | | Before $PO_4^{3-}$ adsorption | | | After $PO_4^{3-}$ adsorption | | |
|---|---|---|---|---|---|---|---|
| | | RL | TL | CTL | RL | TL | CTL |
| $Mg(OH)_2/Ca(OH)_2$, $Ca_3HPO_4$ | Binding energy (eV) | 530.8 | 530.3 | 530.0 | 531.2 | 530.9 | 530.4 |
| | Atomic percentages (%) | 2.3 | 3.9 | 3.5 | 4.4 | 6.2 | 2.6 |
| | FWHM (eV) | 1.6 | 1.7 | 1.5 | 1.6 | 1.5 | 1.8 |
| MgO, Mg—O—P | Binding energy (eV) | 531.5 | 531.3 | 531.0 | 531.9 | 531.7 | 531.3 |
| | Atomic percentages (%) | 4.0 | 9.4 | 9.2 | 11.3 | 7.8 | 12.0 |
| | FWHM (eV) | 1.2 | 1.6 | 1.4 | 1.4 | 1.2 | 1.5 |
| C—O | Binding energy (eV) | 532.4 | 532.2 | 531.8 | 532.5 | 532.6 | 532.0 |
| | Atomic percentages (%) | 20.6 | 18.6 | 17.8 | 13.7 | 24.7 | 21.9 |
| | FWHM (eV) | 1.6 | 1.5 | 1.4 | 1.4 | 1.5 | 1.5 |
| C═O | Binding energy (eV) | 533.3 | 533.1 | 532.7 | 533.3 | 533.6 | 532.8 |
| | Atomic percentages (%) | 15.4 | 17.7 | 17.9 | 12.3 | 10.0 | 10.2 |
| | FWHM (eV) | 1.6 | 1.5 | 1.5 | 1.5 | 1.4 | 1.4 |
| COOR, $CO_3^{2-}$ | Binding energy (eV) | 534.4 | 533.9 | 533.7 | 534.1 | 534.6 | 533.7 |
| | Atomic percentages (%) | 7.0 | 9.7 | 12.8 | 8.2 | 10.0 | 7.7 |
| | FWHM (eV) | 1.9 | 1.9 | 1.9 | 1.9 | 1.9 | 1.9 |

After phosphate uptake at pH 2.2, the low-resolution CTL survey spectrum exhibited a new 134.9 eV peak due to surface phosphate precipitation (FIG. 30 and Table 28). The higher P atomic percentage of CTL (7.7%) versus RL (2.0%) and TL (4.3%) after phosphate uptake (Table 29) demonstrated CTL's greater phosphate sorption ability. There are two key processes involved in the phosphate uptake on Mg\\Ca rich biochar; surface adsorption of phosphates (Li et al., 2016b; Yao et al., 2011) and $Mg(H2PO4)2$, $MgHPO4$, $Ca_{(H2PO4)2}$, and $CaHPO4$ precipitation (Yao et al., 2013). However, the phosphate surface adsorption did not play a major role on CTL, as presented by SEM/EDX analysis. Precipitation dominated.

TABLE 28

Low-resolution XPS data for RL, TL, and washed CTL before and after $PO_4^{3-}$ adsorption.

| | Peak/Chemical state | RL | TL | CTL | P-laden RL | P-laden TL | P-laden CTL |
|---|---|---|---|---|---|---|---|
| C | Binding energy (eV) | 286.2 | 285.9 | 285.9 | 286.1 | 285.5 | 286.1 |
| | Atomic percentage % | 43.0 | 29.1 | 23.5 | 43.5 | 27.5 | 24.3 |
| | FWHM (eV) | 3.5 | 3.5 | 3.1 | 3.3 | 3.5 | 2.9 |
| O | Binding energy (eV) | 533.3 | 533.0 | 532.5 | 533.1 | 533.2 | 532.8 |
| | Atomic percentage % | 40.8 | 45.9 | 52.9 | 40.6 | 47.7 | 48.1 |
| | FWHM (eV) | 3.3 | 3.4 | 3.5 | 3.2 | 3.6 | 3.1 |

TABLE 28-continued

Low-resolution XPS data for RL, TL, and washed CTL before and after $PO_4^{3-}$ adsorption.

| Peak/Chemical state | | RL | TL | CTL | P-laden RL | P-laden TL | P-laden CTL |
|---|---|---|---|---|---|---|---|
| Mg | Binding energy (eV) | — | 1305.2 | 1304.9 | — | — | 1305.1 |
| | Atomic percentage % | — | 3.0 | 9.0 | — | — | 4.0 |
| | FWHM (eV) | — | 3.2 | 3.1 | — | — | 3.0 |
| Ca | Binding energy (eV) | 349.3 | 349.2 | 347.6 | — | — | 349.0 |
| | Atomic percentage % | 0.9 | 3.9 | 0.3 | — | — | 7.1 |
| | FWHM (eV) | 3.4 | 3.6 | 1.3 | — | — | 3.8 |
| Al | Binding energy (eV) | 76.1 | 75.9 | 75.3 | 75.8 | 76.1 | 75.9 |
| | Atomic percentage % | 5.3 | 6.5 | 5.5 | 5.1 | 7.1 | 3.3 |
| | FWHM (eV) | 3.2 | 3.0 | 3.1 | 2.8 | 3.4 | 2.8 |
| Si | Binding energy (eV) | 104.4 | 103.9 | 103.2 | 104.0 | 104.1 | 103.4 |
| | Atomic percentage % | 8.7 | 9.1 | 6.4 | 9.1 | 8.8 | 3.5 |
| | FWHM (eV) | 3.2 | 3.1 | 3.3 | 2.9 | 3.3 | 3.0 |
| K | Binding energy (eV) | — | — | 295.3 | — | 295.4 | 295.2 |
| | Atomic percentage % | — | — | 1.2 | — | 0.3 | 0.9 |
| | FWHM (eV) | — | — | 4.2 | — | 4.1 | 4.4 |
| P | Binding energy (eV) | — | — | — | — | 135.4 | 134.9 |
| | Atomic percentage % | — | — | — | — | 3.7 | 7.7 |
| | FWHM (eV) | — | — | — | — | 3.5 | 3.0 |

TABLE 29

P2p high-resolution XPS data for RL, TL, and CTL after $PO_4^{3-}$ adsorption.

| Chemical Species | | RL | TL | CTL | References |
|---|---|---|---|---|---|
| $MgHPO_4$ | Binding energy (eV) | 133.6 | 133.9 | 132.9 | (NIST, 2012) |
| | Atomic percentages (%) | 0.2 | 1.4 | 1.0 | |
| | FWHM (eV) | 2.0 | 1.6 | 1.3 | |
| $Mg_3(PO_4)_2$ | Binding energy (eV) | — | 135.0 | 133.9 | (NIST, 2012) |
| | Atomic percentages (%) | — | 2.0 | 4.5 | |
| | FWHM (eV) | — | 1.6 | 1.5 | |
| $CaHPO_4, Ca_3(PO_4)_2$ | Binding energy (eV) | — | 136.3 | 135.0 | (NIST, 2012) |
| | Atomic percentages (%) | — | 0.9 | 2.2 | |
| | FWHM (eV) | — | 1.6 | 1.5 | |

The P-laden CTL Mg1a spectrum had four key peaks at 1302.6 eV, 1303.9 eV, 1304.9 eV, and 1305.8 eV (FIG. 25 and Table 30), assigned respectively to $Mg(OH)_2$, MgO, $Mg_3(PO_4)_2$ and $MgHPO_4$ (Lin et al., 2019; Yao et al., 2013). This spectrum characterizes the surface $Mg^{2+}$ deposition and crystalline Mg\\P salts formation after P uptake. After CTL removes P at pH 2.2 from water, $Mg(OH)_2$ and MgO atomic percentages dropped from 2.0% to 0.2% and 3.6% to 1.0% (FIG. 25), revealing dissolution of these species.

TABLE 30

Mg1s, and Ca2p high-resolution XPS data for CTL before and after $PO_4^{3-}$ adsorption.

| | | Before P adsorption | After P adsorption | |
|---|---|---|---|---|
| $Mg(OH)_2$ | Binding energy (eV) | 1303.3 | 1302.6 | (Yao et al., 2013) |
| | Atomic percentages (%) | 2.0 | 0.2 | |
| | FWHM (eV) | 1.5 | 2.0 | |
| MgO | Binding energy (eV) | 1303.9 | 1303.9 | |
| | Atomic percentages (%) | 3.6 | 1.0 | |
| | FWHM (eV) | 1.5 | 1.4 | |
| $Mg_3(PO_4)_2$ | Binding energy (eV) | 1304.8 | 1304.9 | (Aramendia et al., 1995; Lin et al., 2019) |
| | Atomic percentages (%) | 4.8 | 3.4 | |
| | FWHM (eV) | 1.8 | 1.6 | |
| $MgHPO_4$ | Binding energy (eV) | 1306.0 | 1305.8 | (Lin et al., 2019) |
| | Atomic percentages (%) | 2.0 | 1.2 | |
| | FWHM (eV) | 1.9 | 1.9 | |
| CaO, $Ca(HPO_4)$ (2p3), $Ca_3(PO_4)_2$ (2p3) | Binding energy (eV) | 347.6 | 347.7 | (Chusuei et al., 1999; NIST, 2012) |
| | Atomic percentages (%) | 3.5 | 4.5 | |
| | FWHM (eV) | 2.1 | 1.6 | |
| $Ca_3(PO_4)_2$ (2p1), $Ca(HPO_4)$ (2p1) | Binding energy (eV) | — | 348.5 | (Chusuei et al., 1999) |
| | Atomic percentages (%) | — | 1.5 | |
| | FWHM (eV) | — | 1.4 | |
| $CaCO_3$ (2p1) | Binding energy (eV) | 349.4 | 349.5 | (NIST, 2012) |
| | Atomic percentages (%) | 1.3 | 0.3 | |
| | FWHM (eV) | 2.0 | 2.0 | |

CTL has a very high PZC (−13), and both MgO and Mg(OH)2 have PZCs around pH 12. When the solution pH is below the PZC, the adsorbent surface is positively charged; MgO, and CaO (if present) can acquire surface hydroxyls, whereas Mg(OH)2 can be protonated (Yao et al., 2011). At low pH, $HPO_4^{2-}/PO_4^{3-}$ electrostatically interact with protonated Mg(OH) 2 and MgO sites on CTL. Therefore, electrostatic interactions promote phosphate removal. Around pH–4, P salts precipitate as MgHPO4, Mg3 (PO4)2, and CaHPO4. Lin et al., 2019 reported a similar Mg\\P formation on the Mg(OH)2/ZrO2 surface during phosphate uptake.

After CTL's phosphate uptake, the M-OH surface region's oxygen percentage (for $M=Al^{3+}$ or $Si^{4+}$) decreased (from 3.5% to 2.6%) (Table 27). The phosphate binding caused a drop of M-OH oxygen percentage on CTL, consistent with SEM/EDX studies. The ratio between M-OH of the adsorbent before phosphate exposure versus the P-laden adsorbent M-OH can be 0.5 (monodentate complex) or 2 (bidentate complex). Here, that ratio is 1.3 (3.5%/2.6%), which is within the permitted range. Mononuclear monodentate, mononuclear bidentate and binuclear bidentate phosphate complexes can potentially form Al and Si bound surface hydroxyls on CTL, in agreement with Lü findings (L ü et al., 2013). However, this inner sphere chemisorptive complexation is only a small fraction of the overall CTL phosphate uptake.

The HR-XPS Ca2p spectrum of P-laden CTL contains Ca2p3 peaks at 347.7 eV (CaO, CaHPO4, Ca3(PO4)2) and 348.5 eV (Ca3(PO4)2, CaHPO4), and a Ca2p1 peak at 349.5 eV (CaCO3). This proves the existence of $Ca^{2+}$ on the surface and possible $Ca^{2+}$/phosphate interactions (FIG. 25 and Table 30) (NIST, 2012). Bulk elemental analysis of CTL also indicated a 1.5% wt. Ca content. C02 is released on CTL pyrolysis of CTL and reacts with surface Ca(OH)2, giving CaCO3 (Antunes et al., 2018). XRD analysis of the CTL exhibited the known (112) plane of CaCO3 at 2θ=29.7° (FIG. 20B). The atomic percentage of Ca in CaCO3 decreased (from 1.3% to 0.3%) after phosphate uptake (Table 30) at pH 2.2. At low pH, dissolution of CaCO3 followed by phosphate precipitation as CaHPO4 caused this reduction. CaCO3 is highly soluble in an acidic medium (Table 18), where it contributes more to phosphorous uptake via released $Ca^{2+}$. This $Ca^{2+}$ formed brushite (CaHPO4) or hydroxylapatite (Ca5(PO4)3OH) precipitates (Antunes et al., 2018; Marshall et al., 2017). A new peak formation at 348.5 eV denotes CaHPO4 (−1.5%) precipitation on the CTL.

Figure 31:
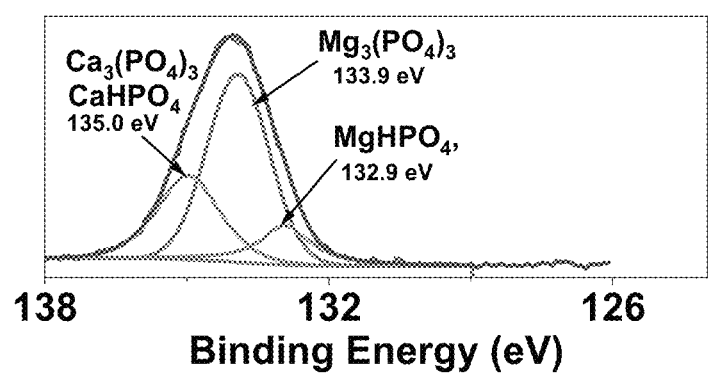
FIG. 31 shows a graph illustrating high-resolution P2p spectrum for washed CTL after P adsorption. XPS analysis of P-laden washed CTL after the removal of phosphate. CTL HR P2p XPS spectrum after P removal at pH 2.2. The binding energies of Ca.

Overall, CTL's $Mg^{2+}$ and $Ca^{2+}$ contents greatly exceeded RL's Mg (12.4% vs. 0.5%) and Ca (4.8% vs. 1.0%) (Table 30) and produced high phosphate uptake. After removing P from water, the P surface region percentage from XPS quantifications was highest in CTL (7.7%) vs TL and RL (4.3% vs. 2.0%) (Table 29 and FIG. 31). The HR P2p XPS spectrum's peaks were assigned to the 1.0% MgHPO4 (132.9 eV), 4.5% Mg3(PO4)2 (133.9 eV), and 2.2% Ca3 (PO4)2, CaHPO4 (135.0 eV) (Table 29). $Ca^{2+}$ or $Mg^{2+}$/$HPO_4^{2-}$ complexes are thermodynamically more stable than $H_2PO_4^-$ and interact with the positively charged adsorbent surfaces. Precipitation of CaHPO4, Ca3(PO4)2, MgHPO4, and Mg3(PO4)2 on the CTL surface increases surface P percentages as described above. In summary, CTL phosphate remediation proceeds largely via precipitation of $Ca^{2+}$ and $Mg^{2+}$ salts originally released by CTL (Eqs. (1)-(4)). At high pH (>9) speciation favors $PO_4^{3-}$, so Ca3(PO4)2 was precipitated (Eq. (4)). The electrostatic interaction of protonated surfaces with $HPO_4^{2-}$ and $PO_4^{3-}$ species contributes CTL's P uptake under environmental pH levels (pH=6-9).

  (1)

  (2)

  (3)

  (4)

Conclusions

Lignite-based adsorbents' high abundance, physicochemical properties, and low-costs are attractive for traditional water treatment. These can be utilized to reduce eutrophication in natural waters by re-mediation of point and nonpoint sources of P. Sequential impregnation of lignite, RL, with $Ca^{2+}/Mg^{2+}$ salts, followed by 600° C. pyrolysis (under N2, for 1 h) generated CTL. The Sips P removal capacity at 25° C. of CTL (obtained after rinsing) was 15.5 mg/g versus TL and RL (2.5 and 1.1 mg/g) (particle size<150 μm, pH 7, adsorbent dose 50 mg, 25 mL of 25-1000 ppm phosphate concentration, 24 h). Enhanced CTL P removal capacity was due to increased surface availability of quantities of MgO, —Mg(OH)2, —Ca(OH)2, and —CaCO3, which can dissolve into water and bind phosphate, or this plant nutrient can bind at the surface forming insoluble phosphate salts on the adsorbent. This stoichiometric process means P uptake capacities can be greatly expanded by greater $Ca^{2+}/Mg^{2+}$ addition. CTL phosphate removal follows pseudo-second-order kinetics and precipitation dominates the phosphate removal by CTL. A variety of CTLs can be developed to remove phosphate fertilizers from agriculture run off and the spent sorbent can then be recycled as a slow-release fertilizer. Unwashed CTL could also be utilized to lower soil acidity, enhance soil fertility, and can be readily produced at a large scale in a few steps.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

[1] Pehlivan, E.; Arslan, G. Removal of Metal Ions Using Lignite in Aqueous Solution-Low Cost Biosorbents. *Fuel Processing Technology* 2007, 88 (1), 99-106.

[2] IBI. (2014). *IBI Biochar Standards*. October, 1-60. http://www.biochar-international.org/characterization-standard %5Cnhttp://www.biochar-international.org/sites/default/files/IBI_Biochar_Standards_V2 0_final_2014.pdf

[3] Kizito, S., Luo, H., Lu, J., Bah, H., Dong, R., & Wu, S. (2019). Role of nutrient-enriched biochar as a soil amendment during maize growth: Exploring practical alternatives to recycle agricultural residuals and to reduce chemical fertilizer demand. *Sustainability* (Switzerland), 11(11). https://doi.org/10.3390/su11113211

[4] Prapagdee, S., & Tawinteung, N. (2017). Effects of biochar on enhanced nutrient use efficiency of green bean, *Vigna radiata* L. *Environmental Science and Pollution Research*, 24(10), 9460-9467. https://doi.org/10.1007/s11356-017-8633-1.

[5] E. Antunes, M. V. Jacob, G. Brodie, P. A. Schneider, Isotherms, kinetics and mechanism analysis of phosphorus recovery from aqueous solution by calcium-rich biochar produced from biosolids via microwave pyrolysis, J. Environ. Chem. Eng. 6 (2018) 395-403, https://doi.org/10.1016/j.jece.2017.12.011.

[6] Md. R. Awual, Efficient phosphate removal from water for controlling eutrophication using novel composite adsorbent, J. Clean. Prod. 228 (2019) 1311-1319, https://doi.org/10.1016/j.jclepro.2019.04.325.

[7] G. Chattopadhyaya, D. G. Macdonald, N. N. Bakhshi, J. S. Soltan Mohammadzadeh, A. K. Dalai, Preparation and characterization of chars and activated carbons from Saskatchewan lignite, Fuel Process. Technol. 87 (2006) 997-1006, https://doi.org/10.1016/j.fuproc.2006.07.004.

[8] J. Chen, H. Kong, D. Wu, X. Chen, D. Zhang, Z. Sun, Phosphate immobilization from aqueous solution by fly ashes in relation to their composition, J. Hazard. Mater. 139 (2007) 293-300, https://doi.org/10.1016/j.jhazmat.2006.06.034.

[9] S. Chen, Q. Yue, B. Gao, Q. Li, X. Xu, K. Fu, Adsorption of hexavalent chromium from aqueous solution by modified corn stalk: a fixed-bed column study, Bioresour. Technol., Spec. Issue Chall. Environ. Sci. Eng. 113 (2012) 114-120, https://doi.org/10.1016/j.biortech.2011.11.110.

[10] L. Dai, F. Tan, H. Li, N. Zhu, M. He, Q. Zhu, G. Hu, L. Wang, J. Zhao, Calcium-rich biochar from the pyrolysis of crab shell for phosphorus removal, J. Environ. Manag. 198 (2017) 70-74, https://doi.org/10.1016/j.jenvman.2017.04.057.

[11] W. Du, J. Sun, Y. Zan, Z. Zhang, J. Ji, M. Dou, F. Wang, Biomass-derived nitrogen-doped hierarchically porous carbon networks as efficient absorbents for phenol removal from wastewater over a wide pH range, RSC Adv. 7 (2017) 46629-46635, https://doi.org/10.1039/C7RA08374B.

[12] Y. Fu, Y. Shen, Z. Zhang, X. Ge, M. Chen, Activated bio-chars derived from rice husk via one- and two-step KOH-catalyzed pyrolysis for phenol adsorption, Sci. Total Environ. 646 (2019) 1567-1577, https://doi.org/10.1016/j.scitotenv.2018.07.423.

[13] R. P. Girón, R. R. Gil, I. Suárez-Ruiz, E. Fuente, B. Ruiz, Adsorbents/catalysts from forest biomass fly ash. Influence of alkaline activating agent, Microporous Mesoporous Mater., SI: Charact. Porous Solids X 209 (2015) 45-53, https://doi.org/10.1016/j.micromeso.2015.01.051.

[14] J. I. González Ocampo, D. M. Escobar Sierra, C. P. Ossa Orozco, Porous bodies of hydroxyapatite produced by a combination of the gel-casting and polymer sponge methods, J. Adv. Res. 7 (2016) 297-304, https://doi.org/10.1016/j.jare.2015.06.006.

[15] Q. He, P. Ruan, Z. Miao, K. Wan, M. Gao, X. Li, S. Huang, Adsorption of direct yellow brown D3G from aqueous solution using loaded modified low-cost lignite: performance and mechanism, Environ. Technol. 1-10 (2019), https://doi.org/10.1080/09593330.2019.1675774.

[16] G. W. Kajjumba, E. Yildinm, S. Aydin, S. Emik, T. Aĝŭn, F. Osra, J. Wasswa, A facile polymerisation of magnetic coal to enhanced phosphate removal from solution, J. Environ. Manag. 247 (2019) 356-362, https://doi.org/10.1016/j.jenvman.2019.06.088.

[17] M. A. Khan, Y.-T. Ahn, M. Kumar, W. Lee, B. Min, G. Kim, D.-W. Cho, W. B. Park, B.-H. Jeon, Adsorption studies for the removal of nitrate using modified lignite granular activated carbon, Sep. Sci. Technol. 46 (2011) 2575-2584, https://doi.org/10.1080/01496395.2011.601782.

[18] L. Kong, M. Han, K. Shih, M. Su, Z. Diao, J. Long, D. Chen, L. Hou, Y. Peng, Nano-rod Ca-decorated sludge derived carbon for removal of phosphorus, Environ. Pollut. 233 (2018) 698-705, https://doi.org/10.1016/j.envpol.2017.10.099.

[19] P. S. Kumar, L. Korving, M. C. M. van Loosdrecht, G.-J. Witkamp, Adsorption as a technology to achieve ultra-low concentrations of phosphate: research gaps and economic analysis, Water Res. X 4 (2019), 100029, https://doi.org/10.1016/j.wroa.2019.100029.

[20] J. Li, B. Li, H. Huang, X. Lv, N. Zhao, G. Guo, D. Zhang, Removal of phosphate from aqueous solution by dolomite-modified biochar derived from urban dewatered sewage sludge, Sci. Total Environ. 687 (2019) 460-469, https://doi.org/10.1016/j.scitotenv.2019.05.400.

[21] M. Li, C. Liu, H. Cao, H. Zhao, Y. Zhang, Z. Fan, K O H self-templating synthesis of three-dimensional hierarchical porous carbon materials for high performance supercapacitors, J. Mater. Chem. A 2 (2014) 14844-14851, https://doi.org/10.1039/C4TA02167C.

[22] J. Lin, S. He, X. Wang, H. Zhang, Y. Zhan, Removal of phosphate from aqueous solution by a novel Mg(OH)2/ZrO2 composite: adsorption behavior and mechanism, Colloids Surf Physicochem. Eng. Asp. 561 (2019) 301-314, https://doi.org/10.1016/j.colsurfa.2018.11.001.

[23] W.-J. Liu, H. Jiang, H.-Q. Yu, Development of biochar-based functional materials: toward a sustainable platform carbon material, Chem. Rev. 115 (2015) 12251-12285, https://doi.org/10.1021/acs.chemrev.5b00195.

[24] J. Lladó, M. Solé-Sardans, C. Lao-Luque, E. Fuente, B. Ruiz, Removal of pharmaceutical industry pollutants by coal-based activated carbons, Process Saf. Environ. Prot. 104 (2016) 294-303, https://doi.org/10.1016/j.psep.2016.09.009.

[25] D. Lozano-Calero, P. Martin-Palomeque, S. Maduenô-Loriguillo, Determination of phosphorus in cola drinks, J. Chem. Educ. 73 (1996) 1173, https://doi.org/10.1021/ed073p1173.

[26] D. Lozano-Castelló, J. M. Calo, D. Cazorla-Amorós, A. Linares-Solano, Carbon activation with KOH as explored by temperature programmed techniques, and the effects of hydrogen, Carbon 45 (2007) 2529-2536, https://doi.org/10.1016/j.carbon.2007.08.021.

[27] J. P. Maity, T.-J. Lin, H. P.-H. Cheng, C.-Y. Chen, A. S. Reddy, S. B. Atla, Y.-F. Chang, H.-R. Chen, C.-C. Chen, Synthesis of brushite particles in reverse microemulsions of the biosurfactant surfactin, Int. J. Mol. Sci. 12 (2011) 3821-3830, https://doi.org/10.3390/ijms12063821.

[28] J. A. Marshall, B. J. Morton, R Muhlack, D. Chittleborough, C. W. Kwong, Recovery of phosphate from calcium-containing aqueous solution resulting from biochar-induced calcium phosphate precipitation, J. Clean. Prod. 165 (2017) 27-35, https://doi.org/10.1016/j.jclepro.2017.07.042.

[29] D. T. Mekonnen, E. Alemayehu, B. Lennartz, Removal of phosphate ions from aqueous solutions by adsorption onto leftover coal, Water 12 (2020) 1381, https://doi.org/10.3390/w12051381.

[30] D. Mitrogiannis, M. Psychoyou, I. Baziotis, V. J. Inglezakis, N. Koukouzas, N. Tsoukalas, D. Palles, E. Kamitsos, G. Oikonomou, G. Markou, Removal of phosphate from aqueous solutions by adsorption onto Ca(OH)2 treated natural clinoptilolite, Chem. Eng. J. 320 (2017) 510-522, https://doi.org/10.1016/j.cej.2017.03.063.

[31] H. Nam, S. Wang, H.-R. Jeong, T M A and H2S gas removals using metal loaded on rice husk activated carbon for indoor air purification, Fuel 213 (2018) 186-194, https://doi.org/10.1016/j.fuel.2017.10.089.

[32] S. Ni, J. Chang, L. Chou, A novel bioactive porous CaSiO3 scaffold for bone tissue engineering, J. Biomed. Mater. Res. A 76A (2006) 196-205, https://doi.org/10.1002/jbm.a.30525.

[33] T. Otowa, R. Tanibata, M. Itoh, Production and adsorption characteristics of MAXSORB: High-surface-area active carbon, Gas. Sep. Purif. 7 (1993) 241-245, https://doi.org/10.1016/0950-4214(93)80024-Q.

[34] A. Panagopoulos, K.-J. Haralambous, Minimal Liquid Discharge (MLD) and Zero Liquid Discharge (ZLD) strategies for wastewater management and resource recovery—analysis, challenges and prospects, J. Environ. Chem. Eng. 8 (2020), 104418, https://doi.org/10.1016/j.jece.2020.104418.

[35] W. Parawira, I. Kudita, M. G. Nyandoroh, R. Zvauya, A study of industrial anaerobic treatment of opaque beer brewery wastewater in a tropical climate using a full-scale UASB reactor seeded with activated sludge, Process Biochem. 40 (2005) 593-599, https://doi.org/10.1016/j.procbio.2004.01.036.

[36] P. R. Prezas, B. M. G. Melo, L. C. Costa, M. A. Valente, M. C. Lança, J. M. G. Ventura, L. F. V. Pinto, M. P. F. Graga, TSDC and impedance spectroscopy measurements on hydroxyapatite, β-tricalcium phosphate and hydroxyapatite/β-tricalcium phosphate biphasic bioceramics. Appl. Surf. Sci., 7th International Conference on Advanced Nanomaterials, 2nd International Conference on Graphene Technology, 1st International Conference on Spintronics Materials 424, 2017: 28-38. <https://doi.org/10.1016/j.apsusc.2017.02.225>.

[37] Y. Qi, A. F. A. Hoadley, A. L. Chaffee, G. Gamier, Characterisation of lignite as an industrial adsorbent, Fuel 90 (2011) 1567-1574, https://doi.org/10.1016/j.fuel.2011.01.015.

[38] V. Romanovski, Agricultural waste based-nanomaterials: green technology for water purification, in: K. A. Abd-Elsalam, M. Zahid (Eds.), Aquananotechnology, Micro and Nano Technologies, Elsevier, 2021, pp. 577-595, https://doi.org/10.1016/B978-0-12-821141-0.00013-6.

[39] H. Samaraweera, A. Sharp, J. Edwards, C. U. Pittman, X. Zhang, E. B. Hassan, R. V. K. G. Thirumalai, S. Warren, C. Reid, T. Mlsna, Lignite, thermally-modified and Ca/Mg-modified lignite for phosphate remediation, Sci. Total Environ. 773 (2021), 145631, https://doi.org/10.1016/j.scitotenv.2021.145631.

[40] R. Sharma, A. Sarswat, U. Pittman, D. C., Mohan, Cadmium and lead remediation using magnetic and nonmagnetic sustainable biosorbents derived from Bauhinia purpurea pods, RSC Adv. 7 (2017) 8606-8624, https://doi.org/10.1039/C6RA25295H.

[41] S. K. Sriramoju, P. S. Dash, S. Majumdar, Meso-porous activated carbon from lignite waste and its application in methylene Blue adsorption and coke plant effluent treatment, J. Environ. Chem. Eng. 9 (2021), 104784, https://doi.org/10.1016/j.jece.2020.104784.

[42] E. A. Stefaniak, A. Buczynska, V. Novakovic, R. Kuduk, R. V. Grieken, Determination of chemical composition of individual airborne particles by SEM/EDX and micro-Raman spectrometry: a review, J. Phys.: Conf. Ser. 162 (2009), 012019, https://doi.org/10.1088/1742-6596/162/1/012019.

[43] C. A. Takaya, L. A. Fletcher, S. Singh, U. C. Okwuosa, A. B. Ross, Recovery of phosphate with chemically modified biochars, J. Environ. Chem. Eng. 4 (2016) 1156-1165, https://doi.org/10.1016/j.jece.2016.01.011.

[44] Y. Tang, X. Wang, Y. Yang, B. Gao, Y. Wan, Y. C. Li, D. Cheng, Activated-lignite-based super large granular slow-release fertilizers improve apple tree growth: synthesis, characterizations, and laboratory and field evaluations, J. Agric. Food Chem. 65 (2017) 5879-5889, https://doi.org/10.1021/acs.jafc.7b01699.

[45] USEPA, O., Nutrient Criteria Technical Guidance Manuals [WWW Document]. USEPA, 2018. URL <https://www.epa.gov/nutrient-policy-data/nutrient-criteria-technical-guidance-manuals> (accessed 12 Apr. 2020).

[46] Z. Wang, S. Bakshi, C. Li, S. J. Parikh, H.-S. Hsieh, J. J. Pignatello, Modification of pyrogenic carbons for phosphate sorption through binding of a cationic polymer, J. Colloid Interface Sci. 579 (2020) 258-268, https://doi.org/10.1016/j.jcis.2020.06.054.

[47] H. Wei, S. Deng, B. Hu, Z. Chen, B. Wang, J. Huang, G. Yu, Granular bamboo-derived activated carbon for high $CO(2)$ adsorption: the dominant role of narrow micropores, ChemSusChem 5 (2012) 2354-2360, https://doi.org/10.1002/cssc.201200570

[48] E. D. Woumfo, J. M. Siéwé, D. Njopwouo, A fixed-bed column for phosphate removal from aqueous solutions using an andosol-bagasse mixture, J. Environ. Manag. 151(2015) 450-460, https://doi.org/10.1016/j.jenvman.2014.11.029.

[49] B. Wu, J. Wan, Y. Zhang, B. Pan, I. M. C. Lo, Selective phosphate removal from water and wastewater using sorption: process fundamentals and removal mechanisms, Environ. Sci. Technol. 54 (2020) 50-66, https://doi.org/10.1021/acs.est.9b05569.

[50] J. Wu, A. Zhang, G. Li, Y. Wei, S. He, Z. Lin, X. Shen, Q. Wang, Effect of different components of single superphosphate on organic matter degradation and maturity during pig manure composting, Sci. Total Environ. 646 (2019) 587-594, https://doi.org/10.1016/j.scitotenv.2018.07.336

[51] L. Wu, C. Wei, S. Zhang, Y. Wang, Y. Kuzyakov, X. Ding, MgO-modified biochar increases phosphate retention and rice yields in saline-alkaline soil, J. Clean. Prod. 235 (2019) 901-909, https://doi.org/10.1016/j.jclepro.2019.07.043

[52] F. Xie, F. Wu, G. Liu, Y. Mu, C. Feng, H. Wang, J. P. Giesy, Removal of phosphate from eutrophic lakes through adsorption by in situ formation of magnesium hydroxide from diatomite, Environ. Sci. Technol. 48 (2014) 582-590, https://doi.org/10.1021/es4037379.

[53] H. Yang, Y. Wang, J. Bender, S. Xu, Removal of arsenate and chromate by lanthanum-modified granular ceramic material: the critical role of coating temperature, Sci. Rep. 9 (2019) 1-12, https://doi.org/10.1038/s41598-019-44165-8.

[54] W. Yang, X. Shi, J. Wang, W. Chen, L. Zhang, W. Zhang, X. Zhang, J. Lu, Fabrication of a novel bifunctional nanocomposite with improved selectivity for simultaneous nitrate and phosphate removal from water, ACS Appl. Mater. Interfaces 11(2019) 35277-35285, https://doi.org/10.1021/acsami.9b08826.

[55] Q. Yin, H. Ren, R. Wang, Z. Zhao, Evaluation of nitrate and phosphate adsorption on Al-modified biochar: influence of Al content, Sci. Total Environ. 631-632 (2018) 895-903, https://doi.org/10.1016/j.scitotenv.2018.03.091.

[56] S.-Y. Yoon, C.-G. Lee, J.-A. Park, J.-H. Kim, S.-B. Kim, S.-H. Lee, J.-W. Choi, Kinetic, equilibrium and thermodynamic studies for phosphate adsorption to magnetic iron oxide nanoparticles, Chem. Eng. J. 236 (2014) 341-347, https://doi.org/10.1016/j.cej.2013.09.053

[57] Q. Zhang, Z. Zhang, J. Teng, H. Huang, Q. Peng, T. Jiao, L. Hou, B. Li, Highly efficient phosphate sequestration in aqueous solutions using nanomagnesium hydroxide modified polystyrene materials, Ind. Eng. Chem. Res. 54 (2015) 2940-2949, https://doi.org/10.1021/ie503943z

[58] Y. Zhang, M. S. Akindolie, X. Tian, B. Wu, Q. Hu, Z. Jiang, L. Wang, Y. Tao, B. Cao, J. Qu, Enhanced phosphate scavenging with effective recovery by magnetic porous biochar supported La(OH)3: kinetics, isotherms, mechanisms and applications for water and real wastewater, Bioresour. Technol. 319 (2021), 124232, https://doi.org/10.1016/j.biortech.2020.124232.

[59] L. Zhao, N. Guanhua, W. Hui, S. Qian, W. Gang, J. Bingyou, Z. Chao, Molecular structure characterization of lignite treated with ionic liquid via FTIR and XRD spectroscopy, Fuel 272 (2020), 117705, https://doi.org/10.1016/j.fuel.2020.117705.

[60] Y. Zheng, A. R. Zimmerman, B. Gao, Comparative investigation of characteristics and phosphate removal by engineered biochars with different loadings of magnesium, aluminum, or iron, Sci. Total Environ. 747 (2020), 141277, https://doi.org/10.1016/j.scitotenv.2020.141277.

[61] C. Zhong, Y. Deng, W. Hu, J. Qiao, L. Zhang, J. Zhang, A review of electrolyte materials and compositions for electrochemical supercapacitors, Chem. Soc. Rev. 44 (2015) 7484-7539, https://doi.org/10.1039/C5CS00303B

[62] Y. Zhu, X. Zhang, Y. Chen, Q. Xie, J. Lan, M. Qian, N. He, A comparative study on the dissolution and solubility of hydroxylapatite and fluorapatite at 25° C. and 45° C., Chem. Geol. 268 (2009) 89-96, https://doi.org/10.1016/j.chemgeo.2009.07.014

[63] P. Regmi, J. L. Garcia Moscoso, S. Kumar, X. CaO, J. Mao, G. Schafran, Removal of copper and cadmium from aqueous solution using switchgrass biochar produced via hydrothermal carbonization process, J. Environ. Manage. 109 (2012) 61-69, https://doi.org/10.1016/j.jenvman.2012.04.047.

[64] Antunes, E., Jacob, M. V., Brodie, G., Schneider, P. A., 2018. Isotherms, kinetics and mechanism analysis of phosphorus recovery from aqueous solution by calcium-rich biochar produced from biosolids via microwave pyrolysis. J. Environ. Chem. Eng. 6, 395-403. https://doi.org/10.1016/j.jece.2017.12.011

[65] Chusuei, C. C., Goodman, D. W., Van Stipdonk, M. J., Justes, D. R., Schweikert, E. A., 1999. Calcium Phosphate Phase Identification Using XPS and Time-of-Flight Cluster SIMS. Anal. Chem. 71, 149-153. https://doi.org/10.1021/ac9806963

[66] Daou, T. J., Begin-Colin, S., Grenèche, J. M., Thomas, F., Derory, A., Bernhardt, P., Legaré, P., Pourroy, G., 2007. Phosphate Adsorption Properties of Magnetite-Based Nanoparticles. Chem. Mater. 19, 4494-4505. https://doi.org/10.1021/cm071046v

[67] Fang, L., Li, J., Donatello, S., Cheeseman, C. R., Poon, C. S., Tsang, D. C. W., 2020. Use of Mg/Ca modified biochars to take up phosphorus from acid-extract of incinerated sewage sludge ash (ISSA) for fertilizer application. J. Clean. Prod. 244, 118853. https://doi.org/10.1016/j.jclepro.2019.118853

[68] González Ocampo, J. I., Escobar Sierra, D. M., Ossa Orozco, C. P., 2016. Porous bodies of hydroxyapatite produced by a combination of the gel-casting and polymer sponge methods. J. Adv. Res. 7, 297-304. https://doi.org/10.1016/j.jare.2015.06.006

[69] Ho, Y. S., McKay, G., 1999. Pseudo-second order model for sorption processes. Process Biochem. 34, 451-465. https://doi.org/10.1016/S0032-9592(98)00112-5

[70] Karunanayake, A. G., Navarathna, C. M., Gunatilake, S. R., Crowley, M., Anderson, R., Mohan, D., Perez, F., Pittman, C. U., Jr., Mlsna, T., 2019. Fe3O4 Nanoparticles Dispersed on Douglas Fir Biochar for Phosphate Sorption. ACS Appl. Nano Mater. 2. https://doi.org/10.1021/acsanm.9b00430

[71] Kong, L., Han, M., Shih, K., Su, M., Diao, Z., Long, J., Chen, D., Hou, L., Peng, Y., 2018. Nano-rod Ca-decorated sludge derived carbon for removal of phosphorus. Environ. Pollut. 233, 698-705. https://doi.org/10.1016/j.envpol.2017.10.099

[72] Li, N., Ren, J., Zhao, L., Wang, Z., 2013. Fixed Bed Adsorption Study on Phosphate Removal Using Nano-sized FeOOH-Modified Anion Resin [WWW Document]. J. Nanomater. https://doi.org/10.1155/2013/736275

[73] Marshall, J. A., Morton, B. J., Muhlack, R., Chittleborough, D., Kwong, C. W., 2017. Recovery of phosphate from calcium-containing aqueous solution resulting from biochar-induced calcium phosphate precipitation. J. Clean. Prod. 165, 27-35. https://doi.org/10.1016/j.jclepro.2017.07.042

[74] NIST, 2012. NIST XPS Database Detail Page [WWW Document]. URL https://srdata.nist.gov/xps/XPSDetailPage.aspx?AllDataNo=66523 (accessed 3.28.19).

[75] Patel, H., 2019. Fixed-bed column adsorption study: a comprehensive review. Appl. Water Sci. 9, 45. https://doi.org/10.1007/s13201-019-0927-7

[76] Prezas, P. R., Melo, B. M. G., Costa, L. C., Valente, M. A., Langa, M. C., Ventura, J. M. G., Pinto, L. F. V., Graga, M. P. F., 2017. TSDC and impedance spectroscopy measurements on hydroxyapatite, β-tricalcium phosphate and hydroxyapatite/β-tricalcium phosphate biphasic bioceramics. Appl. Surf. Sci., 7th International Conference on Advanced Nanomaterials, 2nd International Conference on Graphene Technology, 1st International Conference on Spintronics Materials 424, 28-38. https://doi.org/10.1016/j.apsusc.2017.02.225

[77] Samaraweera, H., Sharp, A., Edwards, J., Pittman, C. U., Zhang, X., Hassan, E. B., Thirumalai, R. V. K. G., Warren, S., Reid, C., Mlsna, T., 2021. Lignite, thermally-modified and Ca/Mg-modified lignite for phosphate remediation. Sci. Total Environ. 145631. https://doi.org/10.1016/j.scitotenv.2021.145631

[78] Toor, M., Jin, B., 2012. Adsorption characteristics, isotherm, kinetics, and diffusion of modified natural bentonite for removing diazo dye. Chem. Eng. J. 187, 79-88. https://doi.org/10.1016/j.cej.2012.01.089

[79] Trgo, M., Medvidović, N. V., Perić, J., 2011. Application of mathematical empirical models to dynamic removal of lead on natural zeolite clinoptilolite in a fixed bed column. IJCT Vol182 March 2011.

[80] Wang, S., Kong, L., Long, J., Su, M., Diao, Z., Chang, X., Chen, D., Song, G., Shih, K., 2018. Adsorption of phosphorus by calcium-flour biochar: Isotherm, kinetic and transformation studies. Chemosphere 195, 666-672. https://doi.org/10.1016/j.chemosphere.2017.12.101

[81] Woumfo, E. D., Siéwé, J. M., Njopwouo, D., 2015. A fixed-bed column for phosphate removal from aqueous solutions using an andosol-bagasse mixture. J. Environ. Manage. 151, 450-460. https://doi.org/10.1016/j.jenvman.2014.11.029

[82] Zhang, X. N., Mao, G. Y., Jiao, Y. B., Shang, Y., Han, R. P., 2014. Adsorption of anionic dye on magnesium hydroxide-coated pyrolytic bio-char and reuse by microwave irradiation. Int. J. Environ. Sci. Technol. 11, 1439-1448. https://doi.org/10.1007/s13762-013-0338-5

[83] Antunes, E., Jacob, M. V., Brodie, G., Schneider, P. A., 2018. Isotherms, kinetics and mechanism analysis of phosphorus recovery from aqueous solution by calcium-rich biochar produced from biosolids via microwave pyrolysis. J. Environ. Chem. Eng. 6, 395-403. https://doi.org/10.1016/j.jece.2017.12.011.

[84] Binitha, M. P., Pradyumnan, P. P., 2013. Dielectric Property Studies of Biologically Compatible Brushite Single Crystals Used as Bone Graft Substitute, 2013 https://doi.org/10.4236/jbnb.2013.42016.

[85] Bombuwala Dewage, N., Liyanage, A. S., Mohan, D., Mlsna, T., Pittman Jr., C. U., 2018. Fast nitrate and fluoride adsorption and magnetic separation from water on $\alpha$-Fe2O3 and Fe3O4 dispersed on Douglas fir biochar. Bioresour. Technol. 263, 258-265. https://doi.org/10.1016/j.biortech.2018.05.001.

[86] Bowen, B. H., Irwin, M. W., 2008. Coal Characteristics.

[87] Buscarino, G., Ardizzone, V., Vaccaro, G., Gelardi, F. M., 2011. Sintering process of amorphous SiO2 nanoparticles investigated by AFM, IR and Raman techniques. J. Non-Cryst. Solids, SiO2. Advanced Dielectrics and Related Devices 357, 1866-1870. https://doi.org/10.1016/j.jnoncrysol.2010.11.114.

[88] Cao, X., Harris, W., 2010. Properties of dairy-manure-derived biochar pertinent to its potential use in remediation. Bioresour. Technol. 101, 5222-5228. https://doi.org/10.1016/j.biortech.2010.02.052.

[89] Carvalho, L., McDonald, C., de Hoyos, C., Mischke, U., Phillips, G., Borics, G., Poikane, S., Skjelbred, B., Solheim, A. L., Wichelen, J. V., Cardoso, A. C., 2013. Sustaining recreational quality of European lakes: minimizing the health risks from algal blooms through phosphorus control. J. Appl. Ecol. 50, 315-323. https://doi.org/10.1111/1365-2664.12059.

[90] Chen, J., Kong, H., Wu, D., Chen, X., Zhang, D., Sun, Z., 2007. Phosphate immobilization from aqueous solution by fly ashes in relation to their composition. J. Hazard. Mater. 139, 293-300. https://doi.org/10.1016/j.jhazmat.2006.06.034.

[91] Chen, S. S., Cao, Y., Tsang, D. C. W., Tessonnier, J.-P., Shang, J., Hou, D., Shen, Z., Zhang, S., Ok, Y. S., Wu, K. C.-W., 2020. Effective dispersion of MgO nanostructure on biochar support as a basic catalyst for glucose isomerization. ACS Sustain. Chem. Eng. 8, 6990-7001. https://doi.org/10.1021/acssuschemeng.0c00278.

[92] Criado, Y. A., Alonso, M., Abanades, J. C., 2014. Kinetics of the CaO/Ca(OH)2 hydration/dehydration reaction for thermochemical energy storage applications. Ind. Eng. Chem. Res. 53, 12594-12601. https://doi.org/10.1021/ie404246p.

[93] Dodds, W. K., Bouska, W. W., Eitzmann, J. L., Pilger, T. J., Pitts, K. L., Riley, A. J., Schloesser, J. T., Thornbrugh, D. J., 2009. Eutrophication of U. S. freshwaters: analysis of potential economic damages. Environ. Sci. Technol. 43, 12-19. https://doi.org/10.1021/es801217q.

[94] Du, W., Li, Y., Xu, X., Shang, Y., Gao, B., Yue, Q., 2019. Selective removal of phosphate by dual Zr and La hydroxide/cellulose-based bio-composites. J. Colloid Interface Sci. 533, 692-699. https://doi.org/10.1016/j.jcis.2018.09.002.

[95] Dung, N. T., Unluer, C., 2017. Carbonated MgO concrete with improved performance: the influence of temperature and hydration agent on hydration, carbonation and strength gain. Cem. Concr. Compos. 82, 152-164. https://doi.org/10.1016/j.cemconcomp.2017.06.006

[96] Egle, L., Rechberger, H., Krampe, J., Zessner, M., 2016. Phosphorus recovery from municipal wastewater: an integrated comparative technological, environmental and eco-nomic assessment of P recovery technologies. Sci. Total Environ. 571, 522-542. https://doi.org/10.1016/j.scitotenv.2016.07.019.

[97] Fang, C., Zhang, T., Li, P., Jiang, R., Wu, S., Nie, H., Wang, Y., 2015. Phosphorus recovery from biogas fermentation liquid by Ca—Mg loaded biochar. J. Environ. Sci. 29, 106-114. https://doi.org/10.1016/j.jes.2014.08.019.

[98] Fang, L., Li, J., Donatello, S., Cheeseman, C. R., Poon, C. S., Tsang, D. C. W., 2020. Use of Mg/Ca modified biochars to take up phosphorus from acid-extract of incinerated sewage sludge ash (ISSA) for fertilizer application. J. Clean. Prod. 244, 118853. https://doi.org/10.1016/j.jclepro.2019.118853.

[99] Fraissard, J. P., Conner, C. W., 1997. Physical Adsorption: Experiment, Theory, and Applications (Springer Science & Business Media).

[100] Hasson, D., Shemer, H., Semiat, R., 2016. Removal of scale-forming ions by a novel cation-exchange electrochemical system—a review. Desalination Water Treat. 57, 23147-23161. https://doi.org/10.1080/19443994.2015.1098806.

[101] Huang, W., Zhang, Y., Li, D., 2017. Adsorptive removal of phosphate from water using mesoporous materials: a review. J. Environ. Manag. 193, 470-482. https://doi.org/10.1016/j.jenvman.2017.02.030.

[102] Hung, I.-M., Shih, W.-J., Hon, M.-H., Wang, M.-C., 2012. The properties of sintered calcium phosphate with [Ca]/[P]=1.50. Int. J. Mol. Sci. 13, 13569-13586. https://doi.org/10.3390/ijms131013569.

[103] Inagaki, M., 2006. Carbon Materials Science and Engineering: From Fundamentals to Applications. 清华大学出版社有限公司..

[104] Jeppu, G. P., Clement, T. P., 2012. A modified Langmuir-Freundlich isotherm model for simulating pH-dependent adsorption effects. J. Contain. Hydrol. Sorption and Transport Processes Affecting the Fate of Environmental Pollutants in the Subsurface 129-130, 46-53. https://doi.org/10.1016/j.jconhyd.2011.12.001.

[105] de Jonge, H., Mittelmeijer-Hazeleger, M. C., 1996. Response to Comment on "Adsorption of CO2 and N2 on Soil Organic Matter: Nature of Porosity, Surface Area, and Diffusion Mechanisms." Environ. Sci. Technol. 30, 3636-3637. doi:https://doi.org/10.1021/es962011r.

[106] Kajjumba, G. W., Yildinm, E., Aydin, S., Emik, S., Agun, T., Osra, F., Wasswa, J., 2019. A facile polymerisation of magnetic coal to enhanced phosphate removal from solution. J. Environ. Manag. 247, 356-362. https://doi.org/10.1016/j.jenvman.2019.06.088.

[107] Karthikeyan, M., Zhonghua, W., Mujumdar, A. S., 2009. Low-rank coal drying technologies—current status and new developments. Dry. Technol. 27, 403-415. https://doi.org/10.1080/07373930802683005.

[108] Karunanayake, A. G., Navarathna, C. M., Gunatilake, S. R., Crowley, M., Anderson, R., Mohan, D., Perez, F., Pittman Jr., C. U., Mlsna, T., 2019. Fe3O4 nanoparticles dispersed on Douglas fir biochar for phosphate sorption. ACS Appl. Nano Mater. 2, 3467-3479. https://doi.org/10.1021/acsanm.9b00430.

[109] Kong, L., Han, M., Shih, K., Su, M., Diao, Z., Long, J., Chen, D., Hou, L., Peng, Y., 2018. Nano-rod Ca-decorated sludge derived carbon for removal of phosphorus. Environ. Pollut. 233, 698-705. https://doi.org/10.1016/j.envpol.2017.10.099.

[110] Kuzawa, K., Jung, Y.-J., Kiso, Y., Yamada, T., Nagai, M., Lee, T.-G., 2006. Phosphate removal and recovery with a synthetic hydrotalcite as an adsorbent. Chemosphere 62, 45-52. https://doi.org/10.1016/j.chemosphere.2005.04.015.

[111] Langer, M., Vaananen, J., Boulestreau, M., Miehe, U., Bourdon, C., Lesjean, B., 2017. Advanced phosphorus removal via coagulation, flocculation and microsieve filtration in tertiary treatment. Water Sci. Technol. J. Int. Assoc. Water Pollut. Res. 75, 2875-2882. https://doi.org/10.2166/wst.2017.166.

[112] Leo, C. P., Chai, W. K., Mohammad, A. W., Qi, Y., Hoedley, A. F. A., Chai, S. P., 2011. Phosphorus removal using nanofiltration membranes. Water Sci. Technol. 64, 199-205. https://doi.org/10.2166/wst.2011.598.

[113] Li, R., Wang, J. J., Zhou, B., Awasthi, M. K., Ali, A., Zhang, Z., Gaston, L. A., Lahori, A. H., Mahar, A., 2016a. Enhancing phosphate adsorption by Mg/Al layered double hydroxide func-tionalized biochar with different Mg/Al ratios. Sci. Total Environ. 559, 121-129. https://doi.org/10.1016/j.scitotenv.2016.03.151.

[114] Li, R., Wang, J. J., Zhou, B., Awasthi, M. K., Ali, A., Zhang, Z., Lahori, A. H., Mahar, A., 2016b. Recovery of phosphate from aqueous solution by magnesium oxide decorated magnetic biochar and its potential as phosphate-based fertilizer substitute. Bioresour. Technol. Waste Biorefinery—Advocating Circular Economy 215, 209-214. https://doi.org/10.1016/j.biortech.2016.02.125.

[115] Lim, B. H., Kim, D.-J., 2017. Selective acidic elution of Ca from sewage sludge ash for phosphorus recovery under pH control. J. Ind. Eng. Chem. 46, 62-67. https://doi.org/10.1016/j.jiec.2016.10.016.

[116] Lin, J., He, S., Wang, X., Zhang, H., Zhan, Y., 2019. Removal of phosphate from aqueous solution by a novel mg(OH)2/ZrO2 composite: adsorption behavior and mechanism. Colloids Surf. Physicochem. Eng. Asp. 561, 301-314. https://doi.org/10.1016/j.colsurfa.2018.11.001.

[117] Lozano-Calero, D., Martìn-Palomeque, P., Madueño-Loriguillo, S., 1996. Determination of phosphorus in cola drinks. J. Chem. Educ. 73, 1173. https://doi.org/10.1021/ed073p1173.

[118] Lü, J., Liu, H., Liu, R., Zhao, X., Sun, L., Qu, J., 2013. Adsorptive removal of phosphate by a nanostructured Fe—Al—Mn trimetal oxide adsorbent. Powder Technol. 233, 146-154. https://doi.org/10.1016/j.powtec.2012.08.024.

[119] Marshall, J. A., Morton, B. J., Muhlack, R., Chittleborough, D., Kwong, C. W., 2017. Recovery of phosphate from calcium-containing aqueous solution resulting from biochar-induced calcium phosphate precipitation. J. Clean. Prod. 165, 27-35. https://doi.org/10.1016/j.jclepro.2017.07.042.

[120] Mastronardo, E., Bonaccorsi, L., Kato, Y., Piperopoulos, E., Lanza, M., Milone, C., 2016. Thermochemical performance of carbon nanotubes based hybrid materials for MgO/H2O/Mg(OH)2 chemical heat pumps. Appl. Energy 181, 232-243. https://doi.org/10.1016/j.apenergy.2016.08.041.

[121] McLaughlin, H., 2012. Analytical Options for Biochar Adsorption and Surface Area 15.

[122] Milicevic, S., Boljanac, T., Martinovic, S., Vlahovic, M., Milosevic, V., Babic, B., 2012. Removal of copper from aqueous solutions by low cost adsorbent-Kolubara lignite. Fuel Process. Technol. 95, 1-7. https://doi.org/10.1016/j.fuproc.2011.11.005.

[123] Mitrogiannis, D., Psychoyou, M., Baziotis, I., Inglezakis, V. J., Koukouzas, N., Tsoukalas, N., Palles, D., Kamitsos, E., Oikonomou, G., Markou, G., 2017. Removal of phosphate from aqueous solutions by adsorption onto Ca(OH)2 treated natural clinoptilolite. Chem. Eng. J. 320, 510-522. https://doi.org/10.1016/j.cej.2017.03.063.

[124] Mohan, D., Pittman Jr., C. U., 2006. Activated carbons and low cost adsorbents for remediation of tri- and hexavalent chromium from water. J. Hazard. Mater. 137, 762-811. https://doi.org/10.1016/j.jhazmat.2006.06.060.

[125] Monárrez-Cordero, B. E., Sáenz-Trevizo, A., Bautista-Carrillo, L. M., Silva-Vidaurri, L. G., Miki-Yoshida, M., Amdzaga-Madrid, P., 2018. Simultaneous and fast removal of As3+, As5+, Cd2+, Cu2+, Pb2+ and F− from water with composite Fe—Ti oxides nanoparticles. J. Alloys Compd. 757, 150-160. https://doi.org/10.1016/j.jallcom.2018.05.013.

[126] Mosa, A., El-Ghamry, A., Tolba, M., 2020. Biochar-supported natural zeolite composite for recovery and reuse of aqueous phosphate and humate: batch sorption-desorption and bioassay investigations. Environ. Technol. Innov. 19, 100807. https://doi.org/10.1016/j.eti.2020.100807.

[127] Navarathna, C. M., Bombuwala Dewage, N., Keeton, C., Pennisson, J., Henderson, R., Lashley, B., Zhang, X., Hassan, E. B., Perez, F., Mohan, D., Mlsna, T., Pittman Jr., C. U., 2020. Biochar adsorbents with enhanced hydrophobicity for oil spill removal. ACS Appl. Mater. Interfaces 12, 9248-9260. https://doi.org/10.1021/acsami.9b20924.

[128] NIST, 2012. NIST XPS Database Detail Page [WWW Document]. URL https://srdata.nist.gov/xps/XPSDetailPage.aspx?AllDataNo=66523 (accessed 3.28.19).

[129] Nixon, S. W., 2012. Coastal marine eutrophication: a definition, social causes, and future concerns. Ophelia. https://doi.org/10.1080/00785236.1995.10422044.

[130] Pehlivan, E., Arslan, G., 2007. Removal of metal ions using lignite in aqueous solution—low cost biosorbents. Fuel Process. Technol. 88, 99-106. https://doi.org/10.1016/j.fuproc.2006.09.004.

[131] Qi, Y., Hoadley, A. F. A., Chaffee, A. L., Gamier, G., 2011. Characterisation of lignite as an industrial adsorbent. Fuel 90, 1567-1574. https://doi.org/10.1016/j.fuel.2011.01.015. Quartz R100134-RRUFF Database [WWW Document], 2020. URL https://rruff.info/Quartz/R100134 (accessed 10.30.20).

[132] Scheidema, M. N., Taskinen, P., 2011. Decomposition thermodynamics of magnesium sulfate. Ind. Eng. Chem. Res. 50, 9550-9556. https://doi.org/10.1021/ie102554f.

[133] Simate, G. S., Maledi, N., Ochieng, A., Ndlovu, S., Zhang, J., Walubita, L. F., 2016. Coal-based adsorbents for water and wastewater treatment. J. Environ. Chem. Eng. 4, 2291-2312. https://doi.org/10.1016/j.jece.2016.03.051.

[134] Sugiyama, S., Yokoyama, M., Ishizuka, H., Sotowa, K.-I., Tomida, T., Shigemoto, N., 2005. Removal of aqueous ammonium with magnesium phosphates obtained from the ammonium-elimination of magnesium ammonium phosphate. J. Colloid Interface Sci. 292, 133-138. https://doi.org/10.1016/j.jcis.2005.05.073.

[135] Takaya, C. A., Fletcher, L. A., Singh, S., Okwuosa, U. C., Ross, A. B., 2016. Recovery of phosphate with chemically modified biochars. J. Environ. Chem. Eng. 4, 1156-1165. https://doi.org/10.1016/j.jece.2016.01.011.

[136] US EPA, O., 2015. National Recommended Water Quality Criteria—Aquatic Life Criteria Table [WWW Document]. US EPA. URL https://www.epa.gov/wqc/national-recom-mended-water-quality-criteria-aquatic-life-criteria-table (accessed 9.20.20).

[137] US EPA, O., 2018. Nutrient Criteria Technical Guidance Manuals [WWW Document]. US EPA. URL https://www.epa.gov/nutrient-policy-data/nutrient-criteria-technical-guidance-manuals (accessed 12.4.20).

[138] Wu, L., Wei, C., Zhang, S., Wang, Y., Kuzyakov, Y., Ding, X., 2019. MgO-modified biochar increases phosphate retention and rice yields in saline-alkaline soil. J. Clean. Prod. 235, 901-909. https://doi.org/10.1016/j.jclepro.2019.07.043.

[139] Wu, B., Wan, J., Zhang, Y., Pan, B., Lo, I. M. C., 2020. Selective phosphate removal from water and wastewater using sorption: process fundamentals and removal mechanisms. En-viron. Sci. Technol. 54, 50-66. https://doi.org/10.1021/acs.est.9b05569.

[140] Wuthier, R. E., Rice, G. S., Wallace, J. E., Weaver, R. L., LeGeros, R. Z., Eanes, E. D., 1985. In vitro precipitation of calcium phosphate under intracellular conditions: formation of brushite from an amorphous precursor in the absence of ATP. Calcif. Tissue Int. 37, 401-410. https://doi.org/10.1007/BF02553710.

[141] Xie, F., Wu, F., Liu, G., Mu, Y., Feng, C., Wang, H., Giesy, J. P., 2014. Removal of phosphate from eutrophic lakes through adsorption by in situ formation of magnesium hydroxide from diatomite. Environ. Sci. Technol. 48, 582-590. https://doi.org/10.1021/es4037379.

[142] Yang, Q., Wang, X., Luo, W., Sun, J., Xu, Q., Chen, F., Zhao, J., Wang, S., Yao, F., Wang, D., Li, X., Zeng, G., 2018. Effectiveness and mechanisms of phosphate adsorption on iron-modified biochars derived from waste activated sludge. Bioresour. Technol. 247, 537-544. https://doi.org/10.1016/j.biortech.2017.09.136.

[143] Yao, Y., Gao, B., Inyang, M., Zimmerman, A. R., Cao, X., Pullammanappallil, P., Yang, L., 2011. Removal of phosphate from aqueous solution by biochar derived from anaerobically digested sugar beet tailings. J. Hazard. Mater. 190, 501-507. https://doi.org/10.1016/j.jhazmat.2011.03.083.

[144] Yao, Y., Gao, B., Chen, J., Yang, L., 2013. Engineered biochar reclaiming phosphate from aqueous solutions: mechanisms and potential application as a slow-release fertilizer. Environ. Sci. Technol. 47, 8700-8708. https://doi.org/10.1021/es4012977.

[145] Yin, Q., Zhang, B., Wang, R., Zhao, Z., 2017. Biochar as an adsorbent for inorganic nitrogen and phosphorus removal from water: a review. Environ. Sci. Pollut. Res. 24, 26297-26309. https://doi.org/10.1007/s11356-017-0338-y.

[146] Yin, Q., Ren, H., Wang, R., Zhao, Z., 2018. Evaluation of nitrate and phosphate adsorption on Al-modified biochar: influence of Al content. Sci. Total Environ. 631-632, 895-903. https://doi.org/10.1016/j.scitotenv.2018.03.091.

[147] Zanchett, G., Oliveira-Filho, E. C., 2013. Cyanobacteria and cyanotoxins: from impacts on aquatic ecosystems and human health to anticarcinogenic effects. Toxins 5, 1896-1917. https://doi.org/10.3390/toxins5101896.

[148] Zhang, R., Wang, B., Ma, H., 2010. Studies on chromium (VI) adsorption on sulfonated lignite. Desalination 255, 61-66. https://doi.org/10.1016/j.desal.2010.01.016.

[149] Zhang, M., Gao, B., Yao, Y., Xue, Y., Inyang, M., 2012. Synthesis of porous MgO-biochar nanocomposites for removal of phosphate and nitrate from aqueous solutions. Chem. Eng. J. 210, 26-32. https://doi.org/10.1016/j.cej.2012.08.052.

[150] Zhang, M., Gao, B., Yao, Y., Inyang, M., 2013. Phosphate removal ability of biochar/MgAl-LDH ultra-fine composites prepared by liquid-phase deposition. Chemosphere 92, 1042-1047. https://doi.org/10.1016/j.chemosphere.2013.02.050.

[151] Zhang, Q., Zhang, Z., Teng, J., Huang, H., Peng, Q., Jiao, T., Hou, L., Li, B., 2015. Highly efficient phosphate sequestration in aqueous solutions using nanomagnesium hydroxide modified polystyrene materials. Ind. Eng. Chem. Res. 54, 2940-2949. https://doi.org/10.1021/ie503943z.

[152] Zhang, Y., Guo, X., Yao, Y., Wu, F., Zhang, C., Lu, J., 2016. Synthesis of mg-decorated carbon nanocomposites from MesoCarbon MicroBeads (MCMB) graphite: application for wastewater treatment. ACS Omega 1, 417-423. https://doi.org/10.1021/acsomega.6b00073.

[153] Zhang, J., Hu, X., Zhang, K., Xue, Y., 2019. Desorption of calcium-rich crayfish shell biochar for the removal of lead from aqueous solutions. J. Colloid Interface Sci. 554, 417-423. https://doi.org/10.1016/j.jcis.2019.06.096.

[154] Zhao, L., Guanhua, N., Hui, W., Qian, S., Gang, W., Bingyou, J., Chao, Z., 2020. Molecular structure characterization of lignite treated with ionic liquid via FTIR and XRD spectroscopy. Fuel 272, 117705. https://doi.org/10.1016/j.fuel.2020.117705.

[155] Zhong, C., Deng, Y., Hu, W., Qiao, J., Zhang, L., Zhang, J., 2015. A review of electrolyte materials and compositions for electrochemical supercapacitors. Chem. Soc. Rev. 44, 7484-7539. https://doi.org/10.1039/C5CS00303B.

[156] Zhou, H., Jiang, Z., Wei, S., 2013. A novel absorbent of nano-Fe loaded biomass char and its enhanced adsorption capacity for phosphate in water [WWW document]. J. Chem. https://doi.org/10.1155/2013/649868.

[157] Antunes, E., Jacob, M. V., Brodie, G., Schneider, P. A., 2018. Isotherms, kinetics and mechanism analysis of phosphorus recovery from aqueous solution by calcium-rich biochar produced from biosolids via microwave pyrolysis. J. Environ. Chem. Eng. 6, 395-403. https://doi.org/10.1016/j.jece.2017.12.011

[158] Aramendia, M. A., Borau, V., Jimenez, C., Marinas, J. M., Romero, F. J., Navio, J. A., Barrios, J., 1995. Modification of the Activity of Mg3(PO4)2 in the Gas-Phase Conversion of Cyclohexanol by Addition of Sodium-Carbonate. J. Catal. 157, 97-108. https://doi.org/10.1006/jcat.1995.1271

[159] Chen, J., Kong, H., Wu, D., Chen, X., Zhang, D., Sun, Z., 2007. Phosphate immobilization from aqueous solution by fly ashes in relation to their composition. J. Hazard. Mater. 139, 293-300. https://doi.org/10.1016/j.jhazmat.2006.06.034

[160] Chow, L. C., 2001. Solubility of Calcium Phosphates, in: Chow, L. C., Eanes, E. D. (Eds.), Monographs in Oral Science. KARGER, Basel, pp. 94-111. https://doi.org/10.1159/000061650

[161] Chusuei, C. C., Goodman, D. W., Van Stipdonk, M. J., Justes, D. R., Schweikert, E. A., 1999. Calcium Phosphate Phase Identification Using XPS and Time-of-Flight Cluster SIMS. Anal. Chem. 71, 149-153. https://doi.org/10.1021/ac9806963

[162] Clutch Prep [WWW Document], 2019. URL https://www.clutchprep.com/questions/3578/the-ksp-of-mgso4-is-5-9x10-3-what-is-the-molar-solubility-of-magnesium-sulfate-in-0-1-m-mgcl2 (accessed 6.25.20).

[163] Fang, L., Li, J., Donatello, S., Cheeseman, C. R., Poon, C. S., Tsang, D. C. W., 2020. Use of Mg/Ca modified biochars to take up phosphorus from acid-extract of incinerated sewage sludge ash (ISSA) for fertilizer application. J. Clean. Prod. 244, 118853. https://doi.org/10.1016/j.jclepro.2019.118853

[164] Jung, K.-W., Ahn, K.-H., 2016. Fabrication of porosity-enhanced MgO/biochar for removal of phosphate from aqueous solution: Application of a novel combined electrochemical modification method. Bioresour. Technol. 200, 1029-1032. https://doi.org/10.1016/j.biortech.2015.10.008

[165] Karunanayake, A. G., Navarathna, C. M., Gunatilake, S. R., Crowley, M., Anderson, R., Mohan, D., Perez, F., Pittman, C. U., Jr., Mlsna, T., 2019. Fe3O4 Nanoparticles Dispersed on Douglas Fir Biochar for Phosphate Sorption. ACS Appl. Nano Mater. 2, 3467-3479. https://doi.org/10.1021/acsanm.9b00430

[166] Lide D. R., 2006. SOLUBILITY PRODUCT CONSTANTS, 87th Edition. ed. CRC Handbook of Chemistry and Physics.

[167] Lin, J., He, S., Wang, X., Zhang, H., Zhan, Y., 2019. Removal of phosphate from aqueous solution by a novel Mg(OH)2/ZrO2 composite: Adsorption behavior and mechanism. Colloids Surf. Physicochem. Eng. Asp. 561, 301-314. https://doi.org/10.1016/j.colsurfa.2018.11.001

[168] Marshall, J. A., Morton, B. J., Muhlack, R., Chittleborough, D., Kwong, C. W., 2017. Recovery of phosphate from calcium-containing aqueous solution resulting from biochar-induced calcium phosphate precipitation. J. Clean. Prod. 165, 27-35. https://doi.org/10.1016/j.jclepro.2017.07.042

[169] NIST, 2012. NIST XPS Database Detail Page [WWW Document]. URL https://srdata.nist.gov/xps/XPSDetailPage.aspx?AllDataNo=66523 (accessed 3.28.19).

[170] Su, Y., Guo, Y., Huang, Z., Zhang, Z., Li, G., Lian, J., Ren, L., 2016. Preparation and corrosion behaviors of calcium phosphate conversion coating on magnesium alloy. Surf. Coat. Technol. 307, 99-108. https://doi.org/10.1016/j.surfcoat.2016.08.065

[171] Yao, Y., Gao, B., Chen, J., Yang, L., 2013. Engineered Biochar Reclaiming Phosphate from Aqueous Solutions: Mechanisms and Potential Application as a Slow-Release Fertilizer. Environ. Sci. Technol. 47, 8700-8708. https://doi.org/10.1021/es4012977

[172] Yin, Q., Ren, H., Wang, R., Zhao, Z., 2018. Evaluation of nitrate and phosphate adsorption on Al-modified biochar: Influence of Al content. Sci. Total Environ. 631-632, 895-903. https://doi.org/10.1016/j.scitotenv.2018.03.091

[173] Zhang, M., Gao, B., Yao, Y., Xue, Y., Inyang, M., 2012. Synthesis of porous MgO-biochar nanocomposites for removal of phosphate and nitrate from aqueous solutions. Chem. Eng. J. 210, 26-32. https://doi.org/10.1016/j.cej.2012.08.052

[174] Zhang, X. N., Mao, G. Y., Jiao, Y. B., Shang, Y., Han, R. P., 2014. Adsorption of anionic dye on magnesium hydroxide-coated pyrolytic bio-char and reuse by microwave irradiation. Int. J. Environ. Sci. Technol. 11, 1439-1448. https://doi.org/10.1007/s13762-013-0338-5

[175] Zhao, L., Guanhua, N., Hui, W., Qian, S., Gang, W., Bingyou, J., Chao, Z., 2020. Molecular structure characterization of lignite treated with ionic liquid via FTIR and XRD spectroscopy. Fuel 272, 117705. https://doi.org/10.1016/j.fuel.2020.117705

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. An adsorbent comprising pyrolyzed lignite coal, wherein the pyrolyzed lignite coal includes a surface area that is at least 100 times larger than that of raw lignite coal.

2. The adsorbent of claim 1, wherein the pyrolyzed lignite coal includes a surface area of at least about 40 $m^2/g$ when measured with the BET method using $N_2$ and a particle size of 150-300 μm.

3. The adsorbent of claim 1, wherein the pyrolyzed lignite coal includes an increased average pore volume as compared to raw lignite coal.

4. The adsorbent of claim 3, wherein the pyrolyzed lignite coal includes an average pore volume of about 0.01 $cm^3/g$ when measured using $N_2$.

5. The adsorbent of claim 1, wherein the pyrolyzed lignite coal includes an average micropore volume of about 0.01 $cm^3/g$ when measured using $N_2$.

6. The adsorbent of claim 1, wherein the pyrolyzed lignite coal further comprises impregnated $Ca^{2+}$ and $Mg^{2+}$.

7. The adsorbent of claim 6, wherein the impregnated pyrolyzed lignite coal includes a surface area that is at least 50 times larger than that of raw lignite coal.

8. The adsorbent of claim 6, wherein the impregnated pyrolyzed lignite coal includes a surface area of at least about 20 $m^2/g$ when measured with the BET method using $N_2$ and a particle size of 150-300 μm.

9. The adsorbent of claim 6, wherein the impregnated pyrolyzed lignite coal includes an increased average pore volume as compared to raw lignite coal.

10. The adsorbent of claim 9, wherein the impregnated pyrolyzed lignite coal includes an average pore volume of about 0.005 $cm^3/g$ when measured using $N_2$.

11. The adsorbent of claim 6, wherein the impregnated pyrolyzed lignite coal includes an average micropore volume of about 0.003 $cm^3/g$ when measured using $N_2$.

12. The adsorbent of claim 6, wherein the impregnated pyrolyzed lignite coal includes an increased fraction of micropores as compared to raw lignite.

13. A method of treating wastewater, the method comprising contacting the wastewater with the adsorbent of claim 1.

14. The method of claim 13, further comprising, after contacting the wastewater with the adsorbent, contacting soil with the adsorbent.

15. An adsorbent comprising pyrolyzed lignite coal, wherein the pyrolyzed lignite coal includes an average pore volume of about 0.01 $cm^3/g$ when measured using $N_2$.

16. The adsorbent of claim 15, wherein the pyrolyzed lignite coal includes a surface area that is at least 100 times larger than that of raw lignite coal.

17. The adsorbent of claim 1, wherein the pyrolyzed lignite coal includes a surface area of at least about 40 $m^2/g$ when measured with the BET method using $N_2$ and a particle size of 150-300 μm.

18. The adsorbent of claim 15, wherein the pyrolyzed lignite coal includes an increased average pore volume as compared to raw lignite coal.

19. The adsorbent of claim 15, wherein the pyrolyzed lignite coal further comprises impregnated $Ca^{2+}$ and $Mg^{2+}$.

20. The adsorbent of claim 19, wherein the impregnated pyrolyzed lignite coal includes a surface area that is at least 50 times larger than that of raw lignite coal.

* * * * *